US012641555B2

(12) United States Patent
Peng et al.

(10) Patent No.: US 12,641,555 B2
(45) Date of Patent: May 26, 2026

(54) CLOCK SYNCHRONIZATION METHOD AND COMMUNICATION APPARATUS

(71) Applicant: HUAWEI TECHNOLOGIES CO., LTD., Shenzhen (CN)

(72) Inventors: Wenjie Peng, Shanghai (CN); Qiang Fan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 314 days.

(21) Appl. No.: 18/418,641

(22) Filed: Jan. 22, 2024

(65) Prior Publication Data

US 2024/0244543 A1 Jul. 18, 2024

Related U.S. Application Data

(63) Continuation of application No. PCT/CN2022/101311, filed on Jun. 24, 2022.

(30) Foreign Application Priority Data

Jul. 22, 2021 (CN) .......................... 202110831852.5

(51) Int. Cl.
*H04W 56/00* (2009.01)
*H04L 5/00* (2006.01)
(Continued)

(52) U.S. Cl.
CPC ......... *H04W 56/001* (2013.01); *H04L 5/0051* (2013.01); *H04W 72/0446* (2013.01); *H04W 92/18* (2013.01)

(58) Field of Classification Search
CPC ........... H04W 56/001; H04W 72/0446; H04W 92/18; H04W 5/0051
(Continued)

(56) References Cited

U.S. PATENT DOCUMENTS 9,876,629 B2 * 1/2018 Ogawa .................. H04J 3/0688
2019/0289561 A1 9/2019 Corley et al.
2023/0209387 A1 * 6/2023 Fu ..................... H04W 28/0236
370/252

OTHER PUBLICATIONS

Extended European Search Report issued in corresponding European Application No. 22845091.2, dated Nov. 8, 2024, pp. 1-9.

* cited by examiner

*Primary Examiner* — Thai Q Tran
(74) *Attorney, Agent, or Firm* — HAUPTMAN HAM, LLP

(57) ABSTRACT

This application provides a clock synchronization method and a communication apparatus, and relates to the field of communication technologies, to implement clock synchronization between a terminal device and a network device. The method includes: A first terminal device receives first time information. The first time information indicates time of a lower boundary of a reference system frame SF on a network-side clock, and the reference SF is transmitted through a Uu interface. The first terminal device receives first reference information. The first reference information indicates a first reference direct frame DF, and the first reference DF is transmitted through a PC5 interface. Then, the first terminal device implements clock synchronization with a network device based on the first time information and the first reference information. The first reference DF corresponds to the reference SF. The first terminal device is a remote terminal device in a user equipment-to-network U2N scenario.

20 Claims, 19 Drawing Sheets

(51) Int. Cl.
*H04W 72/0446* (2023.01)
*H04W 92/18* (2009.01)
(58) Field of Classification Search
USPC .......................................................... 370/336
See application file for complete search history.

System frame

SFN #x, t1

Network device t

Terminal device t t1'

Transmission latency

Subframe

Subframe carrying a SIB 9

Lower boundary of a
reference SF

SFN #x

SI window

Subframe

Subframe carrying a SIB 9

Lower boundary of
a reference SF

SFN #x

SI window

CLOCK SYNCHRONIZATION METHOD AND COMMUNICATION APPARATUS

CROSS-REFERENCE TO RELATED APPLICATIONS

This application is a continuation of International Application No. PCT/CN2022/101311, filed on Jun. 24, 2022, which claims priority to Chinese Patent Application No. 202110831852.5 filed on Jul. 22, 2021. The disclosures of the aforementioned applications are herein incorporated by reference in their entireties.

TECHNICAL FIELD

This application relates to the field of communication technologies, and in particular, to a clock synchronization method and a communication apparatus.

BACKGROUND

In a wireless communication system, a terminal device implements system frame (SF) synchronization with a network device based on a synchronization signal and PBCH block (SSB) provided by the network device. Then, the terminal device implements clock synchronization with the network device based on a system information block (SIB) 9 or a downlink information transfer (DL Information Transfer) message provided by the network device. The SIB 9 and the DL information transfer message indicate time of a lower boundary of a reference SF on a network-side clock.

However, in a user equipment-to-network (U2N) scenario, a remote (remote) terminal device establishes a connection to a network device via a relay (relay) terminal device. If the remote terminal device is located outside signal coverage of the network device, the remote terminal device cannot learn of a transmission resource corresponding to a reference SF on Uu, and therefore cannot implement clock synchronization with the network device.

SUMMARY

Embodiments of this application provide a clock synchronization method and a communication apparatus, which are applicable to a U2N scenario, to implement clock synchronization between a remote terminal device and a network device.

To achieve the foregoing objectives, the following technical solutions are used in embodiments of this application.

According to a first aspect, an embodiment of this application provides a clock synchronization method. The method may be performed by a first terminal device or a chip used in the first terminal device. The following provides descriptions by using an example in which the method is performed by the first terminal device. The method includes: A first terminal device receives first time information. The first time information indicates time of a lower boundary of a reference system frame SF on a network-side clock, and the reference SF is transmitted through a Uu interface. The first terminal device receives first reference information. The first reference information indicates a first reference direct frame DF, and the first reference DF is transmitted through a PC5 interface. Then, the first terminal device implements clock synchronization with a network device based on the first time information and the first reference information.

The first reference DF corresponds to the reference SF. The first terminal device is a remote terminal device in a U2N scenario.

In this way, even if the first terminal device cannot determine a transmission resource corresponding to the reference SF on Uu, the first reference information indicates the first reference DF corresponding to the reference SF. Therefore, the first terminal device can implement clock synchronization with the network device based on the first reference DF indicated by the first reference information and the time indicated by the first time information.

In a possible design, the first reference information further includes information about a time domain resource unit. The time domain resource unit is in the first reference DF, before the first reference DF, or after the first reference DF. In addition, the time domain resource unit meets one of the following:

In a first item, a lower boundary of the time domain resource unit is aligned with the lower boundary of the reference SF.

In a second item, an offset between the lower boundary of the time domain resource unit and the lower boundary of the reference SF is minimum.

In other words, the first reference information can further indicate a position relationship between the reference SF and the first reference DF in time domain by using the time domain resource unit.

In a possible design, the first reference information further includes offset information. The offset information indicates the offset between the lower boundary of the time domain resource unit and the lower boundary of the reference SF, so that the first terminal device implements clock synchronization with the network device more accurately based on the offset.

In a possible design, the time domain resource unit includes at least one of the following: a subframe or a slot.

In other words, compared with a frame granularity, the first reference information can further indicate, at a finer granularity (such as the subframe or the slot), the position relationship between the reference SF and the first reference DF in time domain.

In a possible design, the first reference information further includes offset information. The offset information indicates an offset between a lower boundary of the first reference DF and the lower boundary of the reference SF, so that the first terminal device implements clock synchronization with the network device more accurately based on the offset.

In a possible design, the first reference information further includes compensation information. The compensation information is used by the first terminal device to compensate for clock synchronization with the network device, to further improve clock synchronization precision.

In a possible design, the compensation information includes one of the following: a timing advance TA and TA/2. The TA is a timing advance for implementing uplink synchronization between a second terminal device and the network device. The second terminal device provides a relay service for the first terminal device, so that the first terminal device calibrates a synchronization clock between the first terminal device and the network device based on the compensation information (for example, the TA/2), to improve clock synchronization precision.

In a possible design, the clock synchronization method in this embodiment of this application further includes: The first terminal device sends first indication information to the second terminal device. The second terminal device provides the relay service for the first terminal device, and the first indication information indicates the reference SF, so that the second terminal device determines the first reference DF based on the reference SF indicated by the first indication information.

In a possible design, that the first terminal device receives first reference information includes: The first terminal device receives the first reference information from the second terminal device. The second terminal device provides the relay service for the first terminal device.

In other words, after the second terminal device determines the first reference information, the second terminal device directly provides the first reference information for the first terminal device, so that the first terminal device implements clock synchronization with the network device based on the first reference information.

In a possible design, the clock synchronization method in this embodiment of this application further includes: The first terminal device sends a first request message to the second terminal device. The first request message is for requesting the first reference information.

In other words, the first terminal device first requests the first reference information from the second terminal device, and the second terminal device provides the first reference information for the first terminal device based on the first request message, to save a transmission resource.

In a possible design, that the first terminal device receives first reference information includes: The first terminal device receives the first reference information from the network device.

In other words, after the second terminal device determines the first reference information, the second terminal device provides the first reference information for the first terminal device via the network device, so that the first terminal device implements clock synchronization with the network device based on the first reference information.

According to a second aspect, an embodiment of this application provides a clock synchronization method. The method may be performed by a first terminal device or a chip used in the first terminal device. The following provides descriptions by using an example in which the method is performed by the first terminal device. The method includes: A first terminal device receives first time information. The first time information indicates time of a lower boundary of a reference system frame SF on a network-side clock, and the reference SF is transmitted through a Uu interface. The first terminal device receives first reference information. The first reference information includes an offset between Uu timing and PC5 timing. Then, the first terminal device implements clock synchronization with a network device based on the first time information and the first reference information.

In this way, even if the first terminal device cannot determine a transmission resource corresponding to the reference SF on Uu, the first reference information indicates the offset between the Uu timing and the PC5 timing. Therefore, the first terminal device can determine a first reference DF corresponding to the reference SF, and the first terminal device can implement clock synchronization with the network device based on the time indicated by the first time information and the first reference DF.

In a possible design, the offset includes at least one of the following: a quantity of subframes that are offset between the Uu timing and the PC5 timing; a quantity of slots that are offset between the Uu timing and the PC5 timing; and duration that is offset between the Uu timing and the PC5 timing, so that the first terminal device determines, based on the offset, the first reference DF corresponding to the reference SF.

In a possible design, the first reference information further includes compensation information. The compensation information is used by the first terminal device to compensate for clock synchronization with the network device, to further improve precision of clock synchronization between the first terminal device and the network device.

In a possible design, the compensation information includes one of the following: a timing advance TA and TA/2. The TA is a timing advance for implementing uplink synchronization between a second terminal device and the network device. The second terminal device provides a relay service for the first terminal device, so that the first terminal device calibrates a synchronization clock between the first terminal device and the network device based on the compensation information (for example, the TA/2), to improve clock synchronization precision.

In a possible design, that the first terminal device receives first reference information includes: The first terminal device receives the first reference information from the second terminal device. The second terminal device provides the relay service for the first terminal device.

In other words, after the second terminal device determines the first reference information, the second terminal device directly provides the first reference information for the first terminal device, so that the first terminal device implements clock synchronization with the network device based on the first reference information.

In a possible design, the clock synchronization method in this embodiment of this application further includes: The first terminal device sends a first request message to the second terminal device. The first request message is for requesting the first reference information.

In other words, the first terminal device first requests the first reference information from the second terminal device, and the second terminal device provides the first reference information for the first terminal device based on the first request message, to save a transmission resource.

In a possible design, that the first terminal device receives first reference information includes: The first terminal device receives the first reference information from the network device.

In other words, after the second terminal device determines the first reference information, the second terminal device provides the first reference information for the first terminal device via the network device, so that the first terminal device implements clock synchronization with the network device based on the first reference information.

According to a third aspect, an embodiment of this application provides a clock synchronization method. The method may be performed by a first terminal device or a chip used in the first terminal device. The following provides descriptions by using an example in which the method is performed by the first terminal device. The method includes: A first terminal device receives first time information from a network device. The first time information indicates time of a lower boundary of a first reference direct frame DF on a network-side clock, the first reference DF is transmitted through a PC5 interface, the PC5 interface is a communication interface between the first terminal device and a second terminal device, and the second terminal device provides a relay service for the first terminal device. Then, the first terminal device implements clock synchronization with the network device based on the first time information.

In this way, even if the first terminal device cannot determine a transmission resource corresponding to a reference SF on Uu, the first time information indicates the time of the lower boundary of the reference DF on the network-side clock. Therefore, the first terminal device can implement clock synchronization with the network device based on the time indicated by the first time information and the reference DF.

In a possible design, the first time information further includes compensation information. The compensation information is used by the first terminal device to compensate for clock synchronization with the network device, to further improve clock synchronization precision.

In a possible design, the compensation information includes one of the following: a timing advance TA and TA/2. The TA is a timing advance for implementing uplink synchronization between the second terminal device and the network device.

In this way, the first terminal device calibrates a synchronization clock between the first terminal device and the network device based on the compensation information (for example, the TA/2), to improve precision of clock synchronization between the first terminal device and the network device.

In a possible design, the first time information is carried in a downlink information transfer message.

According to a fourth aspect, an embodiment of this application provides a clock synchronization method. The method may be performed by a second terminal device or a chip used in the second terminal device. The following provides descriptions by using an example in which the method is performed by the second terminal device. The method includes: A second terminal device determines first reference information. The first reference information indicates a first reference direct frame DF, the first reference DF corresponds to a reference SF, the reference SF is transmitted through a Uu interface, the first reference DF is transmitted through a PC5 interface, the PC5 interface is a communication interface between a first terminal device and the second terminal device, and the second terminal device provides a relay service for the first terminal device. Then, the second terminal device sends the first reference information. The first reference information is used by the first terminal device to implement clock synchronization with a network device.

In other words, the second terminal device provides the first reference information, so that the first terminal device implements clock synchronization with the network device. Even if the first terminal device cannot determine a transmission resource corresponding to the reference SF on Uu, the first reference information indicates the first reference DF corresponding to the reference SF. Therefore, the first terminal device can implement clock synchronization with the network device based on the first reference DF indicated by the first reference information and time indicated by first time information.

In a possible design, the first reference information further includes information about a time domain resource unit. The time domain resource unit is in the first reference DF, before the first reference DF, or after the first reference DF, and the time domain resource unit meets one of the following:

In a first item, a lower boundary of the time domain resource unit is aligned with a lower boundary of the reference SF.

In a second item, an offset between the lower boundary of the time domain resource unit and the lower boundary of the reference SF is minimum.

In other words, the first reference information can further indicate a position relationship between the reference SF and the first reference DF in time domain by using the time domain resource unit.

In a possible design, the first reference information further includes offset information. The offset information indicates the offset between the lower boundary of the time domain resource unit and the lower boundary of the reference SF, so that the first terminal device implements clock synchronization with the network device more accurately based on the offset.

In a possible design, the time domain resource unit includes at least one of the following: a subframe or a slot.

In other words, compared with a frame granularity, the first reference information can further indicate, at a finer granularity (such as the subframe or the slot), the position relationship between the reference SF and the first reference DF in time domain.

In a possible design, the first reference information further includes offset information. The offset information indicates an offset between a lower boundary of the first reference DF and the lower boundary of the reference SF, so that the first terminal device implements clock synchronization with the network device more accurately based on the offset.

In a possible design, the first reference information further includes compensation information. The compensation information is used by the first terminal device to compensate for clock synchronization with the network device, to further improve clock synchronization precision.

In a possible design, the offset is determined based on the compensation information. The compensation information is used by the first terminal device to compensate for clock synchronization with the network device.

In other words, compensation processing has been considered in a process of determining the offset. That is, the offset is already information after compensation. The first terminal device can improve precision of clock synchronization between the first terminal device and the network device based on the offset, and the first terminal device does not need to perform compensation processing, to simplify a processing process of the first terminal device.

In a possible design, the information about the time domain resource unit is determined based on the compensation information. The compensation information is used by the first terminal device to compensate for clock synchronization with the network device.

In other words, compensation processing has been considered in a process of determining the time domain resource unit. That is, the information about the time domain resource unit is already information after compensation. The first terminal device can improve precision of clock synchronization between the first terminal device and the network device based on the information about the time domain resource unit, and the first terminal device does not need to perform compensation processing, to simplify a processing process of the first terminal device.

In a possible design, the first reference DF is determined based on the compensation information. The compensation information is used by the first terminal device to compensate for clock synchronization with the network device.

In other words, compensation processing has been considered in a process of determining the first reference DF. That is, the first reference DF is already a direct frame after compensation. The first terminal device can improve precision of clock synchronization between the first terminal device and the network device based on the first reference DF, and the first terminal device does not need to perform compensation processing, to simplify a processing process of the first terminal device.

In a possible design, the compensation information includes one of the following: a timing advance TA and TA/2. The TA is a timing advance for implementing uplink synchronization between the second terminal device and the network device.

In this way, the first terminal device calibrates a synchronization clock between the first terminal device and the network device based on the compensation information (for example, the TA/2), to further improve precision of clock synchronization between the first terminal device and the network device.

In a possible design, the clock synchronization method in this embodiment of this application further includes: The second terminal device receives a system information block SIB 9 from the network device. The reference SF is determined based on a system information SI window in which the SIB 9 is located, so that the second terminal device determines the first reference DF based on the reference SF.

In a possible design, the clock synchronization method in this embodiment of this application further includes: The second terminal device receives first indication information from the network device. Alternatively, the second terminal device receives first indication information from the first terminal device. The first indication information indicates the reference SF.

In other words, the first terminal device or the network device can further indicate the reference SF to the second terminal device, so that the second terminal device determines the first reference DF based on the reference SF.

In a possible design, that the second terminal device sends the first reference information includes: The second terminal device sends the first reference information to the network device. The first reference information is sent by the network device to the first terminal device.

In other words, after the second terminal device determines the first reference information, the second terminal device provides the first reference information for the first terminal device via the network device, so that the first terminal device implements clock synchronization with the network device based on the first reference information.

In a possible design, the clock synchronization method in this embodiment of this application further includes: The second terminal device receives a first request message from the network device. The first request message is for requesting the first reference information.

In other words, the network device first requests the first reference information from the second terminal device, and the second terminal device provides the first reference information for the network device based on the first request message, to save a transmission resource.

In a possible design, that the second terminal device sends the first reference information includes: The second terminal device sends the first reference information to the first terminal device.

In other words, after the second terminal device determines the first reference information, the second terminal device directly provides the first reference information for the first terminal device, so that the first terminal device implements clock synchronization with the network device based on the first reference information.

In a possible design, the clock synchronization method in this embodiment of this application further includes: The second terminal device receives a first request message from the first terminal device. The first request message is for requesting the first reference information.

In other words, the first terminal device first requests the first reference information from the second terminal device, and the second terminal device provides the first reference information for the first terminal device based on the first request message, to save a transmission resource.

According to a fifth aspect, an embodiment of this application provides a clock synchronization method. The method may be performed by a second terminal device or a chip used in the second terminal device. The following provides descriptions by using an example in which the method is performed by the second terminal device. The method includes: A second terminal device determines first reference information. The first reference information includes an offset between Uu timing and PC5 timing. Then, the second terminal device sends the first reference information. The first reference information is used by a first terminal device to implement clock synchronization with a network device, and the second terminal device provides a relay service for the first terminal device.

In other words, the second terminal device determines the offset between the Uu timing and the PC5 timing, so that the first terminal device implements clock synchronization with the network device. Even if the first terminal device cannot determine a transmission resource corresponding to a reference SF on Uu, the first reference information indicates the offset between the Uu timing and the PC5 timing. Therefore, a first reference DF corresponding to the reference SF may be determined based on the offset indicated by the first reference information, and then the first terminal device implements clock synchronization with the network device based on time of a lower boundary of the reference SF on a network-side clock.

In a possible design, the offset includes at least one of the following: a quantity of subframes that are offset between the Uu timing and the PC5 timing; a quantity of slots that are offset between the Uu timing and the PC5 timing; and duration that is offset between the Uu timing and the PC5 timing, so that the first terminal device or the network device determines, based on the offset, the first reference DF corresponding to the reference SF.

In a possible design, the first reference information further includes compensation information. The compensation information is used by the first terminal device to compensate for clock synchronization with the network device, to further improve precision of clock synchronization between the first terminal device and the network device.

In a possible design, the compensation information includes one of the following: a timing advance TA and TA/2. The TA is a timing advance for implementing uplink synchronization between the second terminal device and the network device, so that the first terminal device calibrates a synchronization clock between the first terminal device and the network device based on the compensation information (for example, the TA/2), to improve clock synchronization precision.

In a possible design, that the second terminal device sends the first reference information includes: The second terminal device sends the first reference information to the first terminal device.

In other words, after the second terminal device determines the first reference information, the second terminal device directly provides the first reference information for the first terminal device, so that the first terminal device implements clock synchronization with the network device based on the first reference information.

In a possible design, the clock synchronization method in this embodiment of this application further includes: The second terminal device receives a first request message from the first terminal device. The first request message is for requesting the first reference information.

In other words, the first terminal device first requests the first reference information from the second terminal device, and the second terminal device provides the first reference information for the first terminal device based on the first request message, to save a transmission resource.

In a possible design, that the second terminal device sends the first reference information includes: The second terminal device sends the first reference information to the network device.

In other words, after the second terminal device determines the first reference information, the second terminal device provides the first reference information for the first terminal device via the network device, so that the first terminal device implements clock synchronization with the network device based on the first reference information.

In a possible design, the clock synchronization method in this embodiment of this application further includes: The second terminal device receives a first request message from the network device. The first request message is for requesting the first reference information.

In other words, the network device first requests the first reference information from the second terminal device, and the second terminal device provides the first reference information for the network device based on the first request message, to save a transmission resource.

According to a sixth aspect, an embodiment of this application provides a clock synchronization method. The method may be performed by a network device or a chip used in the network device. The following provides descriptions by using an example in which the method is performed by the network device. The method includes: A network device sends first time information to a first terminal device. The first time information indicates time of a lower boundary of a reference system frame SF on a network-side clock, and the reference SF is transmitted through a Uu interface. The network device receives first reference information from a second terminal device. The first reference information indicates a first reference direct frame DF, the first reference DF corresponds to the reference SF, the first reference DF is transmitted through a PC5 interface, and the second terminal device provides a relay service for the first terminal device. Then, the network device sends the first reference information to the first terminal device. The first reference information and the first time information are used by the first terminal device to perform clock synchronization with the network device.

In other words, after determining the first reference information, the second terminal device provides the first reference information for the first terminal device via the network device. Even if the first terminal device cannot determine a transmission resource corresponding to the reference SF on Uu, the first reference information indicates the first reference DF corresponding to the reference SF. Therefore, the first terminal device can implement clock synchronization with the network device based on the first reference DF indicated by the first reference information and the time indicated by the first time information.

In a possible design, the first reference information further includes information about a time domain resource unit. The time domain resource unit is in the first reference DF, before the first reference DF, or after the first reference DF, and the time domain resource unit meets one of the following:

In a first item, a lower boundary of the time domain resource unit is aligned with the lower boundary of the reference SF.

In a second item, an offset between the lower boundary of the time domain resource unit and the lower boundary of the reference SF is minimum.

In other words, the first reference information can further indicate a position relationship between the reference SF and the first reference DF in time domain by using the time domain resource unit.

In a possible design, the first reference information further includes offset information. The offset information indicates the offset between the lower boundary of the time domain resource unit and the lower boundary of the reference SF, so that the first terminal device implements clock synchronization with the network device more accurately based on the offset.

In a possible design, the time domain resource unit includes at least one of the following: a subframe or a slot.

In other words, compared with a frame granularity, the first reference information can further indicate, at a finer granularity (such as the subframe or the slot), the position relationship between the reference SF and the first reference DF in time domain.

In a possible design, the first reference information further includes offset information. The offset information indicates an offset between a lower boundary of the first reference DF and the lower boundary of the reference SF, so that the first terminal device implements clock synchronization with the network device more accurately based on the offset.

In a possible design, the first reference information further includes compensation information. The compensation information is used by the first terminal device to compensate for clock synchronization with the network device, to further improve clock synchronization precision.

In a possible design, the offset is determined based on the compensation information. The compensation information is used by the first terminal device to compensate for clock synchronization with the network device.

In other words, compensation processing has been considered in a process of determining the offset. That is, the offset is already information after compensation. The first terminal device can improve precision of clock synchronization between the first terminal device and the network device based on the offset, and the first terminal device does not need to perform compensation processing, to simplify a processing process of the first terminal device.

In a possible design, the information about the time domain resource unit is determined based on the compensation information. The compensation information is used by the first terminal device to compensate for clock synchronization with the network device.

In other words, compensation processing has been considered in a process of determining the time domain resource unit. That is, the information about the time domain resource unit is already information after compensation. The first terminal device can improve precision of clock synchronization between the first terminal device and the network device based on the information about the time domain resource unit, and the first terminal device does not need to perform compensation processing, to simplify a processing process of the first terminal device.

In a possible design, the first reference DF is determined based on the compensation information. The compensation information is used by the first terminal device to compensate for clock synchronization with the network device.

In other words, compensation processing has been considered in a process of determining the first reference DF. That is, the first reference DF is already a direct frame after compensation. The first terminal device can improve precision of clock synchronization between the first terminal device and the network device based on the first reference DF, and the first terminal device does not need to perform compensation processing, to simplify a processing process of the first terminal device.

In a possible design, the compensation information includes one of the following: a timing advance TA and TA/2. The TA is a timing advance for implementing uplink synchronization between the second terminal device and the network device.

In this way, the first terminal device calibrates a synchronization clock between the first terminal device and the network device based on the compensation information (for example, the TA/2), to further improve precision of clock synchronization between the first terminal device and the network device.

In a possible design, the first time information is a system information block SIB 9. In other words, the network device indicates the time of the reference SF on the network-side clock to the first terminal device by using the SIB 9.

In a possible design, the clock synchronization method in this embodiment of this application further includes: The network device sends first indication information to the second terminal device. The first indication information indicates the reference SF, and the reference SF is used to determine the first reference DF.

In other words, the network device can further indicate the reference SF to the second terminal device, so that the second terminal device determines the first reference DF based on the reference SF.

In a possible design, the clock synchronization method in this embodiment of this application further includes: The network device sends a first request message to the second terminal device. The first request message is for requesting the first reference information.

In other words, the network device first requests the first reference information from the second terminal device, and the second terminal device provides the first reference information for the network device based on the first request message, to save a transmission resource.

According to a seventh aspect, an embodiment of this application provides a clock synchronization method. The method may be performed by a network device or a chip used in the network device. The following provides descriptions by using an example in which the method is performed by the network device. The method includes: A network device sends first time information to a first terminal device. The first time information indicates time of a lower boundary of a reference system frame SF on a network-side clock, and the reference SF is transmitted through a Uu interface. The network device receives first reference information from a second terminal device. The first reference information includes an offset between Uu timing and PC5 timing, and the second terminal device provides a relay service for the first terminal device. Then, the network device sends the first reference information to the first terminal device. The first time information and the first reference information are used by the first terminal device to perform clock synchronization with the network device.

In other words, after determining the offset between the Uu timing and the PC5 timing, the second terminal device provides the offset for the first terminal device via the network device, so that the first terminal device implements clock synchronization with the network device based on the first time information and the first reference information. Even if the first terminal device cannot determine a transmission resource corresponding to the reference SF on Uu, the first reference information indicates a first reference DF corresponding to the reference SF. Therefore, the first terminal device can implement clock synchronization with the network device based on the first reference DF indicated by the first reference information and the time indicated by the first time information.

In a possible design, the offset includes at least one of the following: a quantity of subframes that are offset between the Uu timing and the PC5 timing; a quantity of slots that are offset between the Uu timing and the PC5 timing; and duration that is offset between the Uu timing and the PC5 timing, so that the first terminal device determines, based on the offset, the first reference DF corresponding to the reference SF.

In a possible design, the offset is determined based on compensation information. The compensation information is used by the first terminal device to compensate for clock synchronization with the network device.

In other words, compensation processing has been considered in a process of determining the offset. That is, offset is already information after compensation. The first terminal device can improve precision of clock synchronization between the first terminal device and the network device based on the offset, and the first terminal device does not need to perform compensation processing, to simplify a processing process of the first terminal device.

In a possible design, the first reference information further includes compensation information. The compensation information is used by the first terminal device to compensate for clock synchronization with the network device, to further improve clock synchronization precision.

In a possible design, the compensation information includes one of the following: a timing advance TA and TA/2. The TA is a timing advance for implementing uplink synchronization between the second terminal device and the network device.

In this way, the first terminal device calibrates a synchronization clock between the first terminal device and the network device based on the compensation information (for example, the TA/2), to further improve precision of clock synchronization between the first terminal device and the network device.

In a possible design, the clock synchronization method in this embodiment of this application further includes: The network device sends a first request message to the second terminal device. The first request message is for requesting the first reference information.

In other words, the network device first requests the first reference information from the second terminal device, and the second terminal device provides the first reference information for the network device based on the first request message, to save a transmission resource.

According to an eighth aspect, an embodiment of this application provides a clock synchronization method. The method may be performed by a network device or a chip used in the network device. The following provides descriptions by using an example in which the method is performed by the network device. The method includes: A network device determines first time information. The first time information indicates time of a lower boundary of a first reference direct frame DF on a network-side clock, the first reference DF is transmitted through a PC5 interface, the PC5 interface is a communication interface between a first terminal device and a second terminal device, and the second terminal device provides a relay service for the first terminal device. Then, the network device sends the first time information to the first terminal device. The first time information is used by the first terminal device to perform clock synchronization with the network device.

In other words, the network device determines the first time information, and provides the first time information for the first terminal device. Even if the first terminal device cannot determine a transmission resource corresponding to a reference SF on Uu, the first time information indicates the time of the lower boundary of the reference DF on the network-side clock. Therefore, the first terminal device can implement clock synchronization with the network device based on the time indicated by the first time information and the reference DF.

In a possible design, the clock synchronization method in this embodiment of this application further includes: The network device receives first reference information from the second terminal device. The first reference information includes an offset between Uu timing and PC5 timing. Then, the network device determines the first time information based on the first reference information.

In other words, the second terminal device determines the first reference information, and provides the first reference information for the network device. Because the first reference information indicates the offset between the Uu timing and the PC5 timing, the network device may determine the first time information based on the first reference information.

In a possible design, the offset includes at least one of the following: a quantity of subframes that are offset between the Uu timing and the PC5 timing; a quantity of slots that are offset between the Uu timing and the PC5 timing; and duration that is offset between the Uu timing and the PC5 timing, so that the network device determines, based on the offset, the first reference DF corresponding to the reference SF.

In a possible design, the first reference information and the first time information each include compensation information, and the compensation information is used by the first terminal device to compensate for clock synchronization with the network device, to further improve precision of clock synchronization between the first terminal device and the network device.

In a possible design, the compensation information includes one of the following: a timing advance TA and TA/2. The TA is a timing advance for implementing uplink synchronization between the second terminal device and the network device.

In this way, the first terminal device calibrates a synchronization clock between the first terminal device and the network device based on the compensation information (for example, the TA/2), to further improve precision of clock synchronization between the first terminal device and the network device.

In a possible design, the clock synchronization method in this embodiment of this application further includes: The network device sends a first request message to the second terminal device. The first request message is for requesting the first reference information.

In other words, the network device first requests the first reference information from the second terminal device, and the second terminal device provides the first reference information for the network device based on the first request message, to save a transmission resource.

In a possible design, the first time information is carried in a downlink information transfer message.

According to a ninth aspect, an embodiment of this application provides a clock synchronization method. The method may be performed by a first terminal device or a chip used in the first terminal device. The following provides descriptions by using an example in which the method is performed by the first terminal device. The method includes: A first terminal device receives first information from a second terminal device. The first information indicates time corresponding to a reference DF on a second clock, and the second clock is a timing clock on a second terminal device side. Then, the first terminal device implements clock synchronization with the second terminal device based on the first information.

In this way, the second terminal device indicates the time of the reference DF on the second clock to the first terminal device, so that the first terminal device determines, based on the reference DF and the time indicated by the first information, time corresponding to the reference DF on a first clock, to implement clock synchronization between the terminal devices.

In a possible design, the first information is carried in a sidelink RRC message. In other words, the second terminal device sends the RRC message to the first terminal device in a unicast manner, so that the first terminal device obtains the first information.

Alternatively, the first information is carried in second-stage sidelink control information SCI. In other words, the second terminal device sends the second-stage SCI to the first terminal device in a multicast or broadcast manner, so that the first terminal device obtains the first information.

In a possible design, the first information further includes at least one of the following:

In a first item, time type information. The time type information indicates a type of the time corresponding to the reference DF on the second clock, to indicate the type of the time to the first terminal device.

In a second item, uncertainty information. The uncertainty information indicates an error of the time corresponding to the reference DF on the second clock, to indicate the error of the time to the first terminal device.

In a possible design, the clock synchronization method in this embodiment of this application further includes: The first terminal device sends a request message to the second terminal device. The request message is for requesting the first information.

In other words, the first terminal device first requests the first information from the second terminal device, and the second terminal device provides the first information for the first terminal device based on the request message, to save a transmission resource.

According to a tenth aspect, an embodiment of this application provides a transmission latency determining method. The method may be performed by a first terminal device or a chip used in the first terminal device. The following provides descriptions by using an example in which the method is performed by the first terminal device. The method includes: A first terminal device sends first reference information to a second terminal device. The first reference information corresponds to a first resource. The first terminal device receives second reference information and second indication information from the second terminal device. The second reference information corresponds to a second resource. The second indication information indicates second time and third time. The second time is time of a boundary of the first resource on a second clock, and the third time is time of a boundary of the second resource on the second clock. The second clock is a timing clock on a second terminal device side. The first terminal device determines first time and fourth time. The first time is time of the boundary of the first resource on a first clock, and the fourth time is time of the boundary of the second resource on the first clock. The first clock is a timing clock on a first terminal device side. The first terminal device determines a transmission latency based on the first time, the second time, the third time, and the fourth time.

In other words, both the first terminal device and the second terminal device determine time on respective clocks for a same reference point (for example, the boundary of the first resource or the boundary of the second resource), and then the first terminal device may determine the transmission latency based on the foregoing four pieces of time.

In a possible design, the transmission latency determining method in this embodiment of this application further includes: The first terminal device compensates for clock synchronization with the second terminal device based on the transmission latency.

In this way, the first terminal device may implement clock synchronization with the second terminal device, to improve clock synchronization precision.

In a possible design, the transmission latency determining method in this embodiment of this application further includes: The first terminal device sends the transmission latency to the second terminal device. The transmission latency is used by the second terminal device to compensate for clock synchronization with the first terminal device. In this case, the second terminal device may implement clock synchronization with the first terminal device, to improve clock synchronization precision. Alternatively, the transmission latency is used by the second terminal device to compensate for clock synchronization with a network device, and the first terminal device provides a relay service for the second terminal device. In this case, the second terminal device may implement clock synchronization with the network device, to improve clock synchronization precision.

In a possible design, the transmission latency determining method in this embodiment of this application further includes: The first terminal device compensates for clock synchronization with the network device based on the transmission latency. The second terminal device provides a relay service for the first terminal device.

In this way, the first terminal device may implement clock synchronization with the network device, to improve clock synchronization precision.

In a possible design, the first reference information is a first reference signal RS sent by the first terminal device on a PC5 interface, and the second reference information is a second RS sent by the second terminal device on the PC5 interface.

In other words, the first terminal device and the second terminal device determine the transmission latency by sending the RS to each other.

In a possible design, the transmission latency determining method in this embodiment of this application further includes: The first terminal device sends first bandwidth information to the network device. The first bandwidth information indicates a bandwidth of the first RS, so that the network device learns of a resource occupation status of the first terminal device.

In a possible design, the bandwidth of the first RS is configured by the network device. In other words, the network device determines the bandwidth of the first RS.

In a possible design, the transmission latency determining method in this embodiment of this application further includes: The first terminal device sends a service request SR to the network device. The SR is for requesting the first resource, and the first resource is used to transmit the first RS.

In other words, when the first resource carries the first RS and does not carry a media access control protocol data unit MAC PDU, the first terminal device can also request the first resource from the network device, to transmit the first RS.

In a possible design, the transmission latency determining method in this embodiment of this application further includes: The first terminal device sends sidelink control information SCI to the second terminal device. The SCI indicates that the first resource does not carry the MAC PDU.

In this way, the second terminal device may learn, based on the SCI, that the first resource carries only the first RS and does not carry the MAC PDU.

In a possible design, the transmission latency determining method in this embodiment of this application further includes: The first terminal device sends second bandwidth information to the second terminal device. The second bandwidth information indicates the bandwidth of the first RS.

In this way, the second terminal device may learn of the bandwidth of the first RS based on the second bandwidth information.

In a possible design, the second bandwidth information is carried in first-stage SCI, or the second bandwidth information is carried in second-stage SCI.

In a possible design, the transmission latency determining method in this embodiment of this application further includes: The first terminal device receives third bandwidth information from the second terminal device. The third bandwidth information indicates a bandwidth of the second RS.

In this way, the first terminal device may learn of the bandwidth of the second RS based on the third bandwidth information.

In a possible design, the third bandwidth information is carried in first-stage SCI, or the third bandwidth information is carried in second-stage SCI.

In a possible design, the transmission latency determining method in this embodiment of this application further includes: The first terminal device sends first indication information to the second terminal device. The first indication information indicates the first time.

According to an eleventh aspect, an embodiment of this application provides a communication apparatus. The communication apparatus may be the first terminal device in any one of the first aspect or the possible designs of the first aspect, or a chip that implements a function of the first terminal device. The communication apparatus includes a corresponding module, unit, or means (means) for implementing the foregoing method. The module, unit, or means may be implemented by hardware, software, or hardware by executing corresponding software. The hardware or the software includes one or more modules or units corresponding to the foregoing function.

The communication apparatus includes a receiving unit, a processing unit, and a sending unit. The receiving unit is configured to receive first time information. The first time information indicates time of a lower boundary of a reference system frame SF on a network-side clock, and the reference SF is transmitted through a Uu interface. The receiving unit is further configured to receive first reference information. The first reference information indicates a first reference direct frame DF, and the first reference DF is transmitted through a PC5 interface. The processing unit is configured to implement clock synchronization with a network device based on the first time information and the first reference information. The first reference DF corresponds to the reference SF.

In a possible design, the first reference information further includes information about a time domain resource unit. The time domain resource unit is in the first reference DF, before the first reference DF, or after the first reference DF, and the time domain resource unit meets one of the following:

In a first item, a lower boundary of the time domain resource unit is aligned with the lower boundary of the reference SF.

In a second item, an offset between the lower boundary of the time domain resource unit and the lower boundary of the reference SF is minimum.

In a possible design, the first reference information further includes offset information. The offset information indicates the offset between the lower boundary of the time domain resource unit and the lower boundary of the reference SF.

In a possible design, the time domain resource unit includes at least one of the following: a subframe or a slot.

In a possible design, the first reference information further includes offset information. The offset information indicates an offset between a lower boundary of the first reference DF and the lower boundary of the reference SF.

In a possible design, the first reference information further includes compensation information. The compensation information is used by the communication apparatus to compensate for clock synchronization with the network device.

In a possible design, the compensation information includes one of the following: a timing advance TA and TA/2. The TA is a timing advance for implementing uplink synchronization between a second terminal device and the network device, and the second terminal device provides a relay service for the communication apparatus.

In a possible design, the sending unit is configured to send first indication information to the second terminal device. The second terminal device provides the relay service for the communication apparatus, and the first indication information indicates the reference SF.

In a possible design, that the receiving unit is configured to receive first reference information specifically includes: receiving the first reference information from the second terminal device. The second terminal device provides the relay service for the communication apparatus.

In a possible design, the sending unit is further configured to send a first request message to the second terminal device. The first request message is for requesting the first reference information.

In a possible design, that the receiving unit is configured to receive first reference information specifically includes: receiving the first reference information from the network device.

According to a twelfth aspect, an embodiment of this application provides a communication apparatus. The communication apparatus may be the first terminal device in any one of the second aspect or the possible designs of the second aspect, or a chip that implements a function of the first terminal device. The communication apparatus includes a corresponding module, unit, or means (means) for implementing the foregoing method. The module, unit, or means may be implemented by hardware, software, or hardware by executing corresponding software. The hardware or the software includes one or more modules or units corresponding to the foregoing function.

The communication apparatus includes a receiving unit, a processing unit, and a sending unit. The receiving unit is configured to receive first time information. The first time information indicates time of a lower boundary of a reference system frame SF on a network-side clock, and the reference SF is transmitted through a Uu interface. The receiving unit is further configured to receive first reference information. The first reference information includes an offset between Uu timing and PC5 timing. The processing unit is configured to implement clock synchronization with a network device based on the first time information and the first reference information.

In a possible design, the offset includes at least one of the following: a quantity of subframes that are offset between the Uu timing and the PC5 timing; a quantity of slots that are offset between the Uu timing and the PC5 timing; and duration that is offset between the Uu timing and the PC5 timing.

In a possible design, the first reference information further includes compensation information, and the compensation information is used by the communication apparatus to compensate for clock synchronization with the network device.

In a possible design, the compensation information includes one of the following: a timing advance TA and TA/2. The TA is a timing advance for implementing uplink synchronization between a second terminal device and the network device, and the second terminal device provides a relay service for the communication apparatus.

In a possible design, that the receiving unit is configured to receive first reference information specifically includes: receiving the first reference information from the second terminal device. The second terminal device provides the relay service for the communication apparatus.

In a possible design, the sending unit is configured to send a first request message to the second terminal device. The first request message is for requesting the first reference information.

In a possible design, that the receiving unit is configured to receive first reference information specifically includes: receiving the first reference information from the network device.

According to a thirteenth aspect, an embodiment of this application provides a communication apparatus. The communication apparatus may be the first terminal device in any one of the third aspect or the possible designs of the third aspect, or a chip that implements a function of the first terminal device. The communication apparatus includes a corresponding module, unit, or means (means) for implementing the foregoing method. The module, unit, or means may be implemented by hardware, software, or hardware by executing corresponding software. The hardware or the software includes one or more modules or units corresponding to the foregoing function.

The communication apparatus includes a receiving unit, a processing unit, and a sending unit. The receiving unit is configured to receive first time information from a network device. The first time information indicates time of a lower boundary of a first reference direct frame DF on a network-side clock, the first reference DF is transmitted through a PC5 interface, the PC5 interface is a communication interface between the communication apparatus and a second terminal device, and the second terminal device provides a relay service for the communication apparatus. The processing unit is configured to implement clock synchronization with the network device based on the first time information.

In a possible design, the first time information further includes compensation information. The compensation information is used by the communication apparatus to compensate for clock synchronization with the network device.

In a possible design, the compensation information includes one of the following: a timing advance TA and TA/2. The TA is a timing advance for implementing uplink synchronization between the second terminal device and the network device.

In a possible design, the first time information is carried in a downlink information transfer message.

According to a fourteenth aspect, an embodiment of this application provides a communication apparatus. The communication apparatus may be the second terminal device in any one of the fourth aspect or the possible designs of the fourth aspect, or a chip that implements a function of the second terminal device. The communication apparatus includes a corresponding module, unit, or means (means) for implementing the foregoing method. The module, unit, or means may be implemented by hardware, software, or hardware by executing corresponding software. The hardware or the software includes one or more modules or units corresponding to the foregoing function.

The communication apparatus includes a receiving unit, a processing unit, and a sending unit. The processing unit is configured to determine first reference information. The first to a reference SF, the reference SF is transmitted through a Uu interface, the first reference DF is transmitted through a PC5 interface, the PC5 interface is a communication interface between a first terminal device and the communication apparatus, and the communication apparatus provides a relay service for the first terminal device. The sending unit is configured to send the first reference information. The first reference information is used by the first terminal device to implement clock synchronization with a network device.

In a possible design, the first reference information further includes information about a time domain resource unit. The time domain resource unit is in the first reference DF, before the first reference DF, or after the first reference DF, and the time domain resource unit meets one of the following:

In a first item, a lower boundary of the time domain resource unit is aligned with a lower boundary of the reference SF.

In a second item, an offset between the lower boundary of the time domain resource unit and the lower boundary of the reference SF is minimum.

In a possible design, the first reference information further includes offset information. The offset information indicates the offset between the lower boundary of the time domain resource unit and the lower boundary of the reference SF.

In a possible design, the time domain resource unit includes at least one of the following: a subframe or a slot.

In a possible design, the first reference information further includes offset information. The offset information indicates an offset between a lower boundary of the first reference DF and the lower boundary of the reference SF.

In a possible design, the first reference information further includes compensation information. The compensation information is used by the first terminal device to compensate for clock synchronization with the network device.

In a possible design, the offset is determined based on the compensation information. The compensation information is used by the first terminal device to compensate for clock synchronization with the network device.

In a possible design, the information about the time domain resource unit is determined based on the compensation information. The compensation information is used by the first terminal device to compensate for clock synchronization with the network device.

In a possible design, the first reference DF is determined based on the compensation information. The compensation information is used by the first terminal device to compensate for clock synchronization with the network device.

In a possible design, the compensation information includes one of the following: a timing advance TA and TA/2. The TA is a timing advance for implementing uplink synchronization between the communication apparatus and the network device.

In a possible design, the receiving unit is further configured to receive a system information block SIB 9 from the network device. The reference SF is determined based on a system information SI window in which the SIB 9 is located.

In a possible design, the receiving unit is further configured to receive first indication information from the network device. Alternatively, the receiving unit is further configured to receive first indication information from the first terminal device. The first indication information indicates the reference SF.

In a possible design, that the sending unit is configured to send the first reference information specifically includes: sending the first reference information to the network device. The first reference information is sent by the network device to the first terminal device.

In a possible design, the receiving unit is further configured to receive a first request message from the network device. The first request message is for requesting the first reference information.

In a possible design, that the sending unit is configured to send the first reference information specifically includes: sending the first reference information to the first terminal device.

In a possible design, the receiving unit is further configured to receive a first request message from the first terminal device. The first request message is for requesting the first reference information.

According to a fifteenth aspect, an embodiment of this application provides a communication apparatus. The communication apparatus may be the second terminal device in any one of the fifth aspect or the possible designs of the fifth aspect, or a chip that implements a function of the second terminal device. The communication apparatus includes a corresponding module, unit, or means (means) for implementing the foregoing method. The module, unit, or means may be implemented by hardware, software, or hardware by executing corresponding software. The hardware or the software includes one or more modules or units corresponding to the foregoing function.

The communication apparatus includes a receiving unit, a processing unit, and a sending unit. The processing unit is configured to determine first reference information. The first reference information includes an offset between Uu timing and PC5 timing. The sending unit is configured to send the first reference information, where the first reference information is used by a first terminal device to implement clock synchronization with a network device, and the communication apparatus provides a relay service for the first terminal device.

In a possible design, the offset includes at least one of the following: a quantity of subframes that are offset between the Uu timing and the PC5 timing; a quantity of slots that are offset between the Uu timing and the PC5 timing; and duration that is offset between the Uu timing and the PC5 timing.

In a possible design, the first reference information further includes compensation information. The compensation information is used by the first terminal device to compensate for clock synchronization with the network device.

In a possible design, the compensation information includes one of the following: a timing advance TA and TA/2. The TA is a timing advance for implementing uplink synchronization between the communication apparatus and the network device.

In a possible design, that the sending unit is configured to send the first reference information specifically includes: sending the first reference information to the first terminal device.

In a possible design, the receiving unit is further configured to receive a first request message from the first terminal device. The first request message is for requesting the first reference information.

In a possible design, that the sending unit is configured to send the first reference information specifically includes: sending the first reference information to the network device.

In a possible design, the receiving unit is further configured to receive a first request message from the network device. The first request message is for requesting the first reference information.

According to a sixteenth aspect, an embodiment of this application provides a communication apparatus. The communication apparatus may be the network device in any one of the sixth aspect or the possible designs of the sixth aspect, or a chip that implements a function of the network device. The communication apparatus includes a corresponding module, unit, or means (means) for implementing the foregoing method. The module, unit, or means may be implemented by hardware, software, or hardware by executing corresponding software. The hardware or the software includes one or more modules or units corresponding to the foregoing function.

The communication apparatus includes a receiving unit, a processing unit, and a sending unit. The sending unit is configured to send first time information to a first terminal device. The first time information indicates time of a lower boundary of a reference system frame SF on a network-side clock, and the reference SF is transmitted through a Uu interface. The receiving unit is configured to receive first reference information from a second terminal device. The first to the reference SF, the first reference DF is transmitted through a PC5 interface, and the second terminal device provides a relay service for the first terminal device. The sending unit is further configured to send the first reference information to the first terminal device. The first reference information and the first time information are used by the first terminal device to perform clock synchronization with the communication apparatus.

In a possible design, the first reference information further includes information about a time domain resource unit. The time domain resource unit is in the first reference DF, before the first reference DF, or after the first reference DF, and the time domain resource unit meets one of the following:

In a first item, a lower boundary of the time domain resource unit is aligned with the lower boundary of the reference SF.

In a second item, an offset between the lower boundary of the time domain resource unit and the lower boundary of the reference SF is minimum.

In a possible design, the first reference information further includes offset information. The offset information indicates the offset between the lower boundary of the time domain resource unit and the lower boundary of the reference SF.

In a possible design, the time domain resource unit includes at least one of the following: a subframe or a slot.

In a possible design, the first reference information further includes offset information. The offset information indicates an offset between a lower boundary of the first reference DF and the lower boundary of the reference SF.

In a possible design, the first reference information further includes compensation information. The compensation information is used by the first terminal device to compensate for clock synchronization with the communication apparatus.

In a possible design, the offset is determined based on the compensation information. The compensation information is used by the first terminal device to compensate for clock synchronization with the communication apparatus.

In a possible design, the information about the time domain resource unit is determined based on the compensation information. The compensation information is used by the first terminal device to compensate for clock synchronization with the communication apparatus.

In a possible design, the first reference DF is determined based on the compensation information. The compensation information is used by the first terminal device to compensate for clock synchronization with the communication apparatus.

In a possible design, the compensation information includes one of the following: a timing advance TA and TA/2. The TA is a timing advance for implementing uplink synchronization between the second terminal device and the network device.

In a possible design, the first time information is a system information block SIB 9.

In a possible design, the sending unit is further configured to send first indication information to the second terminal device. The first indication information indicates the reference SF, and the reference SF is used to determine the first reference DF.

In a possible design, the sending unit is further configured to send a first request message to the second terminal device. The first request message is for requesting the first reference information.

According to a seventeenth aspect, an embodiment of this application provides a communication apparatus. The communication apparatus may be the network device in any one of the seventh aspect or the possible designs of the seventh aspect, or a chip that implements a function of the network device. The communication apparatus includes a corresponding module, unit, or means (means) for implementing the foregoing method. The module, unit, or means may be implemented by hardware, software, or hardware by executing corresponding software. The hardware or the software includes one or more modules or units corresponding to the foregoing function.

The communication apparatus includes a receiving unit, a processing unit, and a sending unit. The sending unit is configured to send first time information to a first terminal device. The first time information indicates time of a lower boundary of a reference system frame SF on a network-side clock, and the reference SF is transmitted through a Uu interface. The receiving unit is configured to receive first reference information from a second terminal device. The first reference information includes an offset between Uu timing and PC5 timing, and the second terminal device provides a relay service for the first terminal device. The sending unit is further configured to send the first reference information to the first terminal device. The first time information and the first reference information are used by the first terminal device to perform clock synchronization with the communication apparatus.

In a possible design, the offset includes at least one of the following: a quantity of subframes that are offset between the Uu timing and the PC5 timing; a quantity of slots that are offset between the Uu timing and the PC5 timing; and duration that is offset between the Uu timing and the PC5 timing.

In a possible design, the offset is determined based on the compensation information. The compensation information is used by the first terminal device to compensate for clock synchronization with the communication apparatus.

In a possible design, the first reference information further includes compensation information. The compensation information is used by the first terminal device to compensate for clock synchronization with the network device.

In a possible design, the compensation information includes one of the following: a timing advance TA and TA/2. The TA is a timing advance for implementing uplink synchronization between the second terminal device and the network device.

In a possible design, the sending unit is further configured to send a first request message to the second terminal device. The first request message is for requesting the first reference information.

According to an eighteenth aspect, an embodiment of this application provides a communication apparatus. The communication apparatus may be the network device in any one of the eighth aspect or the possible designs of the eighth aspect, or a chip that implements a function of the network device. The communication apparatus includes a corresponding module, unit, or means (means) for implementing the foregoing method. The module, unit, or means may be implemented by hardware, software, or hardware by executing corresponding software. The hardware or the software includes one or more modules or units corresponding to the foregoing function.

The communication apparatus includes a receiving unit, a processing unit, and a sending unit. The processing unit is configured to determine first time information. The first time information indicates time of a lower boundary of a first reference direct frame DF on a network-side clock, the first reference DF is transmitted through a PC5 interface, the PC5 interface is a communication interface between a first terminal device and a second terminal device, and the second terminal device provides a relay service for the first terminal device. The sending unit is configured to send the first time information to the first terminal device. The first time information is used by the first terminal device to perform clock synchronization with the communication apparatus.

In a possible design, the receiving unit is configured to receive first reference information from the second terminal device. The first reference information includes an offset between Uu timing and PC5 timing. The processing unit is further configured to determine the first time information based on the first reference information.

In a possible design, the offset includes at least one of the following: a quantity of subframes that are offset between the Uu timing and the PC5 timing; a quantity of slots that are offset between the Uu timing and the PC5 timing; and duration that is offset between the Uu timing and the PC5 timing.

In a possible design, the first reference information and the first time information each include compensation information, and the compensation information is used by the first terminal device to compensate for clock synchronization with the communication apparatus.

In a possible design, the compensation information includes one of the following: a timing advance TA and TA/2. The TA is a timing advance for implementing uplink synchronization between the second terminal device and the communication apparatus.

In a possible design, the sending unit is further configured to send a first request message to the second terminal device. The first request message is for requesting the first reference information.

In a possible design, the first time information is carried in a downlink information transfer message.

According to a nineteenth aspect, an embodiment of this application provides a communication apparatus. The communication apparatus may be the first terminal device in any one of the ninth aspect or the possible designs of the ninth aspect, or a chip that implements a function of the first terminal device. The communication apparatus includes a corresponding module, unit, or means (means) for implementing the foregoing method. The module, unit, or means may be implemented by hardware, software, or hardware by executing corresponding software. The hardware or the software includes one or more modules or units corresponding to the foregoing function.

The communication apparatus includes a receiving unit, a processing unit, and a sending unit. The receiving unit is configured to receive first information from a second terminal device. The first information indicates time corresponding to a reference DF on a second clock, and the second clock is a timing clock on a second terminal device side. The processing unit is configured to implement clock synchronization with the second terminal device based on the first information.

In a possible design, the first information is carried in a sidelink RRC message. Alternatively, the first information is carried in second-stage sidelink control information SCI.

In a possible design, the first information further includes at least one of the following:

In a first item, time type information. The time type information indicates a type of the time corresponding to the reference DF on the second clock.

In a second item, uncertainty information. The uncertainty information indicates an error of the time corresponding to the reference DF on the second clock.

In a possible design, the sending unit is configured to send a request message to the second terminal device. The request message is for requesting the first information.

According to a twentieth aspect, an embodiment of this application provides a communication apparatus. The communication apparatus may be the first terminal device in any one of the tenth aspect or the possible designs of the tenth aspect, or a chip that implements a function of the first terminal device. The communication apparatus includes a corresponding module, unit, or means (means) for implementing the foregoing method. The module, unit, or means may be implemented by hardware, software, or hardware by executing corresponding software. The hardware or the software includes one or more modules or units corresponding to the foregoing function.

The communication apparatus includes a receiving unit, a processing unit, and a sending unit. The sending unit is configured to send first reference information to a second terminal device. The first reference information corresponds to a first resource. The receiving unit is configured to receive second reference information and second indication information from the second terminal device. The second reference information corresponds to a second resource, the second indication information indicates second time and third time, the second time is time of a boundary of the first resource on a second clock, the third time is time of a boundary of the second resource on the second clock, and the second clock is a timing clock on a second terminal device side. The processing unit is configured to determine first time and fourth time. The first time is time of the boundary of the first resource on a first clock, the fourth time is time of the boundary of the second resource on the first clock, and the first clock is a timing clock on a communication apparatus side. The processing unit is further configured to determine a transmission latency based on the first time, the second time, the third time, and the fourth time.

In a possible design, the processing unit is further configured to compensate for clock synchronization with the second terminal device based on the transmission latency.

In a possible design, the sending unit is further configured to send the transmission latency to the second terminal device. The transmission latency is used by the second terminal device to compensate for clock synchronization with the communication apparatus. Alternatively, the transmission latency is used by the second terminal device to compensate for clock synchronization with the network device, and the communication apparatus provides a relay service for the second terminal device.

In a possible design, the processing unit is further configured to compensate for clock synchronization with the network device based on the transmission latency. The second terminal device provides a relay service for the communication apparatus.

In a possible design, the first reference information is a first reference signal RS sent by the communication apparatus on a PC5 interface, and the second reference information is a second RS sent by the second terminal device on the PC5 interface.

In a possible design, the sending unit is further configured to send first bandwidth information to the network device. The first bandwidth information indicates a bandwidth of the first RS.

In a possible design, the bandwidth of the first RS is configured by the network device.

In a possible design, the sending unit is further configured to send a service request SR to the network device. The SR is for requesting the first resource, and the first resource is used to transmit the first RS.

In a possible design, the sending unit is further configured to send sidelink control information SCI to the second terminal device. The SCI indicates that the first resource does not carry a media access control protocol data unit MAC PDU.

In a possible design, the sending unit is further configured to send second bandwidth information to the second terminal device. The second bandwidth information indicates the bandwidth of the first RS.

In a possible design, the second bandwidth information is carried in first-stage SCI, or the second bandwidth information is carried in second-stage SCI.

In a possible design, the receiving unit is further configured to receive third bandwidth information from the second terminal device. The third bandwidth information indicates a bandwidth of the second RS.

In a possible design, the third bandwidth information is carried in first-stage SCI, or the third bandwidth information is carried in second-stage SCI.

In a possible design, the sending unit is further configured to send first indication information to the second terminal device. The first indication information indicates the first time.

According to a twenty-first aspect, an embodiment of this application provides a communication apparatus, including a processor and a memory, where the memory is configured to store computer instructions, and when the processor executes the instructions, the communication apparatus is enabled to perform the method performed by the first terminal device in any one of the foregoing aspects or the possible designs of the foregoing aspects. The communication apparatus may be the first terminal device in any one of the first aspect or the possible designs of the first aspect, or may be the first terminal device in any one of the second aspect or the possible designs of the second aspect, or may be the first terminal device in any one of the third aspect or the possible designs of the third aspect, or may be the first terminal device in any one of the ninth aspect or the possible designs of the ninth aspect, or may be the first terminal device in any one of the tenth aspect or the possible designs of the tenth aspect, or a chip that implements a function of the first terminal device.

According to a twenty-second aspect, an embodiment of this application provides a communication apparatus, including a processor, where the processor is coupled to a memory, and is configured to read and execute instructions in the memory, so that the communication apparatus performs the method performed by the first terminal device in any one of the foregoing aspects or the possible designs of the foregoing aspects. The communication apparatus may be the first terminal device in any one of the first aspect or the possible designs of the first aspect, or may be the first terminal device in any one of the second aspect or the possible designs of the second aspect, or may be the first terminal device in any one of the third aspect or the possible designs of the third aspect, or may be the first terminal device in any one of the ninth aspect or the possible designs of the ninth aspect, or may be the first terminal device in any one of the tenth aspect or the possible designs of the tenth aspect, or a chip that implements a function of the first terminal device.

According to a twenty-third aspect, an embodiment of this application provides a chip, including a processing circuit and an input/output interface. The input/output interface is configured to communicate with a module outside the chip. For example, the chip may be a chip that implements a function of the first terminal device in any one of the first aspect or the possible designs of the first aspect. The processing circuit is configured to run a computer program or instructions, to implement the method in any one of the first aspect or the possible designs of the first aspect. For another example, the chip may be a chip that implements a function of the first terminal device in any one of the second aspect or the possible designs of the second aspect. The processing circuit is configured to run a computer program or instructions, to implement the method in any one of the second aspect or the possible designs of the second aspect. For another example, the chip may be a chip that implements a function of the first terminal device in any one of the third aspect or the possible designs of the third aspect. The processing circuit is configured to run a computer program or instructions, to implement the method in any one of the third aspect or the possible designs of the third aspect. For another example, the chip may be a chip that implements a function of the first terminal device in any one of the ninth aspect or the possible designs of the ninth aspect. The processing circuit is configured to run a computer program or instructions, to implement the method in any one of the ninth aspect or the possible designs of the ninth aspect. For another example, the chip may be a chip that implements a function of the first terminal device in any one of the tenth aspect or the possible designs of the tenth aspect. The processing circuit is configured to run a computer program or instructions, to implement the method in any one of the tenth aspect or the possible designs of the tenth aspect.

According to a twenty-fourth aspect, an embodiment of this application provides a communication apparatus, including a processor and a memory, where the memory is configured to store computer instructions, and when the processor executes the instructions, the communication apparatus is enabled to perform the method performed by the second terminal device in any one of the foregoing aspects or the possible designs of the foregoing aspects. The communication apparatus may be the second terminal device in any one of the fourth aspect or the possible designs of the fourth aspect, or may be the second terminal device in any one of the fifth aspect or the possible designs of the fifth aspect, or a chip that implements a function of the second terminal device.

According to a twenty-fifth aspect, an embodiment of this application provides a communication apparatus, including a processor, where the processor is coupled to a memory, and is configured to read and execute instructions in the memory, so that the communication apparatus performs the method performed by the second terminal device in any one of the foregoing aspects or the possible designs of the foregoing aspects. The communication apparatus may be the second terminal device in any one of the fourth aspect or the possible designs of the fourth aspect, or may be the second terminal device in any one of the fifth aspect or the possible designs of the fifth aspect, or a chip that implements a function of the second terminal device.

According to a twenty-sixth aspect, an embodiment of this application provides a chip, including a processing circuit and an input/output interface. The input/output interface is configured to communicate with a module outside the chip. For example, the chip may be a chip that implements a function of the second terminal device in any one of the fourth aspect or the possible designs of the fourth aspect. The processing circuit is configured to run a computer program or instructions, to implement the method in any one of the fourth aspect or the possible designs of the fourth aspect. For another example, the chip may be a chip that implements a function of the second terminal device in any one of the fifth aspect or the possible designs of the fifth aspect. The processing circuit is configured to run a computer program or instructions, to implement the method in any one of the fifth aspect or the possible designs of the fifth aspect.

According to a twenty-seventh aspect, an embodiment of this application provides a communication apparatus, including a processor and a memory, where the memory is configured to store computer instructions, and when the processor executes the instructions, the communication apparatus is enabled to perform the method performed by the network device in any one of the foregoing aspects or the possible designs of the foregoing aspects. The communication apparatus may be the network device in any one of the sixth aspect or the possible designs of the sixth aspect, or may be the network device in any one of the seventh aspect or the possible designs of the seventh aspect, or may be the network device in any one of the eighth aspect or the possible designs of the eighth aspect, or may be a chip that implements a function of the network device.

According to a twenty-eighth aspect, an embodiment of this application provides a communication apparatus, including a processor, where the processor is coupled to a memory, and is configured to read and execute instructions in the memory, so that the communication apparatus performs the method performed by the network device in any one of the foregoing aspects or the possible designs of the foregoing aspects. The communication apparatus may be the network device in any one of the sixth aspect or the possible designs of the sixth aspect, or may be the network device in any one of the seventh aspect or the possible designs of the seventh aspect, or may be the network device in any one of the eighth aspect or the possible designs of the eighth aspect, or may be a chip that implements a function of the network device.

According to a twenty-ninth aspect, an embodiment of this application provides a chip, including a processing circuit and an input/output interface. The input/output interface is configured to communicate with a module outside the chip. For example, the chip may be a chip that implements a function of the network device in any one of the sixth aspect or the possible designs of the sixth aspect. The processing circuit is configured to run a computer program or instructions, to implement the method in any one of the sixth aspect or the possible designs of the sixth aspect. For another example, the chip may be a chip that implements a function of the network device in any one of the seventh aspect or the possible designs of the seventh aspect. The processing circuit is configured to run a computer program or instructions, to implement the method in any one of the seventh aspect or the possible designs of the seventh aspect. For another example, the chip may be a chip that implements a function of the network device in any one of the eighth aspect or the possible designs of the eighth aspect. The processing circuit is configured to run a computer program or instructions, to implement the method in any one of the eighth aspect or the possible designs of the eighth aspect.

According to a thirtieth aspect, an embodiment of this application provides a computer-readable storage medium. The computer-readable storage medium stores instructions, and when the instructions are run on a computer, the computer is enabled to perform the method in any one of the foregoing aspects.

According to a thirty-first aspect, an embodiment of this application provides a computer program product including instructions. When the computer program product runs on a computer, the computer is enabled to perform the method in any one of the foregoing aspects.

According to a thirty-second aspect, an embodiment of this application provides a circuit system. The circuit system includes a processing circuit, and the processing circuit is configured to perform the method in any one of the foregoing aspects.

According to a thirty-third aspect, an embodiment of this application provides a communication system. The communication system includes the terminal device and the network device in any one of the foregoing aspects.

For technical effects brought by any design of the eleventh aspect to the thirty-third aspect, refer to beneficial effects in the corresponding methods provided above. Details are not described herein again.

DESCRIPTION OF EMBODIMENTS

Figure 1:
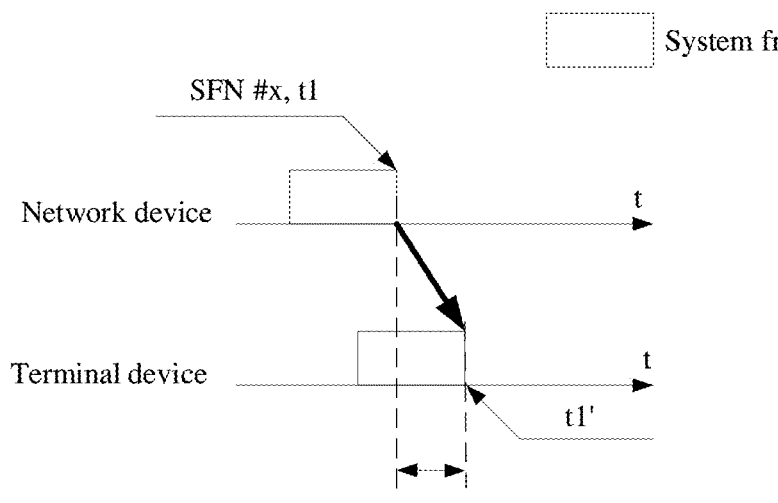
FIG. 1 is a schematic diagram of a scenario of a transmission latency according to an embodiment of this application.

In the specification and accompanying drawings of this application, the terms "first", "second", and the like are intended to distinguish between different objects or distinguish between different processing of a same object, but do not indicate a particular order of the objects. In addition, the terms "including", "having", or any other variant thereof in descriptions of this application are intended to cover non-exclusive inclusion. For example, a process, a method, a system, a product, or a device that includes a series of steps or units is not limited to the listed steps or units, but optionally further includes another unlisted step or unit, or optionally further includes another inherent step or unit of the process, the method, the product, or the device. In embodiments of this application, "a plurality of" includes two or more. In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

First, technical terms in this application are described.

1. Sidelink (SL) and Sidelink Control Information (SCI)

The sidelink is a link for direct communication between two terminal devices.

The SCI indicates data scheduling information such as time-frequency resource information and a modulation and coding scheme of user data. The user data is transmitted through a sidelink shared channel (PSSCH). For example, in an SL communication process, before a sending terminal device sends a PSSCH to a receiving terminal device, the sending terminal device first sends SCI to the receiving terminal device. The SCI includes time-frequency resource information, a modulation and coding scheme, and the like of user data, so that the receiving terminal device receives the user data from the sending terminal device based on content indicated by the SCI.

There may be a plurality of types of SCI. For example, SCI types include first-stage SCI and second-stage SCI.

The first-stage SCI is transmitted through a sidelink control channel (PSCCH). The first-stage SCI is used to schedule the PSSCH. The first-stage SCI is further used to schedule the second-stage SCI transmitted on the PSSCH. The second-stage SCI is used for PSSCH decoding and related physical layer processes such as a hybrid automatic repeat request (HARQ) feedback process.

2. Communication Between Terminal Devices

In a scenario of communication between terminal devices, two terminal devices may directly communicate with each other through a PC5 interface, and user plane data does not pass through a network device, to reduce a communication latency.

In a sidelink communication process, a manner of clock synchronization between the two terminal devices includes one of the following:

In a first manner, a terminal device directly receives an SL synchronization signal from a peer end, and implements clock synchronization based on the SL synchronization signal.

In a second manner, the two terminal devices are respectively synchronized with respective synchronization sources, to implement clock synchronization between the two terminal devices. The synchronization source may be a global navigation satellite system (GNSS), or may be a serving base station.

The scenario of communication between the terminal devices may also be described as a non-relay (relay) PC5 communication scenario. In embodiments of this application, communication between the terminal devices is used as an example for description.

3. User Equipment-to-Network (U2N)

The U2N is implemented by using a layer2-based (layer2-base, layer2-based) relay technology. In a U2N scenario, a base station communicates with a relay terminal device through a Uu interface, and the relay terminal device communicates with a remote (remote) terminal device through a PC5 interface. The remote terminal device may establish a connection to the base station via the relay terminal device, and perform data transmission. In the U2N scenario, the relay terminal device provides a relay service for the remote terminal device, to improve cell coverage. The remote terminal device may also be described as a long-distance terminal device. In embodiments of this application, the remote terminal device is used as an example for description. The U2N scenario may also be described as a UE-to-Network relay scenario. A frame transmitted through the PC5 interface is described as a direct frame (DF). A number of the DF on the PC5 interface is described as a direct frame number (DFN). A frame transmitted through the Uu interface is described as a system frame (SF). A number of the SF on the Uu interface is described as a system frame number (SFN).

4. Timing Advance (TA)

In a scenario in which a terminal device directly communicates with a network device, the TA is determined by the terminal device through a random access procedure between the terminal device and the network device. The network device may control, by properly controlling a TA of each terminal device, time at which uplink signals from different terminal devices reach the network device. For a terminal device that is far away from the network device, because of a large transmission latency, the terminal device needs to send an uplink signal in advance compared with a terminal device that is close to the network device. In other words, a TA corresponding to the terminal device that is far away from the network device is greater than a TA corresponding to the terminal device that is close to the network device.

For example, a transmission latency is described below. The system frame is used as an example, and time determined by the network device is different from time determined by the terminal device. As shown in FIG. 1, a system frame is used as an example. A system frame number (SFN) corresponding to the frame is an SFN #x. The network device determines, based on a clock maintained by the network device, that time of a lower boundary of the frame is t1. The terminal device determines, based on a clock maintained by the terminal device, that time of the lower boundary of the frame is t1', which is different from t1. Therefore, after clock synchronization is implemented between the terminal device and the network device, the terminal device may use TA/2 to compensate for a synchronization clock between the terminal device and the network device, to further improve clock precision. For example, after the network device indicates to the terminal device that the time of the lower boundary of the frame on the network-side clock is t1, the terminal device uses (t1+TA/2) as the time of the lower boundary of the frame. A process of clock synchronization between the terminal device and the network device is implemented based on a reference SF.

5. Clock Synchronization Based on the Reference SF

In a wireless communication system, the terminal device implements SF synchronization with the network device based on a synchronization signal and physical broadcast channel block (SSB) provided by the network device. Then, the terminal device implements clock synchronization with the network device based on a system information block (SIB) 9 or a downlink information transfer (DL Information Transfer) message provided by the network device. The SIB 9 and the DL information transfer message indicate time of a lower boundary of the reference SF on a network-side clock. Details are as follows:

Manner 1: Clock synchronization is implemented based on the SIB 9.

Figure 2A:
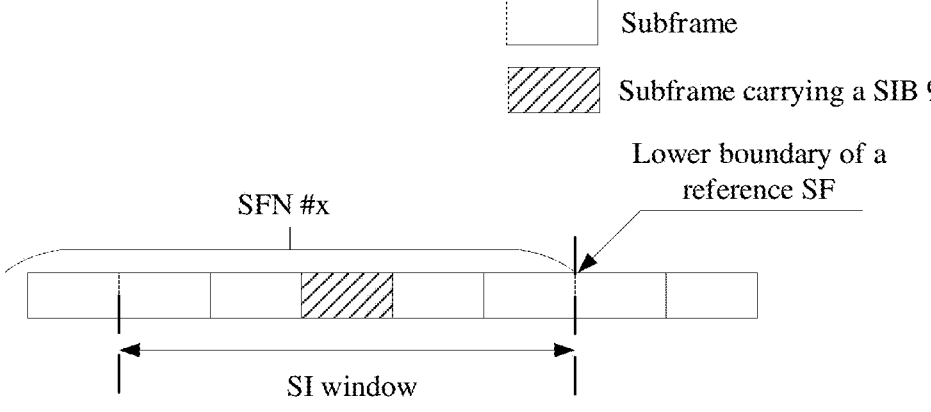
FIG. 2a is a schematic diagram of a scenario of a clock synchronization method according to an embodiment of this application.
Figure 2B:
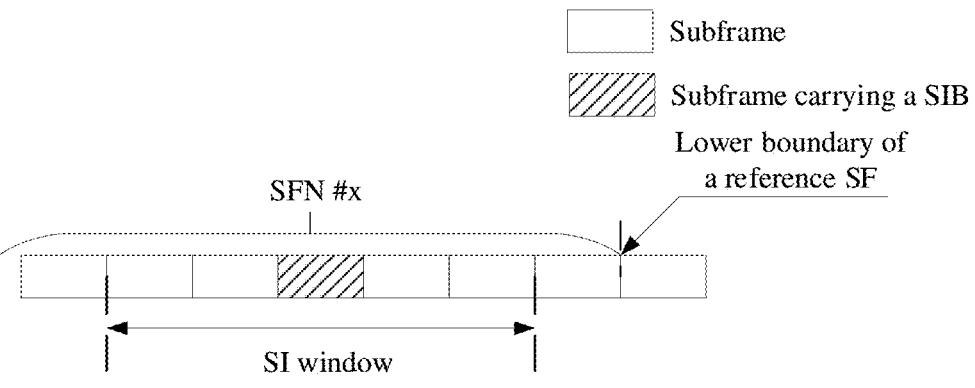
FIG. 2b is a schematic diagram of a scenario of another clock synchronization method according to an embodiment of this application.

The SIB 9 includes reference time information. The reference time information indicates the time of the lower boundary of the reference SF on the network-side clock. The lower boundary of the reference SF may be a boundary of an SF in which an end boundary of a system information (SI) window to which the SIB 9 belongs is located, as shown in FIG. 2a. The lower boundary of the reference SF may alternatively be an SF boundary after an end boundary of an SI window to which the SIB 9 belongs, as shown in FIG. 2b. In each of FIG. 2a and FIG. 2b, a system frame number corresponding to the reference SF is an SFN #x.

Optionally, the reference time information further includes at least one of the following:

In a first item, time type information. The time type information indicates a type of time, and the type of time is a type of the time indicated by the reference time information. For example, the time type information indicates that the type of time is a local clock. In other words, the time indicated by the reference time information is time of a synchronization source relative to local start time. Alternatively, the reference time information does not carry the time type information. In this case, the time indicated by the reference time information is global positioning system (GPS) time, and is relative to GPS start time.

In a second item, uncertainty information. The uncertainty information indicates uncertainty of time, and indicates uncertainty of the time indicated by the reference time information. In other words, the uncertainty information indicates an error of the time indicated by the reference time information.

Manner 2: Clock synchronization is implemented based on the DL information transfer message.

Figures 2C, 2D, 3:
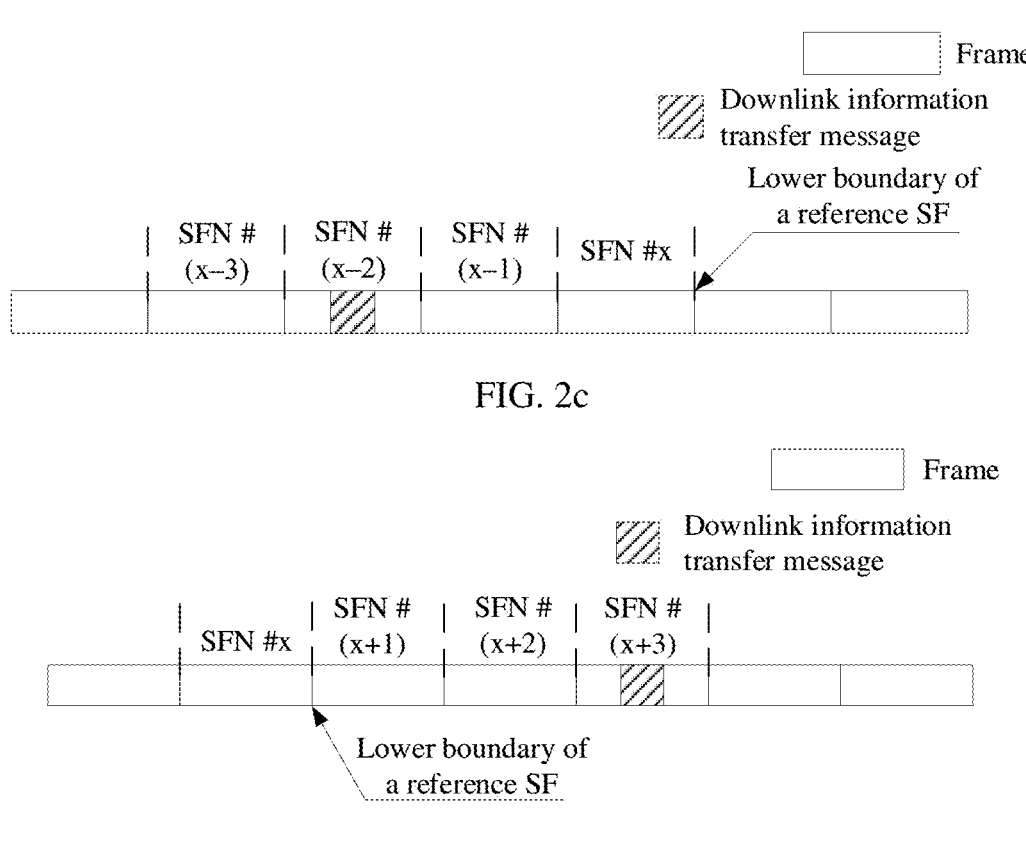
FIG. 2c is a schematic diagram of a scenario of still another clock synchronization method according to an embodiment of this application.
FIG. 2d is a schematic diagram of a scenario of still another clock synchronization method according to an embodiment of this application.
FIG. 3 is a schematic diagram of an architecture of a communication system according to an embodiment of this application.

The DL information transfer message includes reference time information. The reference time information includes time information and a reference system frame number (SFN). The time information indicates the time of the lower boundary of the reference SF on the network-side clock. The reference SFN indicates the reference SF. For example, FIG. 2c and FIG. 2d show locations, in time domain, of the reference SF and an SF in which the downlink information transfer message is located. In FIG. 2c and FIG. 2d, the reference SFN is an SFN #x.

However, in the U2N scenario, the remote terminal device may be located outside signal coverage of the network device, and cannot learn of a transmission resource corresponding to the reference SF on Uu, and therefore cannot implement clock synchronization with the network device.

In view of this, embodiments of this application provide a clock synchronization method. The clock synchronization method in embodiments of this application is applicable to various communication systems. The clock synchronization method provided in embodiments of this application may be applied to a long term evolution (LTE) system, a fifth-generation (5G) communication network, another similar network, or another future network. FIG. 3 is a schematic diagram of an architecture of a communication system applicable to the clock synchronization method in embodiments of this application. The communication system may include a network device 300, a terminal device 310, and a terminal device 320. The terminal device 310 provides a relay service for the terminal device 320. The network device 300 communicates with the terminal device 310 through a Uu interface, and the terminal device 310 communicates with the terminal device 320 through a PC5 interface. The terminal device 320 establishes a connection to the network device 300 via the terminal device 310, and performs data transmission. FIG. 3 shows only one network device and two terminal devices. FIG. 3 is merely a schematic diagram, and does not constitute a limitation on an application scenario of the clock synchronization method in embodiments of this application.

The terminal device, also referred to as user equipment (UE), a mobile station (MS), a mobile terminal (MT), or the like, is a device that provides a voice/data connectivity for a user, for example, a handheld device or a vehicle-mounted device having a wireless connection function. The terminal device may be specifically a mobile phone (mobile phone), a tablet computer, a notebook computer, a palmtop computer, a mobile internet device (MID), a wearable device, a virtual reality (VR) device, an augmented reality (AR) device, a wireless terminal in industrial control (industrial control), a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), a terminal device in a 5G communication network or a communication network after 5G, or the like. This is not limited in embodiments of this application.

The network device is a device in a wireless communication network, for example, a radio access network (RAN) node that connects the terminal device to the wireless communication network. Currently, some RAN nodes are, for example, a next generation network node (gNB), a transmission reception point (TRP), an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a wireless fidelity (Wi-Fi) access point (AP), a network side device in a 5G communication network or a communication network after 5G, or the like.

Figure 4A:
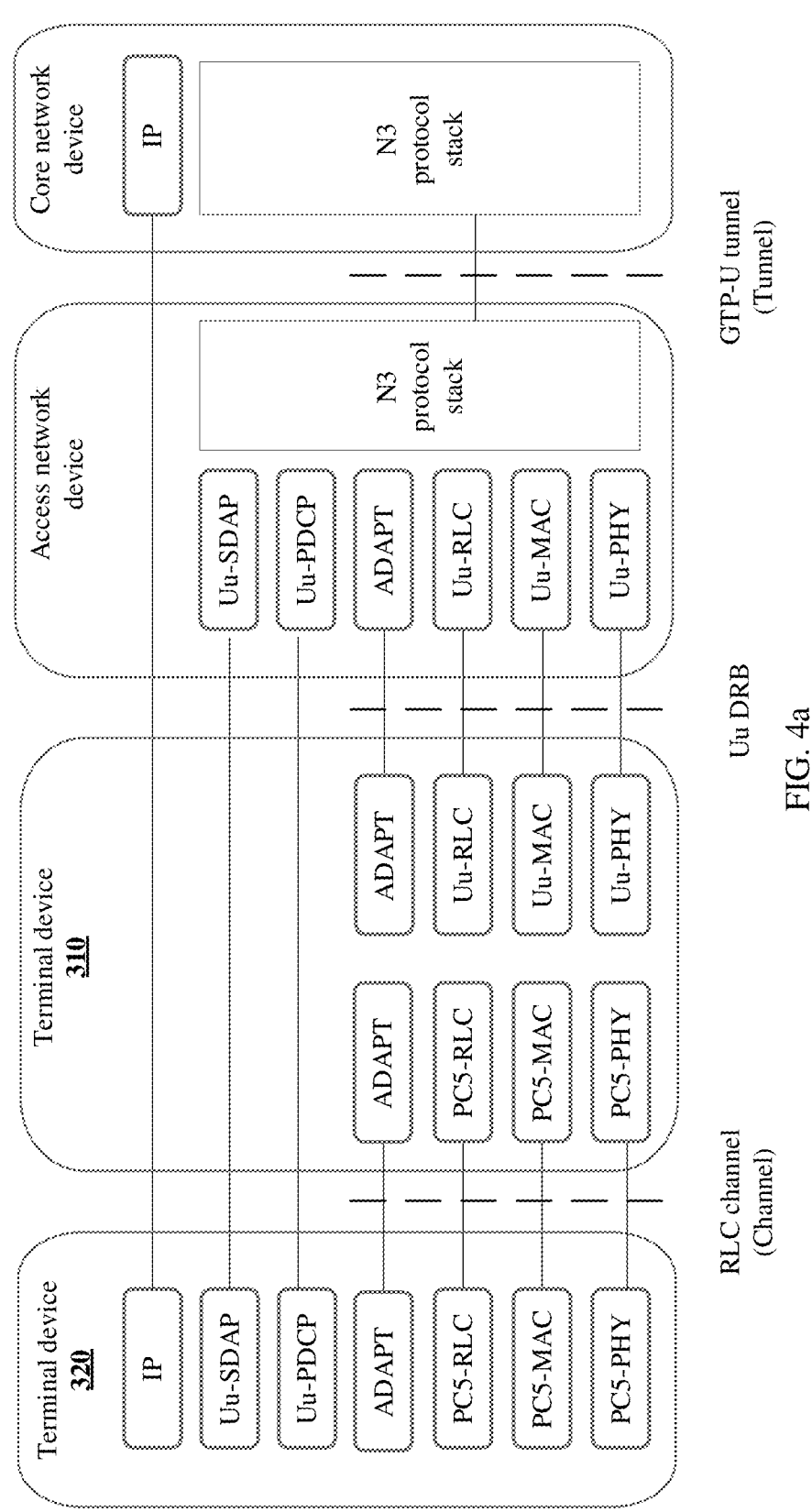
FIG. 4a is a diagram of a structure of a user plane protocol stack according to an embodiment of this application.

The following describes a protocol stack of the communication network shown in FIG. 3. The network device 300 may be an access network device in FIG. 4a or FIG. 4b. Refer to FIG. 4a. FIG. 4a shows user plane protocol stacks of the terminal device 320, the terminal device 310, the access network device, and a core network device. A protocol stack of the terminal device 320 includes an internet protocol (IP) layer, a service data adaptation protocol (SDAP) layer (also referred to as a Uu-SDAP layer), a packet data convergence protocol (PDCP) layer (also referred to as a Uu-PDCP layer), an adaptation (ADAPT) layer, a radio link control (RLC) layer (also referred to as a PC5-RLC layer), a media access control (MAC) layer (also referred to as a PC5-MAC layer), and a physical (PHY) layer (also referred to a PC5-PHY layer) from top to bottom. A protocol stack used by the terminal device 310 to communicate with the terminal device 320 includes an ADAPT layer, a PC5-RLC layer, a PC5-MAC layer, and a PC5-PHY layer from top to bottom. A protocol stack used by the terminal device 310 to communicate with the access network device includes an ADAPT layer, a Uu-RLC layer, a Uu-MAC layer, and a Uu-PHY layer from top to bottom. A protocol stack used by the access network device to communicate with the terminal device 320 includes a Uu-SDAP layer and a Uu-PDCP layer from top to bottom. A protocol stack used by the access network device to communicate with the terminal device 310 includes an ADAPT layer, a Uu-RLC layer, a Uu-MAC layer, and a Uu-PHY layer from top to bottom. A protocol stack used by the access network device to communicate with the core network device includes an N3 protocol stack. A protocol stack used by the core network device to communicate with the terminal device 320 includes an IP layer. A protocol stack used by the core network device to communicate with the access network device includes an N3 protocol stack.

Figure 4B:
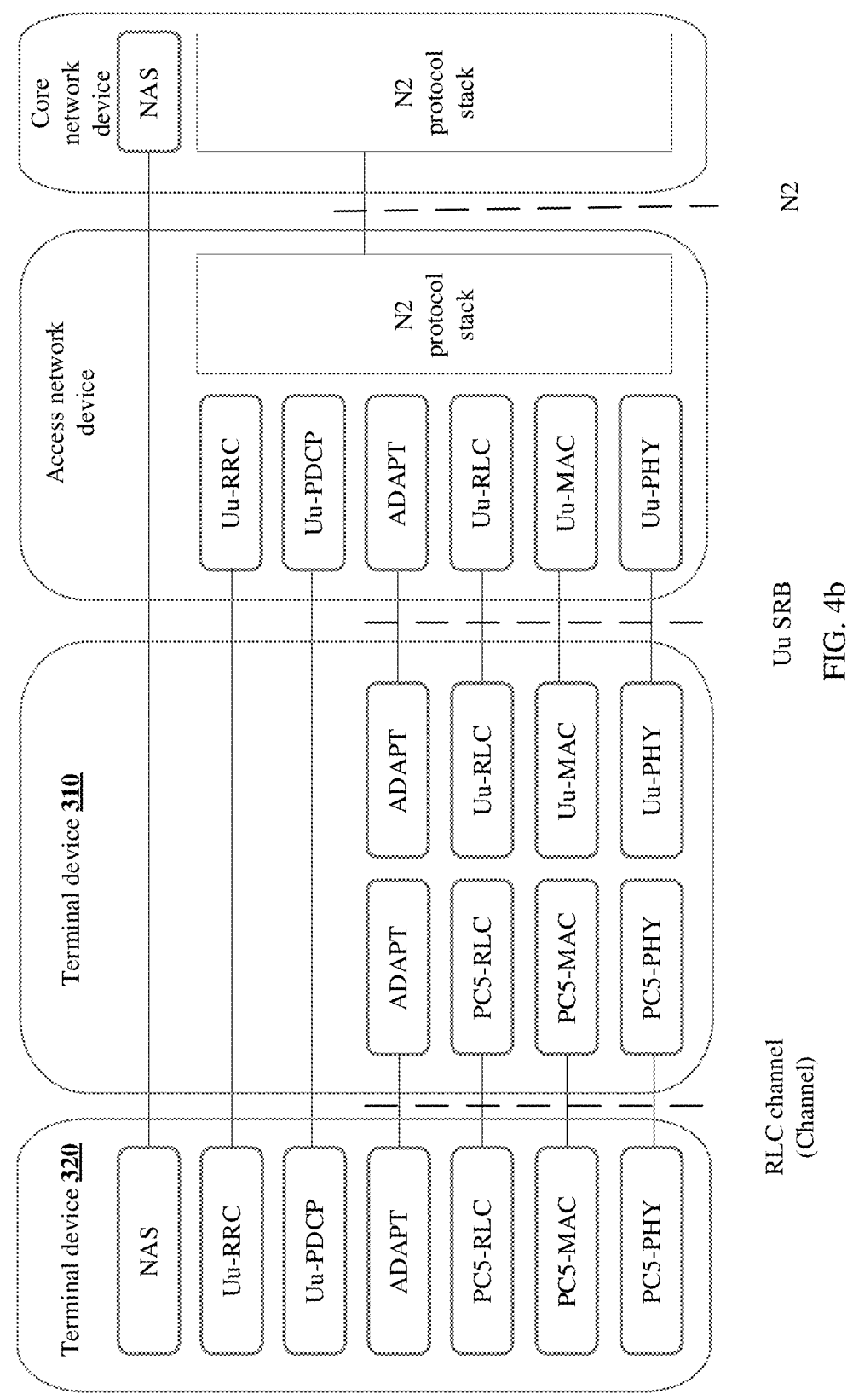
FIG. 4b is a diagram of a structure of a control plane protocol stack according to an embodiment of this application.

Refer to FIG. 4b. FIG. 4b shows control plane protocol stacks of the terminal device 320, the terminal device 310, the access network device, and a core network device. A protocol stack of the terminal device 320 includes a non-access stratum (NAS), a radio resource control (RRC) layer (also referred to as a Uu-RRC layer), a PDCP layer (also referred to as a Uu-PDCP layer), an ADAPT layer, an RLC layer (also referred to as a PC5-RLC layer), a MAC layer (also referred to as a PC5-MAC layer), and a PHY layer (also referred to as a PC5-PHY layer) from top to bottom. A protocol stack used by the terminal device 310 to communicate with the terminal device 320 includes an ADAPT layer, a PC5-RLC layer, a PC5-MAC layer, and a PC5-PHY layer from top to bottom. A protocol stack used by the terminal device 310 to communicate with the access network device includes an ADAPT layer, a Uu-RLC layer, a Uu-MAC layer, and a Uu-PHY layer from top to bottom. A protocol stack used by the access network device to communicate with the terminal device 320 includes a Uu-RRC layer and a Uu-PDCP layer from top to bottom. A protocol stack used by the access network device to communicate with the terminal device 310 includes an ADAPT layer, a Uu-RLC layer, a Uu-MAC layer, and a Uu-PHY layer from top to bottom. A protocol stack used by the access network device to communicate with the core network device includes an N2 protocol stack. A protocol stack used by the core network device to communicate with the terminal device 320 includes a NAS layer. A protocol stack used by the core network device to communicate with the access network device includes an N2 protocol stack.

The adaptation layer in FIG. 4a and FIG. 4b is used to support mapping of a plurality of Uu PDCP entities of the terminal device 320 to one SL RLC entity, that is, support N:1 mapping between a Uu data radio bearer (DRB) and an SL DRB of the terminal device 320. For example, to support a plurality of terminal devices 320 in accessing the access network device via a same terminal device 310, the adaptation layer exists between the terminal device 310 and the access network device. The adaptation layer includes identification information of the terminal device 320, and the identification information of the terminal device 320 may be allocated by the terminal device 310, or may be allocated by the access network device. In addition, a plurality of DRBs of one terminal device 320 may be mapped to one DRB of the terminal device 310. Therefore, the adaptation layer may further carry a DRB identifier of the terminal device 320.

It should be understood that the adaptation layer in FIG. 4a and FIG. 4b is optional. There may alternatively be no adaptation layer between the terminal device 320 and the terminal device 310.

The communication system and a service scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as a network architecture evolves and a new service scenario emerges.

The following describes in detail the clock synchronization method provided in embodiments of this application.

It should be noted that names of messages between network elements, names of parameters in the messages, or the like in the following embodiments of this application are merely examples, and may be other names in a specific implementation. Unified descriptions are provided herein and details are not described below again.

For the U2N scenario, embodiments of this application provide three clock synchronization methods (that is, the following first clock synchronization method 500, second clock synchronization method 800, and third clock synchronization method 900). A first terminal device is a remote terminal device in the U2N scenario, for example, the terminal device 320 in FIG. 3. A second terminal device is a relay terminal device in the U2N scenario, for example, the terminal device 310 in FIG. 3. In the U2N scenario, in a process of transmitting information X from a network device to the first terminal device, for example, that the network device sends the information X to the first terminal device and correspondingly, that the first terminal device receives the information X from the network device may be understood as that the network device sends the information X to the first terminal device via the second terminal device and correspondingly, the first terminal device receives the information X from the network device via the second terminal device. A specific implementation process includes two steps: Step 1: The network device sends the information X to the second terminal device. Correspondingly, the second terminal device receives the information X from the network device. Step 2: The second terminal device sends the information X to the first terminal device. Correspondingly, the first terminal device receives the information X from the second terminal device. The information X includes but is not limited to first time information (for example, information transmitted in S501 and S801), first reference information (for example, information transmitted in S505c and S804), or second time information (for example, information transmitted in S904). The following describes in detail the three clock synchronization methods provided in embodiments of this application.

A core idea of the first clock synchronization method provided in embodiments of this application is as follows: The second terminal device provides first reference information. The first reference information indicates a first reference DF, and the first reference DF corresponds to a reference SF. The first terminal device receives first time information and the first reference information. The first time information indicates time of a lower boundary of the reference SF on a network-side clock. In this way, even if the first terminal device cannot determine a transmission resource corresponding to the reference SF on Uu, the first reference information indicates the first reference DF corresponding to the reference SF, and the first reference DF is a transmission resource on PC5. Therefore, the first terminal device can implement clock synchronization with the network device based on the first reference DF indicated by the first reference information and the time indicated by the first time information.

Figure 5:
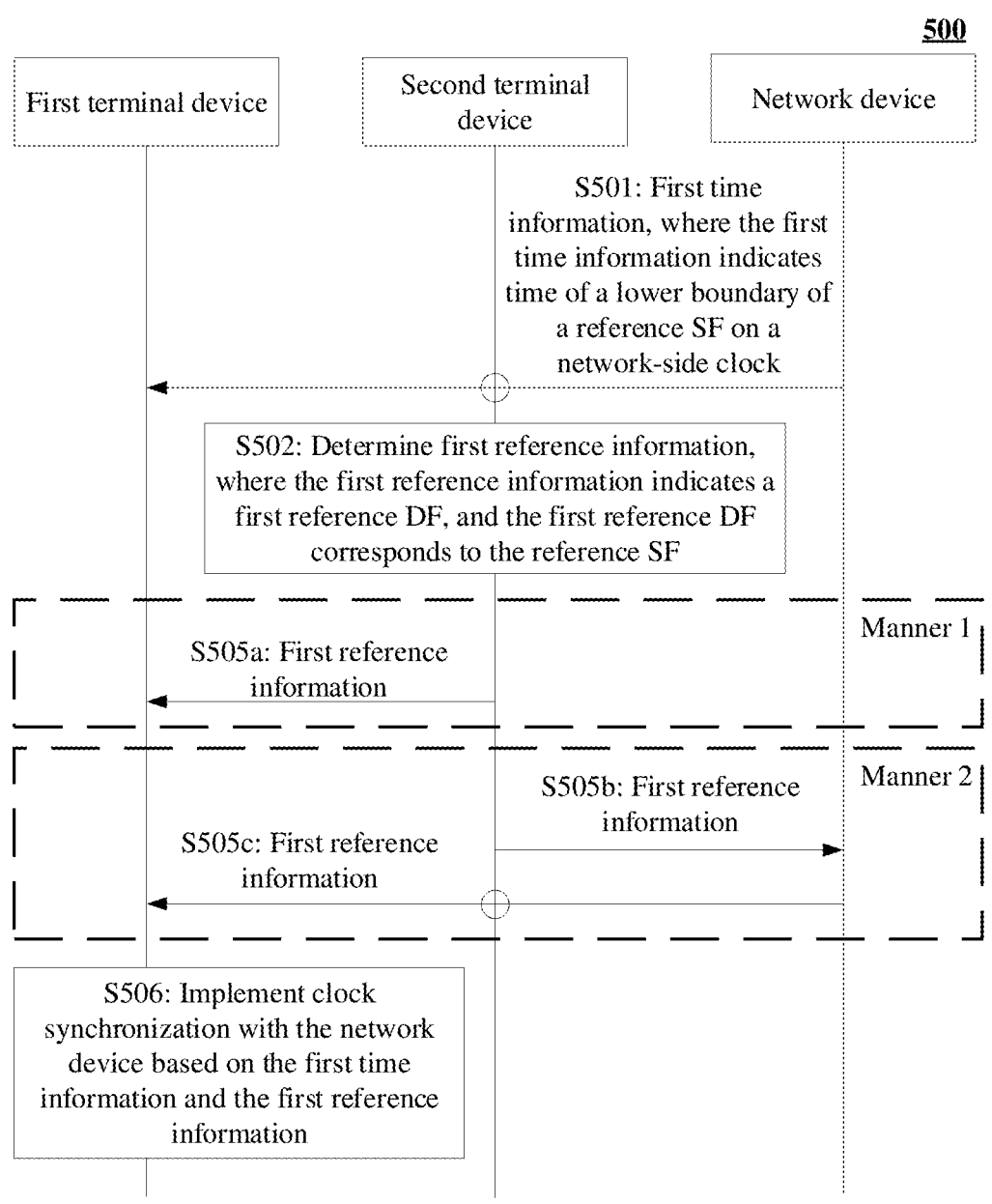
FIG. 5 is a schematic flowchart of a clock synchronization method according to an embodiment of this application.

As shown in FIG. 5, a first clock synchronization method 500 provided in an embodiment of this application includes the following steps.

S501: A network device sends first time information to a first terminal device. Correspondingly, the first terminal device receives the first time information from the network device.

The first time information indicates time of a lower boundary of a reference SF on a network-side clock. For example, the first time information may be reference time information in a SIB 9. For details, refer to the foregoing descriptions of "implementing clock synchronization based on the SIB 9". The first time information may alternatively be reference time information in a DL information transfer message. For details, refer to the foregoing descriptions of "implementing clock synchronization based on the DL information transfer message".

S502: A second terminal device determines first reference information.

The first reference information indicates at least a first reference DF. For example, the first reference information includes a reference DFN, and the reference DFN indicates the first reference DF.

The first reference DF meets the following two key points:

Key point 1: The first reference DF is transmitted through a PC5 interface, and the PC5 interface for transmitting the first reference DF is a communication interface between the first terminal device and the second terminal device.

Figure 6A:
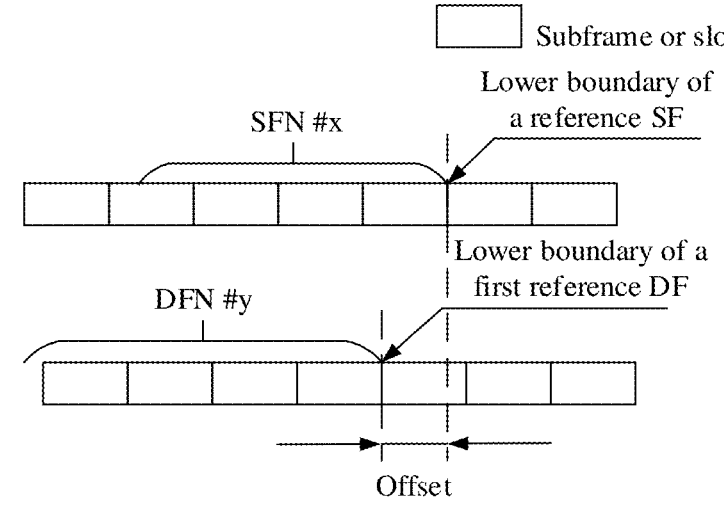
FIG. 6a is a schematic diagram of a scenario of another clock synchronization method according to an embodiment of this application.
Figure 6B:
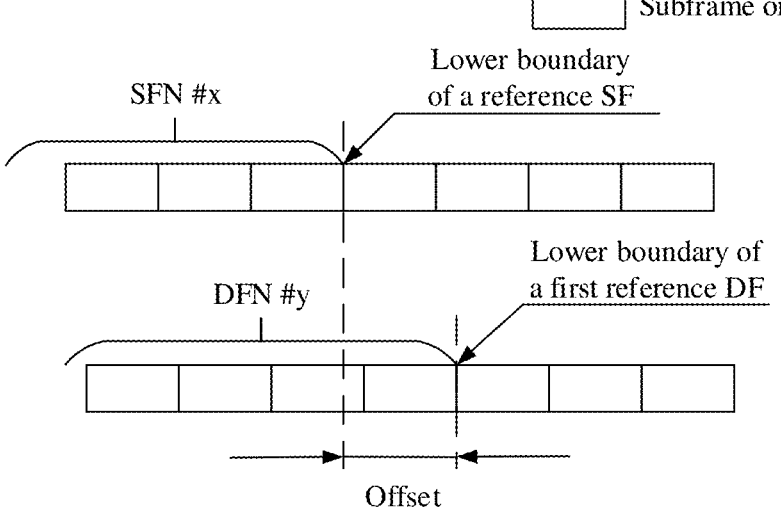
FIG. 6b is a schematic diagram of a scenario of another clock synchronization method according to an embodiment of this application.
Figures 6C, 6D:
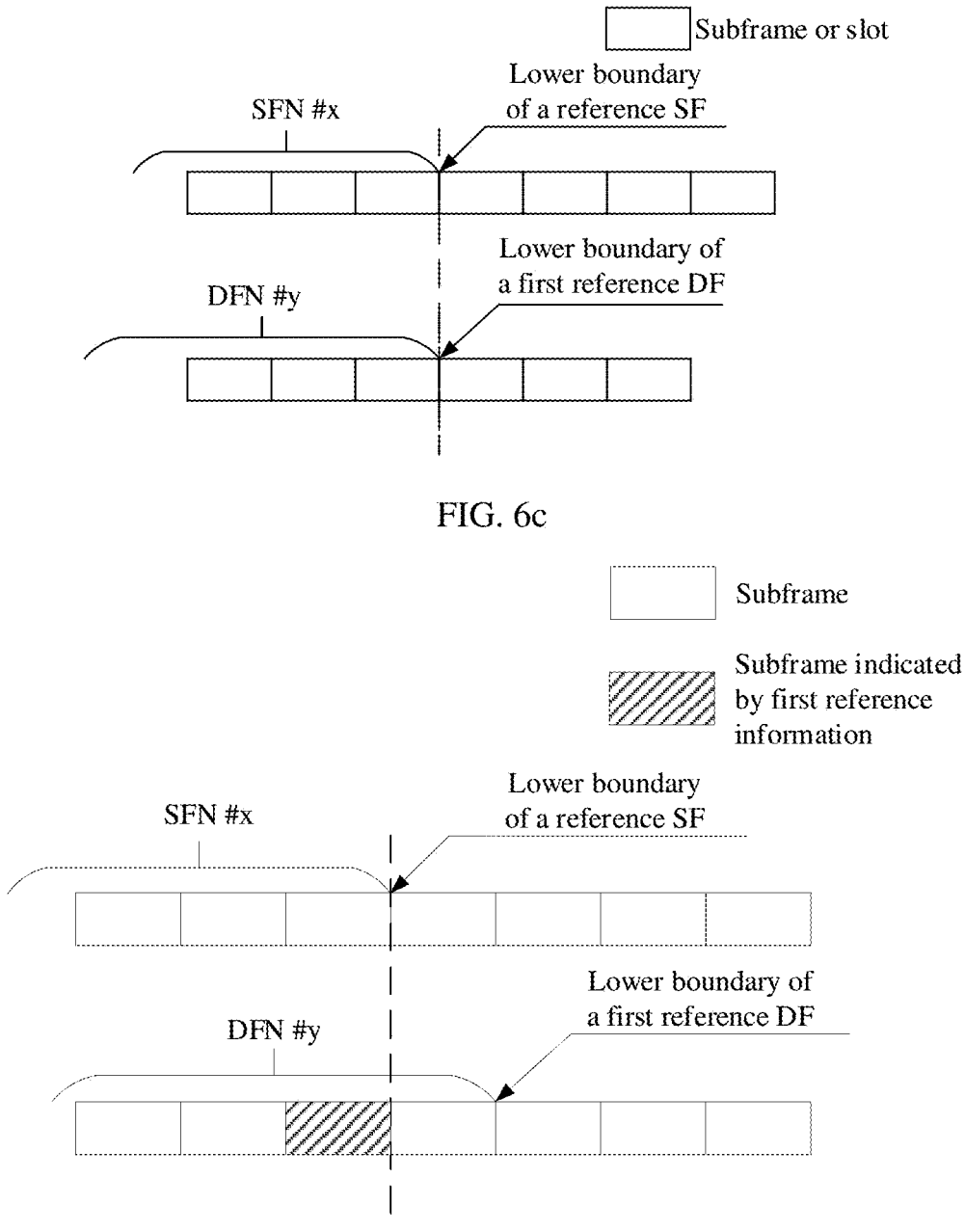
FIG. 6c is a schematic diagram of a scenario of still another clock synchronization method according to an embodiment of this application.
FIG. 6d is a schematic diagram of a scenario of still another clock synchronization method according to an embodiment of this application.

Key point 2: The first reference DF corresponds to the reference SF. The reference SF is the reference SF in S501. Corresponding specifically means a correspondence between the first reference DF and the reference SF in time domain. Corresponding may be understood as that the first reference DF is a DF whose lower boundary is closest to the lower boundary of the reference SF in time domain. In other words, in a plurality of DFs, the lower boundary of the first reference DF is closest to the lower boundary of the reference SF in time domain. In this case, the lower boundary of the first reference DF may be before the lower boundary of the reference SF, as shown in FIG. 6*a*. In FIG. 6*a*, the reference SF is an SF indicated by an SFN #x, the first reference DF is a DF indicated by a DFN #y, and a location relationship between the lower boundary of the first reference DF and the lower boundary of the reference SF in time domain is that shown in FIG. 6*a*. The lower boundary of the first reference DF may alternatively be after the lower boundary of the reference SF, as shown in FIG. 6*b*. The lower boundary of the first reference DF may alternatively be aligned with the lower boundary of the reference SF, as shown in FIG. 6*c*. Alternatively, corresponding may be understood as that the lower boundary of the first reference DF is aligned with the lower boundary of the reference SF, as shown in FIG. 6*c*; or the first reference DF is before the lower boundary of the reference SF and is closest to the lower boundary of the reference SF, as shown in FIG. 6*a*; or the first reference DF is after the lower boundary of the reference SF and is closest to the lower boundary of the reference SF, as shown in FIG. 6*b*.

Optionally, the first reference information further includes at least one of the following:

In a first item, offset information 1. The offset information 1 indicates an offset between the lower boundary of the first reference DF and the lower boundary of the reference SF. A unit of the offset includes one of the following: a subframe, a slot, a nanosecond, or the like. For example, a system frame number of the reference SF is the SFN #x, a direct frame number of the first reference DF is the DFN #y, and the offset between the lower boundary of the first reference DF and the lower boundary of the reference SF is that shown in FIG. 6*a* or FIG. 6*b*.

Figure 6E:
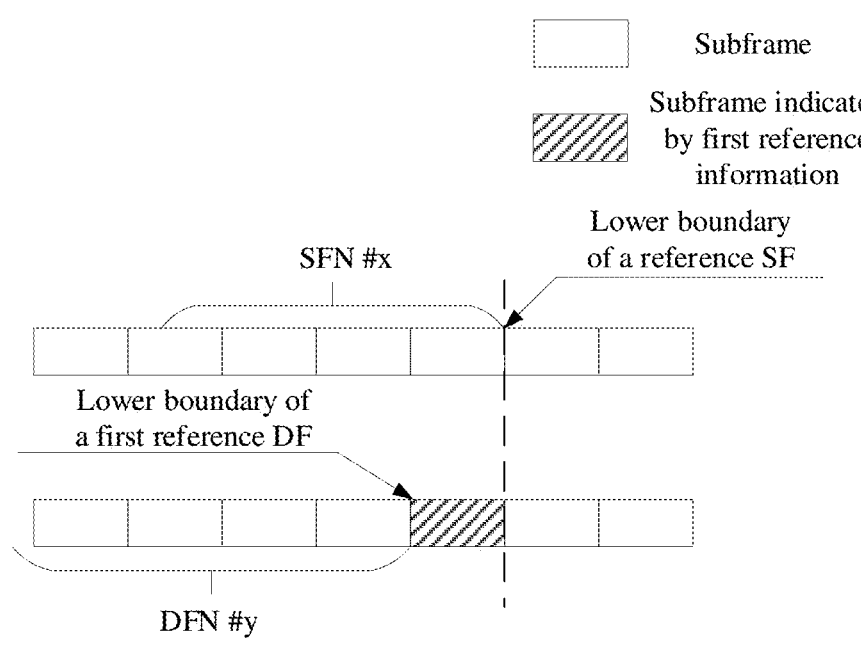
FIG. 6e is a schematic diagram of a scenario of still another clock synchronization method according to an embodiment of this application.
Figure 6F:
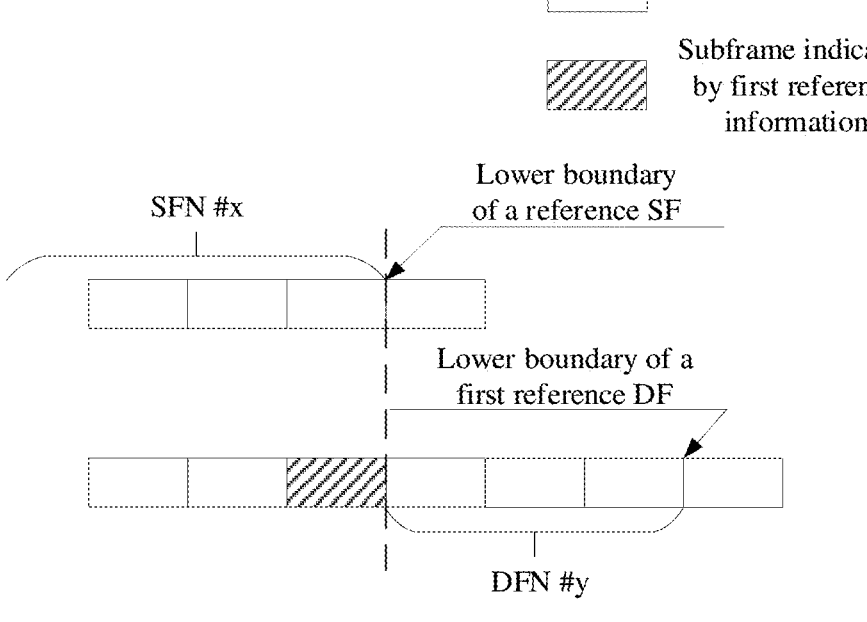
FIG. 6f is a schematic diagram of a scenario of still another clock synchronization method according to an embodiment of this application.

In a second item, information about a time domain resource unit. A location of the time domain resource unit meets one of the following: before the first reference DF (as shown in FIG. 6*f*), in the first reference DF (as shown in FIG. 6*d*), or after the first reference DF (as shown in FIG. 6*e*).

The time domain resource unit includes at least one of the following: a slot (not shown in FIG. 6*d* to FIG. 6*h*) or a subframe (shown in FIG. 6*d* to FIG. 6*h*).

The time domain resource unit meets one of the following preset conditions (preset conditions 1 to 4):

Preset condition 1: The lower boundary of the time domain resource unit is aligned with the lower boundary of the reference SF. In other words, the lower boundary of the reference SF is aligned with a lower boundary of a subframe, or the lower boundary of the reference SF is aligned with a lower boundary of a slot. For example, a subframe is used as an example in FIG. 6*d*, FIG. 6*e*, and FIG. 6*f* to show a location relationship between the subframe indicated by the first reference information and the reference SF in time domain. For example, in FIG. 6*d*, the first reference information further indicates a subframe, and the subframe is a subframe in the direct frame indicated by the DFN #y, as shown by a grid filled with slashes. The lower boundary of the reference SF indicated by the reference SFN #x is aligned with the lower boundary of the subframe indicated by the first reference information. For another example, in FIG. 6*e*, the first reference information further indicates a subframe, and the subframe is a subframe after the direct frame indicated by the DFN #y, as shown by a grid filled with slashes. The lower boundary of the reference SF indicated by the reference SFN #x is aligned with the lower boundary of the subframe indicated by the first reference information. For still another example, in FIG. 6*f*, the first reference information further indicates a subframe, and the subframe is a subframe before the direct frame indicated by the DFN #y, as shown by a grid filled with slashes. The lower boundary of the reference SF indicated by the reference SFN #x is aligned with the lower boundary of the subframe indicated by the first reference information.

Preset condition 2: An offset between a lower boundary of the time domain resource unit and the lower boundary of the reference SF is minimum. In other words, in a plurality of time domain resource units, the lower boundary of the time domain resource unit indicated by the first reference information is closest to the lower boundary of the reference SF in time domain. In this case, the lower boundary of the time domain resource unit indicated by the first reference information may be before the lower boundary of the reference SF, as shown in FIG. 6*g*, or may be after the lower boundary of the reference SF, as shown in FIG. 6*h*.

Figures 6G, 6H:
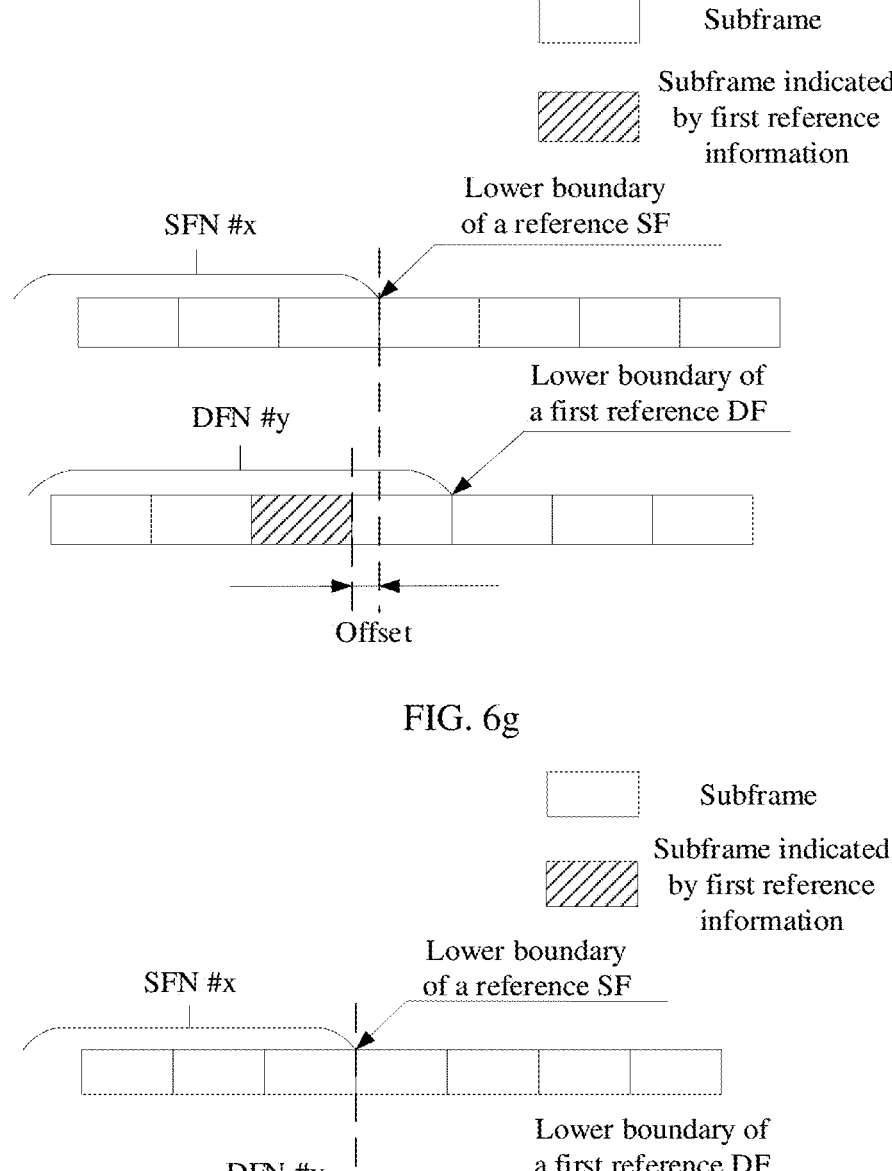
FIG. 6g is a schematic diagram of a scenario of still another clock synchronization method according to an embodiment of this application.
FIG. 6h is a schematic diagram of a scenario of still another clock synchronization method according to an embodiment of this application.

It should be noted that in FIG. 6*g* and FIG. 6*h*, an example in which the time domain resource unit indicated by the first reference information is in the first reference DF is merely used for description. Certainly, the time domain resource unit indicated by the first reference information may alternatively be before the first reference DF or after the first reference DF, which is not shown in FIG. 6*g* and FIG. 6*h*.

Preset condition 3: A lower boundary of the time domain resource unit is before the lower boundary of the reference SF, and an offset between the lower boundary of the time domain resource unit and the lower boundary of the reference SF is minimum. For example, in FIG. 6*g*, the first reference information further indicates a subframe, as shown by a grid filled with slashes. The lower boundary of the subframe is before the lower boundary of the reference SF indicated by the reference SFN #x, and the offset between the lower boundary of the subframe and the lower boundary of the reference SF is minimum.

Preset condition 4: A lower boundary of the time domain resource unit is after the lower boundary of the reference SF, and an offset between the lower boundary of the time domain resource unit and the lower boundary of the reference SF is minimum. For example, in FIG. 6*h*, the first reference information further indicates a subframe, as shown by a grid filled with slashes. The lower boundary of the subframe is after the lower boundary of the reference SF indicated by the reference SFN #x, and the offset between the lower boundary of the subframe and the lower boundary of the reference SF is minimum.

In a third item, offset information 2. The offset information 2 indicates the offset between the lower boundary of the time domain resource unit and the lower boundary of the reference SF. A unit of the offset may be nanosecond. For example, the system frame number of the reference SF is still the SFN #x, the direct frame number of the first reference DF is the DEN #y, and the offset between the lower boundary of the subframe indicated by the first reference information and the lower boundary of the reference SF is that shown in FIG. 6*g* or FIG. 6*h*.

For example, whether the first reference information carries the foregoing three pieces of information (that is, in the first item, the offset information 1; in the second item, the information about the time domain resource unit; and in the third item, the offset information 2) is described.

Case 1: At a frame granularity, if the lower boundary of the reference SF is aligned with the lower boundary of the first reference DF, the first reference information includes the reference DFN. In other words, the first reference information does not include the offset information 1, the offset information 2, or the information about the time domain resource unit. On the contrary, if the lower boundary of the reference SF is not aligned with the lower boundary of the first reference DF, the first reference information may further include the offset information 1 or the offset information 2 in addition to the reference DFN.

Case 2: At a subframe granularity, if the lower boundary of the reference SF is aligned with a lower boundary of a subframe, the first reference information further includes the information about the time domain resource unit in addition to the reference DFN, and the time domain resource unit is implemented as the subframe. On the contrary, if the lower boundary of the reference SF is not aligned with the lower boundary of the subframe, the first reference information further includes the offset information 2 in addition to the reference DEN and the information about the time domain resource unit.

Case 3: At a slot granularity, if the lower boundary of the reference SF is aligned with a lower boundary of a slot, the first reference information further includes the information about the time domain resource unit in addition to the reference DFN, and the time domain resource unit is implemented as the slot. On the contrary, if the lower boundary of the reference SF is not aligned with the lower boundary of the slot, the first reference information further includes the offset information 2 in addition to the reference DFN and the information about the time domain resource unit.

In some embodiments, the first terminal device can further compensate for clock synchronization with the network device. Specifically, two examples are used for description.

In a first example, the first reference information further includes compensation information. The compensation information is used by the first terminal device to compensate for clock synchronization with the network device, to improve clock precision. For example, the compensation information includes one of the following: a TA or TA/2. The TA is a timing advance for implementing uplink synchronization between the second terminal device and the network device.

For example, the first terminal device uses the TA/2 to compensate for clock synchronization with the network device. For example, the network device sends the first time information to the first terminal device. Correspondingly, the first terminal device receives the first time information from the network device. The first time information indicates that the time of the lower boundary of the reference SF on the network-side clock is "t1". The first terminal device uses (t1+TA/2) as the time of the lower boundary of the reference SF. It should be understood that, when the compensation information is the TA, the first terminal device needs to perform conversion, convert the TA into the TA/2, and then use the TA/2 to compensate for clock synchronization with the network device. In other words, the second terminal device provides the compensation information, and another device performs compensation processing. This simplifies a processing process of the second terminal device, and can improve clock precision between the first terminal device and the network device.

In a second example, the second terminal device determines the first reference information based on the compensation information. In this case, the first reference information does not include the compensation information. For example, the second terminal device determines the first reference DF based on the compensation information. In other words, the first reference DF is a direct frame after a backward offset by the TA/2. Alternatively, the second terminal device determines the information about the time domain resource unit based on the compensation information. For the information about the time domain resource unit, refer to the foregoing descriptions. In other words, the time domain resource unit is a resource unit after a backward offset by the TA/2. Alternatively, the second terminal device determines the offset information 1 or the offset information 2 based on the compensation information. In other words, the offset indicated by the offset information 1 or the offset information 2 is an offset after the TA/2 is adjusted. In other words, the first reference information is information with compensation considered. After obtaining the first reference information, the first terminal device may implement clock synchronization with the network device based on the first reference information, and the first terminal device does not need to perform compensation processing. This simplifies a processing process of the first terminal device, and can improve precision of clock synchronization with the network device.

Figure 7A:
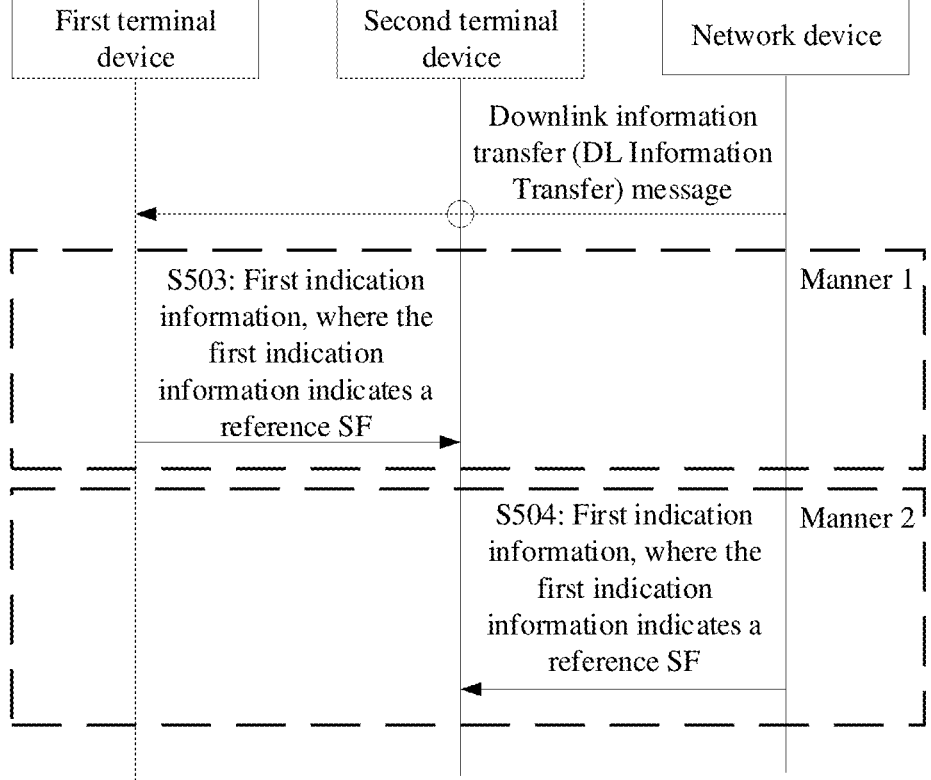
FIG. 7a is a schematic flowchart of another clock synchronization method according to an embodiment of this application.

It should be noted that when the first time information is the reference time information in the SIB 9, the second terminal device can determine the reference SF based on step 1 in S501. In other words, after the second terminal device performs step 1 in S501, the second terminal device may perform S502. However, when the first time information is the reference time information in the DL information transfer message, the second terminal device does not parse the DL information transfer message. Therefore, after performing S501, the second terminal device still cannot determine the reference SF. In this case, as shown in FIG. 7*a*, before performing S502, the second terminal device performs S503 or S504. S503 and S504 are described as follows:

S503: The first terminal device sends first indication information to the second terminal device. Correspondingly, the second terminal device receives the first indication information from the first terminal device.

The first indication information indicates the reference SF. For example, the first indication information includes the reference SFN. The reference SFN indicates the reference SF. The reference SF indicated by the first indication information is consistent with the reference SF indicated by the reference time information in the DL information transfer message.

As shown in a dashed box of Manner 1 in FIG. 7*a*, the first terminal device indicates the reference SF to the second terminal device, so that the second terminal device determines the first reference DF corresponding to the reference SF.

It should be noted that, in Manner 1, for the first terminal device, the first terminal device first performs S501, and then performs S503. Correspondingly, for the second terminal device, the second terminal device first performs S501, performs S503, and then performs S502.

S504: The network device sends first indication information to the second terminal device. Correspondingly, the second terminal device receives the first indication information from the network device.

The first indication information indicates the reference SF. For descriptions of the first indication information, refer to related descriptions of S503. Details are not described herein again.

As shown in a dashed box of Manner 2 in FIG. 7a, the network device indicates the reference SF to the second terminal device, so that the second terminal device determines the first reference DF corresponding to the reference SF.

It should be understood that the network device may first perform S501, and then perform S504. Correspondingly, for the second terminal device, the second terminal device first performs S501, performs S504, and then performs S502. Alternatively, the network device may first perform S504, and then perform S501. Correspondingly, for the second terminal device, the second terminal device first performs S504, and then performs at least one of S501 and S502. Alternatively, the network device may simultaneously perform S501 and S504. Correspondingly, for the second terminal device, the second terminal device simultaneously performs S504 and S501, and then performs S502. This is not limited in this embodiment of this application.

For the second terminal device, after performing S502, the second terminal device may send the first reference information in the following two manners. Details are described as follows:

Manner 1: As shown in the first dashed box in FIG. 5, the second terminal device performs S505a.

S505a: The second terminal device sends the first reference information to the first terminal device. Correspondingly, the first terminal device receives the first reference information from the second terminal device.

The first reference information in S505a is consistent with the first reference information in S502.

In other words, the first terminal device directly communicates with the second terminal device, so that the first terminal device obtains the first reference information.

Figure 7B:
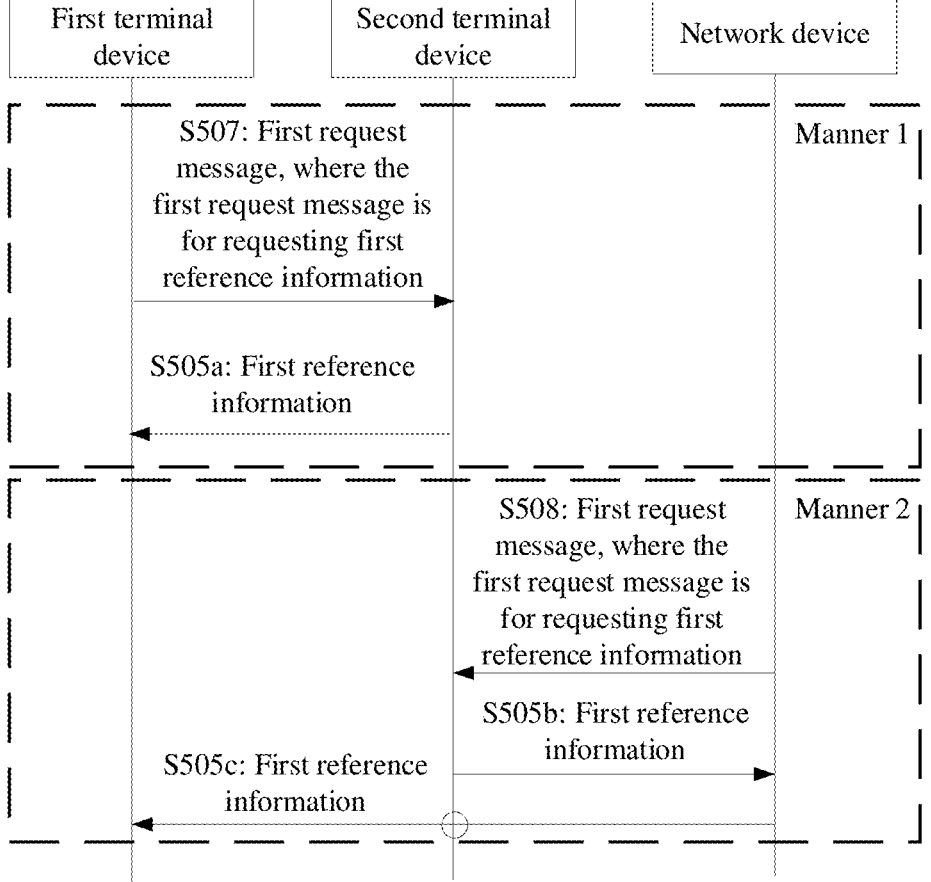
FIG. 7b is a schematic flowchart of still another clock synchronization method according to an embodiment of this application.

In Manner 1, in a possible implementation, as shown in FIG. 7b, the second terminal device first performs S507, and then performs S505a. S507 is described as follows:

S507: The first terminal device sends a first request message to the second terminal device. Correspondingly, the second terminal device receives the first request message from the first terminal device.

The first request message is for requesting the first reference information. In other words, the second terminal device provides the first reference information for the first terminal device in response to the first request message.

For example, the first request message in S507 and the first indication information in S503 may be different messages. In this case, the first terminal device may first perform S503 and then perform S507, or may first perform S507 and then perform S503, or may simultaneously perform S503 and S507. This is not limited in this embodiment of this application.

Alternatively, the first request message in S507 and the first indication information in S503 may be a same message. In this case, the first terminal device simultaneously performs S503 and S507. In other words, the first terminal device indicates the reference SF to the second terminal device and also requests the first reference information from the second terminal device by using one message, to reduce signaling overheads.

Manner 2: As shown in the second dashed box in FIG. 5, the second terminal device performs S505b.

S505b: The second terminal device sends the first reference information to the network device. Correspondingly, the network device receives the first reference information from the second terminal device.

The first reference information in S505b is consistent with the first reference information in S502.

S505c: The network device sends the first reference information to the first terminal device. Correspondingly, the first terminal device receives the first reference information from the network device.

For example, the first reference information and the first time information may be carried in different messages. The network device may first perform S501, and then perform S505c, as shown in FIG. 5. In this case, the first time information may be implemented as the reference time information in the SIB 9, or may be implemented as reference time information in the DL information transfer message. Alternatively, the network device may first perform S505c, and then perform S501, which is not shown in FIG. 5. In this case, the first time information is implemented as the reference time information in the DL information transfer message, and the network device first performs S504. Alternatively, the network device may simultaneously perform S501 and S505c, which is not shown in FIG. 5. Similarly, in this case, the first time information is implemented as the reference time information in the DL information transfer message, and the network device first performs S504.

Alternatively, the first reference information and the first time information may be carried in a same message. For example, both the first reference information and the first time information are carried in the DL information transfer message. In this case, the first time information is implemented as the reference time information in the DL information transfer message, and the network device first performs S504, and then simultaneously performs S501 and S505c.

It should be noted that when the first reference information in S505b includes the compensation information, the network device may further perform compensation processing, that is, the network device updates information in the first reference information based on the compensation information, for example, updates one of the following information: the information about the time domain resource unit, the offset information 1, or the offset information 2. For a specific update process, refer to the descriptions of the second example in S502, that is, the specific process of the second example in S502 performed by the network device. In addition, the network device provides updated information for the first terminal device by using S505c. In this case, the first reference information in S505c does not include the compensation information.

In other words, the second terminal device provides the first reference information for the first terminal device via the network device.

In Manner 2, in a possible implementation, as shown in FIG. 7b, the second terminal device first performs S508, and then performs S505b. S508 is described as follows:

S508: The network device sends a first request message to the second terminal device. Correspondingly, the second terminal device receives the first request message from the network device.

The first request message is for requesting the first reference information. In other words, the second terminal device provides the first reference information for the network device in response to the first request message.

For example, the first request message in S508 and the first indication information in S504 may be different messages. In this case, the network device may first perform S504 and then perform S508, or may first perform S508 and then perform S504, or may simultaneously perform S504 and S508. This is not limited in this embodiment of this application.

Alternatively, the first request message in S508 and the first indication information in S504 may be a same message. In this case, the network device simultaneously performs S504 and S508. In other words, the network device indicates the reference SF to the second terminal device and also requests the first reference information from the second terminal device by using one message, to reduce signaling overheads.

For the first terminal device, after the first terminal device performs S505a or S505c, the first terminal device further performs S506.

S506: The first terminal device implements clock synchronization with the network device based on the first time information and the first reference information.

For example, an implementation process of S506 includes but is not limited to the following examples:

Example 1: When the first reference information includes the reference DFN, the first terminal device may determine, based on the first reference DF indicated by the reference DFN and the time indicated by the first time information, the time of the lower boundary of the first reference DF on the network-side clock, to implement clock synchronization with the network device.

Example 2: When the first reference information includes the reference DFN and the offset information 1, the first terminal device may determine, based on the first reference DF indicated by the reference DFN, the offset indicated by the offset information 1, and the time indicated by the first time information, the time of the lower boundary of the first reference DF on the network-side clock, to implement clock synchronization with the network device.

Example 3: When the first reference information includes the reference DFN and the information about the time domain resource unit, the first terminal device may determine, based on the first reference DF indicated by the reference DFN, the time domain resource unit indicated by the information about the time domain resource unit, and the time indicated by the first time information, the time of the lower boundary of the first reference DF on the network-side clock, to implement clock synchronization with the network device.

Example 4: When the first reference information includes the reference DFN, the information about the time domain resource unit, and the offset information 2, the first terminal device may determine, based on the first reference DF indicated by the reference DFN, the time domain resource unit indicated by the information about the time domain resource unit, the offset indicated by the offset information 2, and the time indicated by the first time information, the time of the lower boundary of the first reference DF on the network-side clock, to implement clock synchronization with the network device.

Example 5: When the first reference information includes the reference DFN and the compensation information, the first terminal device may determine, based on the first reference DF indicated by the reference DFN and the time indicated by the first time information, the time of the lower boundary of the first reference DF on the network-side clock, to implement initial clock synchronization with the network device. Then, the first terminal device compensates for the synchronization clock between the first terminal device and the network device based on the compensation information in the first reference information, to improve clock synchronization precision.

Example 6: When the first reference information includes the reference DFN, the offset information 1, and the compensation information, the first terminal device may determine, based on the first reference DF indicated by the reference DFN, the offset information 1, and the time indicated by the first time information, the time of the lower boundary of the first reference DF on the network-side clock, to implement initial clock synchronization with the network device. Then, the first terminal device compensates for the synchronization clock between the first terminal device and the network device based on the compensation information in the first reference information, to improve clock synchronization precision.

It should be understood that the foregoing provides an implementation process of S506 only by using the examples 1 to 6. In addition to the reference DFN, the first reference information may further include other information. For details, refer to the descriptions of S502. There may be a plurality of information combinations carried in the first reference information. For example, when the first reference information carries the reference DFN and the offset information 1, for an implementation process of S506, refer to the descriptions in Example 2. For another example, when the first reference information carries the reference DFN and the information about the time domain resource unit, for an implementation process of S506, refer to the descriptions in Example 3. Certainly, in addition to the information combinations in Example 2 to Example 6, there may be another combination for an information combination relationship in the first reference information. This is not listed one by one herein.

In this way, in the clock synchronization method 500 in this embodiment of this application, even if the first terminal device cannot determine a transmission resource corresponding to the reference SF on Uu, the first reference information indicates the first reference DF corresponding to the reference SF. Therefore, the first terminal device can implement clock synchronization with the network device based on the first reference DF indicated by the first reference information and the time indicated by the first time information.

A core idea of the second clock synchronization method provided in embodiments of this application is as follows: The second terminal device provides first reference information. The first reference information indicates an offset between Uu timing and PC5 timing. The first terminal device receives first time information and the first reference information. The first time information indicates time of a lower boundary of a reference SF on a network-side clock. In this way, even if the first terminal device cannot determine a transmission resource corresponding to the reference SF on Uu, because the first reference information indicates the offset between the Uu timing and the PC5 timing, and the first terminal device can also determine the PC5 timing, the first terminal device can determine a first reference DF corresponding to the reference SF. For example, the first terminal device uses the time of the lower boundary of the reference SF on the network-side clock as time of a lower boundary of the first reference DF on the network-side clock, to implement clock synchronization with the network device.

Figure 8:
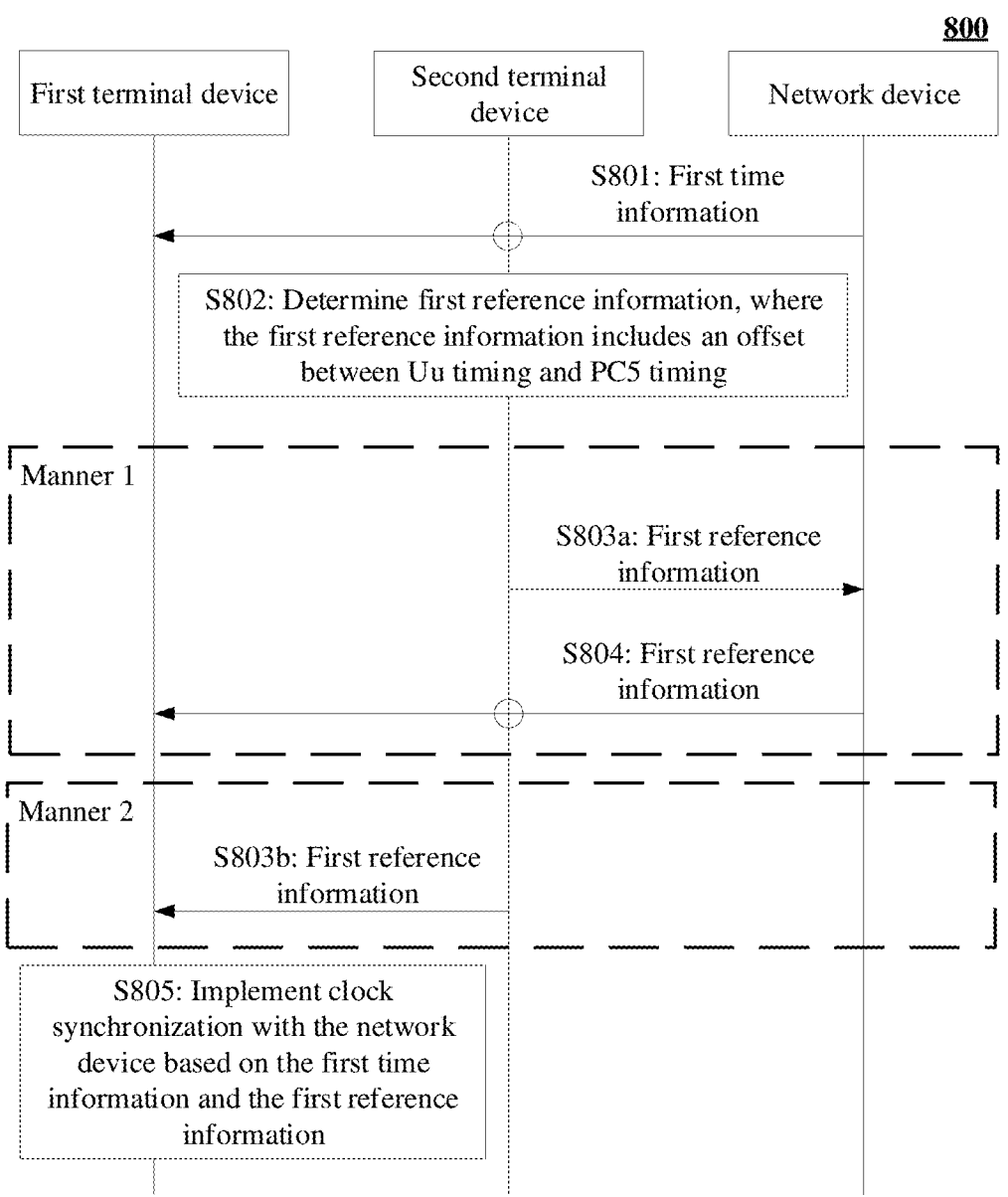
FIG. 8 is a schematic flowchart of still another clock synchronization method according to an embodiment of this application.

As shown in FIG. 8, a second clock synchronization method 800 provided in an embodiment of this application includes the following steps.

S801: A network device sends first time information to a first terminal device. Correspondingly, the first terminal device receives the first time information from the network device.

The first time information indicates time of a lower boundary of a reference SF on a network-side clock.

It should be noted that, a difference between the first time information in S801 and the first time information in S501 lies in that the first time information in S801 may be reference time information in a DL information transfer message, and cannot be reference time information in a SIB 9. For other descriptions of S801, refer to S501. Details are not described herein again.

S802: A second terminal device determines first reference information.

The first reference information includes an offset between Uu timing and PC5 timing. The Uu timing is timing between the second terminal device and the network device on a Uu interface. The PC5 timing is timing between the second terminal device and the first terminal device on a PC5 interface. For example, the offset in the first reference information is an offset between two preset frames defined in a protocol. The preset frames include a preset direct frame and a preset system frame. The preset direct frame includes a DF indicated by a DFN #0, and the preset system frame includes an SF indicated by an SFN #0. In this case, the offset in the first reference information is an offset between the SF indicated by the SFN #0 and the DF indicated by the DFN #0. Certainly, the preset system frame may alternatively be an SFN of another value, for example, an SFN #1, and the preset direct frame may alternatively be a DFN of another value, for example, a DFN #1. This is not limited in this embodiment of this application.

It should be understood that a location relationship between the preset direct frame and the preset system frame in time domain may be arbitrary, that is, an offset between the preset direct frame and the preset system frame can be determined based on the preset direct frame and the preset system frame. The location relationship between the preset direct frame and the preset system frame in time domain includes but is not limited to one of the following:

In a first item, a lower boundary of the preset direct frame is aligned with a lower boundary of the preset system frame in time domain.

In a second term, a distance between the lower boundary of the preset direct frame and the lower boundary of the preset system frame is minimum. In this case, the lower boundary of the preset direct frame may be before the lower boundary of the preset system frame, or may be after the lower boundary of the preset system frame.

In a third item, the lower boundary of the preset direct frame is before the lower boundary of the preset system frame, and the distance between the lower boundary of the preset direct frame and the lower boundary of the preset system frame is minimum.

In a fourth item, the lower boundary of the preset direct frame is after the lower boundary of the preset system frame, and the distance between the lower boundary of the preset direct frame and the lower boundary of the preset system frame is minimum.

It should be understood that, in the second item to the fourth item, the lower boundary of the preset direct frame is not aligned with the lower boundary of the preset system frame in time domain, and there is a specific offset between the two lower boundaries. The first item to the fourth item are merely examples for describing locations of the preset direct frame and the preset system frame in time domain. The locations of the preset direct frame and the preset system frame in time domain may alternatively be another case. This is not limited in this embodiment of this application.

Optionally, the offset includes at least one of the following:

In a first item, a quantity of subframes that are offset between the Uu timing and the PC5 timing. For example, when the Uu timing is aligned with the PC timing (for example, the lower boundary of the SF indicated by the SFN #0 is aligned with the lower boundary of the DF indicated by the DFN #0), a value of the quantity of subframes is zero. When the Uu timing is not aligned with the PC timing, a value of the quantity of subframes is greater than zero. For example, the lower boundary of the SF indicated by the SFN #0 is not aligned with the lower boundary of the DF indicated by the DFN #0, and the quantity of subframes indicates a quantity of subframes that are offset between the lower boundary of the SF indicated by the SFN #0 and the lower boundary of the DF indicated by the DFN #0.

In a second item, a quantity of slots that are offset between the Uu timing and the PC5 timing. For example, when the Uu timing is aligned with the PC timing (for example, the lower boundary of the SF indicated by the SFN #0 is aligned with the lower boundary of the DF indicated by the DFN #0), a value of the quantity of slots is zero. When the Uu timing is not aligned with the PC timing, a value of the quantity of slots is greater than zero. For example, the lower boundary of the SF indicated by the SFN #0 is not aligned with the lower boundary of the DF indicated by the DFN #0, and the quantity of slots indicates a quantity of slots that are offset between the lower boundary of the SF indicated by the SFN #0 and the lower boundary of the DF indicated by the DFN #0.

In a third item, duration that is offset between the Uu timing and the PC5 timing. For example, a unit of the duration may be nanosecond. For example, when the lower boundary of the SF indicated by the SFN #0 is aligned with the lower boundary of the DF indicated by the DFN #0, a value of the duration is 0. For another example, when the lower boundary of the SF indicated by the SFN #0 is not aligned with the lower boundary of the DF indicated by the DFN #0, the duration indicates a quantity of nanoseconds that are offset between the lower boundary of the SF indicated by the SFN #0 and the lower boundary of the DF indicated by the DFN #0.

It should be understood that the offset indicated by the first reference information is described above by using only the subframe, the slot, and the duration as examples. A unit of the offset indicated by the first reference information may alternatively be another unit, for example, a symbol. This is not limited in this embodiment of this application.

In some embodiments, the first terminal device can further compensate for clock synchronization with the network device, to improve clock synchronization precision. Specifically, two examples are used for description.

In a first example, the first reference information further includes compensation information. For descriptions of the compensation information, refer to the descriptions in S502. Details are not described herein again.

In a second example, the second terminal device determines the offset based on the compensation information. In this case, the first reference information does not include the compensation information. For example, the second terminal device determines the quantity of subframes based on the compensation information. In other words, the quantity of subframes is a quantity after adjustment based on TA/2. Alternatively, the second terminal device determines the quantity of slots based on the compensation information. In other words, the quantity of slots is a quantity after adjustment based on TA/2. Alternatively, the second terminal device determines the duration based on the compensation information. In other words, the duration is duration after adjustment based on TA/2. In other words, the first reference information is information with compensation considered. After obtaining the first reference information, the first terminal device may implement clock synchronization with the network device based on the first reference information, and the first terminal device does not need to perform compensation processing. This simplifies a processing process of the first terminal device, and can improve precision of clock synchronization with the network device.

For the second terminal device, after performing S802, the second terminal device may send the first reference information in the following two manners. Details are described as follows:

Manner 1: As shown in a dashed box in which "Manner 1" in FIG. 8 is located, the second terminal device performs S803*a*.

S803*a*: The second terminal device sends the first reference information to the network device. Correspondingly, the network device receives the first reference information from the second terminal device.

The first reference information in S803*a* is consistent with the first reference information in S802.

S804: The network device sends the first reference information to the first terminal device. Correspondingly, the first terminal device receives the first reference information from the network device.

The first reference information in S804 is consistent with the first reference information in S803*a*.

For example, the first reference information and the first time information may be carried in different messages. The network device may first perform S801, and then perform S804, as shown in FIG. 8. Alternatively, the network device may first perform S804, and then perform S801, which is not shown in FIG. 8. Alternatively, the network device may simultaneously perform S801 and S804, which is not shown in FIG. 8.

Alternatively, the first reference information and the first time information may be carried in a same message. For example, both the first reference information and the first time information are carried in a DL information transfer message, to reduce signaling overheads.

In other words, in Manner 1, the second terminal device provides the first reference information for the first terminal device via the network device.

In Manner 1, in a possible implementation, the second terminal device first receives a first request message, and then performs S803*a*. The first request message is for requesting the first reference information. For descriptions of the first request message, refer to the descriptions of S508. Details are not described herein again. In other words, the second terminal device provides the first reference information for the network device in response to the first request message.

Manner 2: As shown in a dashed box in which "Manner 2" in FIG. 8 is located, the second terminal device performs S803*b*.

S803*b*: The second terminal device sends the first reference information to the first terminal device. Correspondingly, the first terminal device receives the first reference information from the second terminal device.

The first reference information in S803*b* is consistent with the first reference information in S802.

In other words, in Manner 2, the second terminal device directly communicates with the first terminal device, to provide the first reference information for the first terminal device.

In Manner 2, in a possible implementation, the second terminal device first receives a first request message, and then performs S803*b*. The first request message is for requesting the first reference information. For descriptions of the first request message, refer to the descriptions of S507. Details are not described herein again. In other words, the second terminal device provides the first reference information for the first terminal device in response to the first request message.

For the first terminal device, after obtaining the first time information and the first reference information, the first terminal device performs S805.

S805: The first terminal device implements clock synchronization with the network device based on the first time information and the first reference information.

For example, when the network device sends the first time information (for example, the reference time information in the DL information transfer message), after performing S801, the first terminal device may determine, based on the first time information, the time of the lower boundary of the reference SF on the network-side clock.

When the first reference information includes the offset between the Uu timing and the PC5 timing, the first terminal device determines, based on the offset indicated by the first reference information, a first reference DF corresponding to the reference SF, and uses the time of the lower boundary of the reference SF on the network-side clock as time of a lower boundary of the first reference DF on the network-side clock, to implement clock synchronization with the network device.

When the first reference information includes the offset between the Uu timing and the PC5 timing and the compensation information, the first terminal device determines, based on the offset indicated by the first reference information, a first reference DF corresponding to the reference SF, and implements initial clock synchronization with the network device based on the time of the lower boundary of the reference SF on the network-side clock. Then, the first terminal device compensates for clock synchronization between the first terminal device and the network device based on the compensation information provided in the first reference information, to improve clock synchronization precision.

In this way, in the clock synchronization method 800 in this embodiment of this application, even if the first terminal device cannot determine a transmission resource corresponding to the reference SF on Uu, the first reference information indicates the offset between the Uu timing and the PC5 timing. Therefore, the first terminal device can determine the first reference DF corresponding to the reference SF, and therefore the first terminal device can implement clock synchronization with the network device based on the time indicated by the first time information and the first reference DF.

A core idea of the third clock synchronization method provided in embodiments of this application is as follows: The second terminal device provides first reference information. The first reference information indicates an offset between Uu timing and PC5 timing. The network device determines first time information based on the first reference information, and then provides the first time information for the first terminal device. The first time information indicates time of a lower boundary of a reference DF on a network-side clock. In this way, even if the first terminal device cannot determine a transmission resource corresponding to a reference SF on Uu, because the first time information directly indicates the time of the lower boundary of the reference DF on the network-side clock, the first terminal device can implement clock synchronization with the network device based on the first time information.

Figures 9, 10:
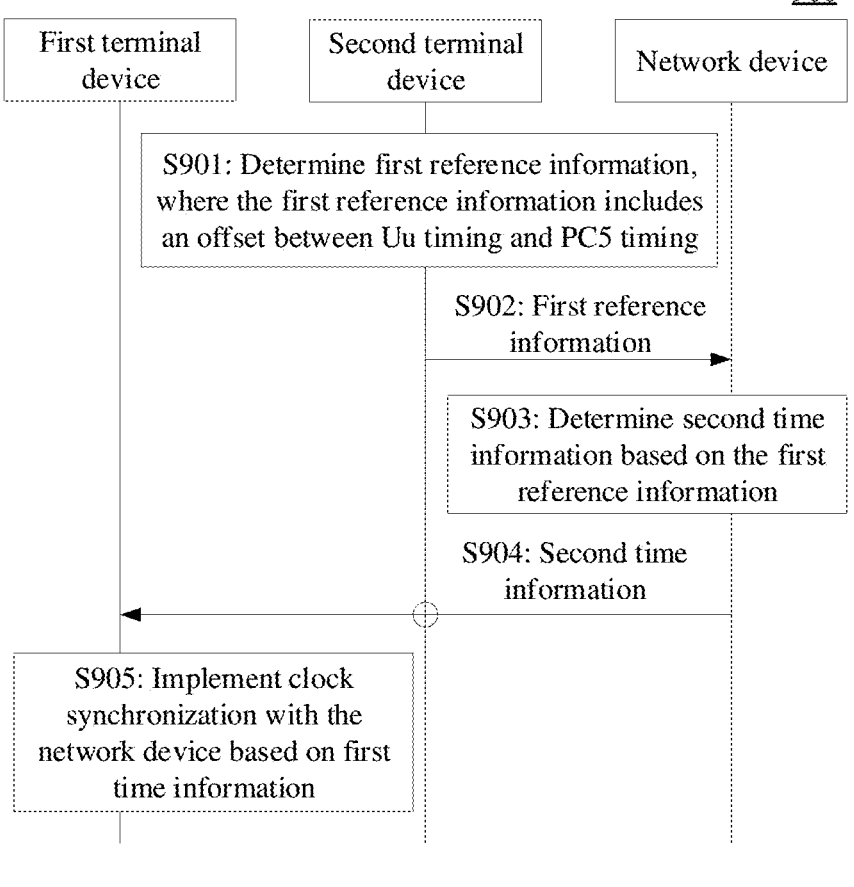
FIG. 9 is a schematic flowchart of still another clock synchronization method according to an embodiment of this application.
FIG. 10 is a schematic diagram of an architecture of another communication system according to an embodiment of this application.

As shown in FIG. 9, a third clock synchronization method 900 provided in an embodiment of this application includes the following steps.

S901: A second terminal device determines first reference information.

For a specific implementation process of S901, refer to the descriptions of S802. Details are not described herein again.

S902: The second terminal device sends the first reference information to a network device. Correspondingly, the network device receives the first reference information from the second terminal device.

The first reference information in S902 is consistent with the first reference information in S901.

S903: The network device determines second time information based on the first reference information.

The first reference information in S903 is consistent with the first reference information in S902.

The second time information indicates time of a lower boundary of a reference DF on a network-side clock. The reference DF is transmitted through a PC5 interface, and the PC5 interface is a communication interface between a first terminal device and the second terminal device.

For example, when the first reference information includes an offset between Uu timing and PC5 timing, after determining time of a lower boundary of a reference SF on the network-side clock, the network device determines, based on the offset indicated by the first reference information, the reference DF corresponding to the reference SF, and uses the time of the lower boundary of the reference SF on the network-side clock as the time of the lower boundary of the reference DF on the network-side clock.

For another example, when the first reference information includes an offset between Uu timing and PC5 timing and compensation information, after determining time of a lower boundary of a reference SF on the network-side clock, the network device determines, based on the offset indicated by the first reference information, the reference DF corresponding to the reference SF, and determines the time of the lower boundary of the reference DF on the network-side clock based on the time of the lower boundary of the reference SF on the network-side clock and the compensation information in the first reference information. Alternatively, the network device determines only the reference DF corresponding to the reference SF. In this case, first time information further includes the compensation information, and the compensation information in the first time information is consistent with the compensation information in the first reference information.

S904: The network device sends the second time information to the first terminal device. Correspondingly, the first terminal device receives the second time information from the network device.

The second time information in S904 is consistent with the second time information in S903. For example, the second time information may be carried in a DL information transfer message.

S905: The first terminal device implements clock synchronization with the network device based on the second time information.

For example, when the second time information indicates the time of the lower boundary of the reference DF on the network-side clock, the first terminal device may directly implement clock synchronization with the network device based on the second time information.

For example, when the second time information indicates the time of the lower boundary of the reference DF on the network-side clock, the second time information further includes the compensation information, and the second time information further includes the compensation information, the first terminal device may directly implement initial clock synchronization with the network device based on the reference DF and the time indicated by the second time information. Then, the first terminal device compensates for clock synchronization between the first terminal device and the network device based on the compensation information provided in the second time information, to improve clock synchronization precision.

In this way, in the clock synchronization method 900 in this embodiment of this application, even if the first terminal device cannot determine a transmission resource corresponding to the reference SF on Uu, the first time information indicates the time of the lower boundary of the reference DF on the network-side clock. Therefore, the first terminal device can implement clock synchronization with the network device based on the time indicated by the first time information and the reference DF.

In the foregoing three clock synchronization methods (that is, the first clock synchronization method 500, the second clock synchronization method 800, and the third clock synchronization method 900), only the lower boundary of the frame is used as an example for description, and another reference point such as a central point of a frame and an upper boundary of a frame may alternatively be used. That is, the lower boundary in the foregoing three clock synchronization methods may be replaced with the central point or the upper boundary. The TA is determined by the second terminal device through a random access procedure between the second terminal device and the network device. The second terminal device may compensate for clock synchronization between the second terminal device and the network device by using the TA/2, to improve clock precision.

The foregoing uses the U2N scenario as an example to describe a process of clock synchronization between the remote terminal device (for example, the first terminal device) and the network device. The following uses a scenario of communication between terminal devices as an example for description. Embodiments of this application further provide a fourth clock synchronization method. FIG. 10 is a schematic diagram of an architecture of a communication system applicable to the fourth clock synchronization method in embodiments of this application. The communication system may include a first terminal device 1010 and a second terminal device 1020. The first terminal device 1010 communicates with the second terminal device 1020 through a PC5 interface. FIG. 10 shows only two terminal devices. FIG. 10 is merely a schematic diagram, and does not constitute a limitation on an application scenario of the clock synchronization method in embodiments of this application. For descriptions of the first terminal device 1010 and the second terminal device 1020, refer to the descriptions of the terminal device in FIG. 3. Details are not described herein again.

A core idea of the fourth clock synchronization method provided in embodiments of this application is as follows: The first terminal device receives first information from the second terminal device, where the first information indicates time corresponding to a reference DF on a second clock, and the second clock is a timing clock on a second terminal device side. Therefore, the first terminal device can directly implement clock synchronization with the second terminal device based on the time indicated by the first information and the reference DF.

Figure 11:
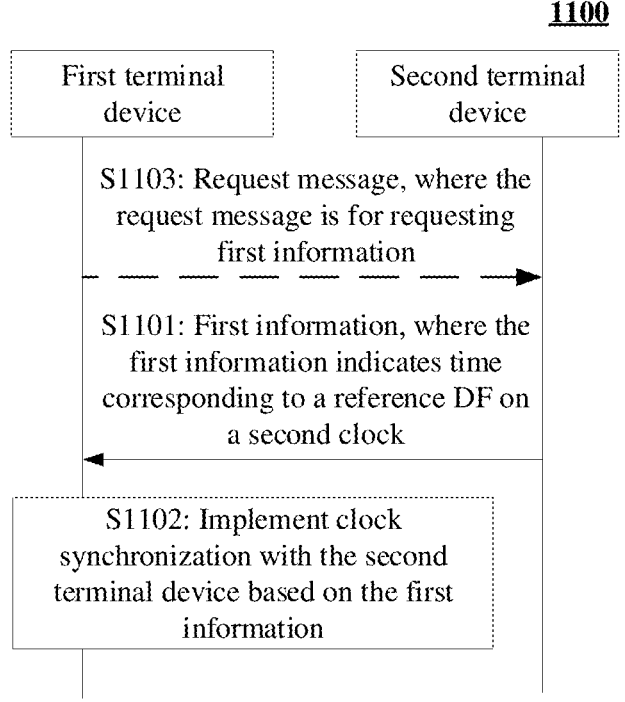
FIG. 11 is a schematic flowchart of still another clock synchronization method according to an embodiment of this application.

As shown in FIG. 11, a fourth clock synchronization method 1100 provided in an embodiment of this application includes the following steps.

S1101: A second terminal device sends first information to a first terminal device. Correspondingly, the first terminal device receives the first information from the second terminal device.

The first information indicates time corresponding to a reference DF on a second clock. The corresponding time on the second clock may be understood as time of an upper boundary of the reference DF on the second clock, or the first information indicates time of a lower boundary of the reference DF on the second clock, or the first information indicates time of a central point of the reference DF on the second clock. The second clock is a timing clock on a second terminal device side. It should be understood that in this embodiment of this application, only these reference points such as "the upper boundary, the lower boundary, and the central point" are used as examples for description. The reference point may alternatively be another location of the reference DF. This is not limited in this embodiment of this application.

Optionally, the first information further includes at least one of the following:

In a first item, time type information. The time type information indicates a type of the time corresponding to the reference DF on the second clock. For example, a type of time indicated by the time type information is one of the following: local time of the second terminal device, a local time of a network device, or GPS time. The local time of the network device and the GPS time are time obtained after the second terminal device implements clock synchronization with the network device.

In a second item, uncertainty information. The uncertainty information indicates uncertainty of the time corresponding to the reference DF on the second clock. In other words, the uncertainty information indicates an error of the time corresponding to the reference DF on the second clock.

The first information may be transmitted in two manners (for example, Manner 1 and Manner 2 below). Details are described as follows:

Manner 1: The first information is carried in an SL RRC message. In other words, the second terminal device sends the RRC message to the first terminal device in a unicast manner. Correspondingly, the first terminal device may obtain the first information by receiving the RRC message from the second terminal device. The RRC message may be described as a sidelink information transfer (SL Information Transfer) message. It should be understood that in this embodiment of this application, only the term "SL Information Transfer message" is used as an example for description, and the RRC message may have another name. This is not limited in this embodiment of this application.

Manner 2: The first information is carried in SCI. For example, the first information is carried in second-stage SCI. In other words, the second terminal device sends the second-stage SCI in a multicast or broadcast manner. Correspondingly, the first terminal device may obtain the first information by receiving the second-stage SCI from the second terminal device. For the second terminal device, the second terminal device may first determine a transmission resource for carrying the second-stage SCI, then generate the first information, include the first information in the second-stage SCI, and send the second-stage SCI in the broadcast or multicast manner.

In some embodiments, the first terminal device further performs S1103.

S1103: The first terminal device sends a request message to the second terminal device. Correspondingly, the second terminal device receives the request message from the first terminal device.

The request message is for requesting the first information. For example, the request message is transmitted through a PC5 interface.

In other words, when determining that the first terminal device needs the first information, the first terminal device may request the first information from the second terminal device. The second terminal device performs S1101 in response to the request message, to meet a requirement of the first terminal device.

It should be noted that S1103 is an optional step. The first terminal device may perform S1103, or may not perform S1103. Correspondingly, the second terminal device does not perform S1103 either. In a possible example, when the second terminal device determines that the second terminal device needs to implement clock synchronization with the first terminal device, the second terminal device only needs to perform S1101.

S1102: The first terminal device implements clock synchronization with the second terminal device based on the first information.

For example, because the first information directly indicates the time corresponding to the reference DF on the second clock, the first terminal device uses the time indicated by the first information as time corresponding to the reference DF on a first clock. The time corresponding to the reference DF on the first clock may be understood as time of the upper boundary (the lower boundary or the central point) of the reference DF on the first clock. The first clock is a timing clock on a first terminal device side, to implement clock synchronization with the second terminal device.

In this way, the second terminal device indicates the time of the reference DF on the second clock to the first terminal device, so that the first terminal device determines, based on the reference DF and the time indicated by the first information, the time corresponding to the reference DF on the first clock, to implement clock synchronization between the terminal devices.

In the foregoing U2N scenario or the scenario of communication between the terminal devices, a transmission latency also exists in a process of communication between the first terminal device and the second terminal device. However, because a random access procedure (that is, a random access procedure performed between the terminal device and the network device) is not performed between the first terminal device and the second terminal device, a transmission latency of SL communication cannot be determined.

In view of this, embodiments of this application further provide a transmission latency determining method. The method may be applicable to a U2N scenario, and is also applicable to a scenario of communication between terminal devices. A core idea of the transmission latency determining method in embodiments of this application is as follows: A first terminal device determines first time (denoted as t1), second time (denoted as t1'), third time (denoted as t2), and fourth time (denoted as t2). Then, the first terminal device determines a transmission latency based on the first time, the second time, the third time, and the fourth time. The first time is time of a boundary of a first resource on a first clock, the second time is time of the boundary of the first resource on a second clock, the third time is time of a boundary of a second resource on the second clock, and the fourth time is time of the boundary of the second resource on the first clock. The first resource corresponds to first reference information, and the first reference information is information sent by the first terminal device to a second terminal device. The second resource corresponds to second reference information, and the second reference information is information sent by the second terminal device to the first terminal device. The first clock is a timing clock on a first terminal device side, and the second clock is a timing clock on a second terminal device side. In other words, both the first terminal device and the second terminal device determine time on respective clocks for a same reference point (for example, the boundary of the first resource or the boundary of the second resource), and then the first terminal device may determine the transmission latency based on the foregoing four pieces of time.

Figure 12A:
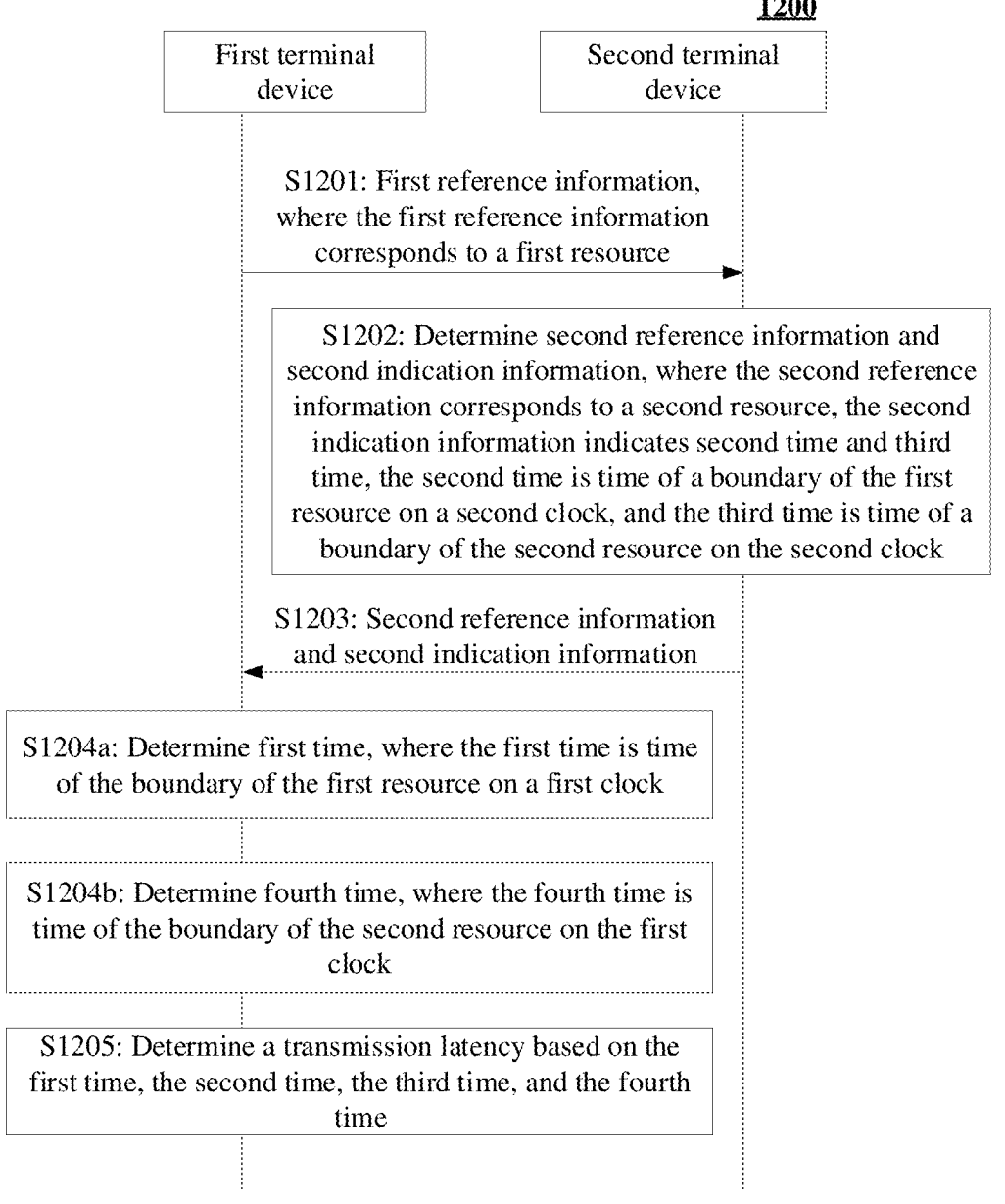
FIG. 12a is a schematic flowchart of still another clock synchronization method according to an embodiment of this application.

As shown in FIG. 12a, a transmission latency determining method 1200 in an embodiment of this application includes the following steps.

S1201: A first terminal device sends first reference information to a second terminal device. Correspondingly, the second terminal device receives the first reference information from the first terminal device.

The first terminal device and the second terminal device are described as follows: A U2N scenario is used as an example. The first terminal device is a remote terminal device in the U2N scenario, and the second terminal device is a relay terminal device in the U2N scenario. Alternatively, the first terminal device is a relay terminal device in the U2N scenario, and the second terminal device is a remote terminal device in the U2N scenario. A scenario of "communication between terminal devices" is further used as an example, and the first terminal device directly communicates with the second terminal device.

The first reference information corresponds to a first resource. For example, the first reference information may be a first reference DFN, and the first reference DFN is a number of a first reference DF of the first terminal device on PC5. In this case, the first resource corresponding to the first reference information may be understood as the first reference DF indicated by the first reference DFN. Alternatively, the first reference information may be a first reference signal (RS) sent by the first terminal device on a PC5 interface. In this case, the first resource corresponding to the first reference information may be understood as a resource for transmitting the first RS.

It should be understood that, in this embodiment of this application, when the first reference information is implemented as the first RS, the first resource may carry only the first RS, and does not carry a MAC protocol data unit (PDU). Certainly, the first resource may carry both the first RS and the MAC PDU. Details are not described herein again.

A bandwidth of the first RS is described as follows: The bandwidth of the first RS may be determined by the first terminal device, or may be determined by a network device. The following describes two manners (that is, Manner 1 and Manner 2 below).

Figure 12B:
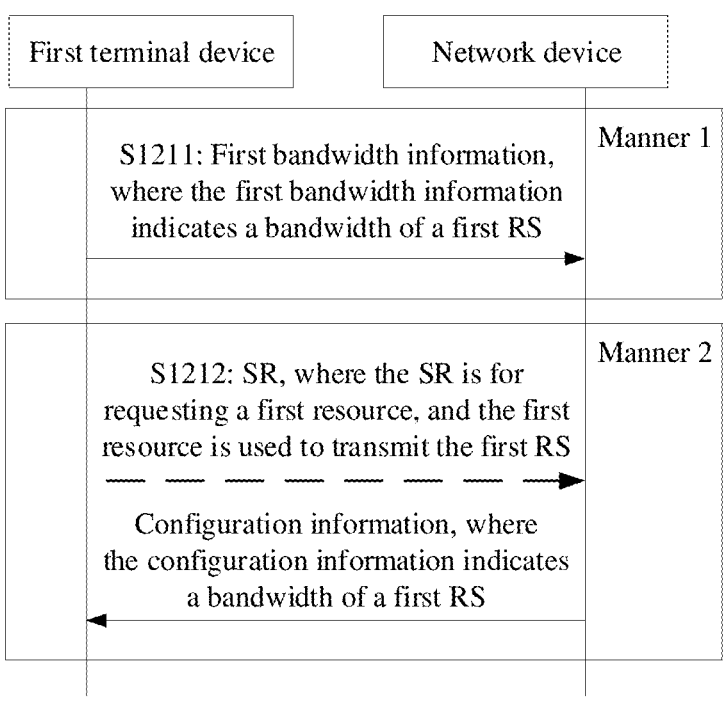
FIG. 12b is a schematic flowchart of still another clock synchronization method according to an embodiment of this application.

Manner 1: The bandwidth of the first RS is determined by the first terminal device. For example, as shown in FIG. 12b, the first terminal device performs S1211.

S1211: The first terminal device sends first bandwidth information to the network device. Correspondingly, the network device receives the first bandwidth information from the first terminal device.

The first bandwidth information indicates the bandwidth of the first RS. The bandwidth indicated by the first bandwidth information is autonomously determined by the first terminal device. For example, the network device provides a correspondence between precision and a bandwidth of a reference signal for the first terminal device. The first terminal device determines the bandwidth of the first RS based on a precision requirement of the first terminal device for the first RS and the foregoing correspondence.

For example, the first terminal device determines that the bandwidth of the first RS is five resource blocks (RBs), and the first bandwidth information indicates that a quantity of RBs is five. Alternatively, the first terminal device determines that the bandwidth of the first RS is X megahertz (MHz), and the bandwidth indicated by the first bandwidth information is X MHz. X>0.

In this way, the first terminal device may report the bandwidth of the first RS to the network device, so that the network device learns of a resource occupation status of the first terminal device.

Manner 2: The bandwidth of the first RS is configured by the network device. A specific process is as follows: The network device sends configuration information to the first terminal device. Correspondingly, the first terminal device receives the configuration information from the network. The configuration information indicates the bandwidth of the first RS, so that the first terminal device learns of the bandwidth of the first RS. For example, the network device determines that the bandwidth of the first RS is five RBs, and the configuration information indicates that a quantity of RBs is still five. Alternatively, the network device determines that the bandwidth of the first RS is X MHz, and the bandwidth indicated by the configuration information is X MHz. X>0.

It should be understood that, in Manner 2, in a possible implementation, before the first terminal device receives the configuration information, the first terminal device first sends requirement information to the network device. Correspondingly, the network device receives the requirement information from the first terminal device. The requirement information indicates a precision requirement of the first terminal device for the first RS. The network device determines the bandwidth of the first RS based on the requirement information and a correspondence between precision and a bandwidth of a reference signal, and then provides the bandwidth of the first RS for the first terminal device by using the configuration information.

In Manner 2, if the resource (that is, the first resource) for transmitting the first RS does not carry the MAC PDU, as shown in FIG. 12b, the first terminal device may further perform S1212.

S1212: The first terminal device sends a service request (SR) to the network device. Correspondingly, the network device receives the SR from the first terminal device.

The SR is for requesting the first resource, and the first resource is used to transmit the first RS. For example, the SR is an SR preconfigured by the network device for the first terminal device.

For example, a working mode of the first terminal device is that the network device schedules a sidelink resource. In other words, before sending the first RS, the first terminal device first requests, from the network device, the first resource used for sending the first RS, for example, requests, from the network device by using the SR in S1212, the first resource dedicated to transmitting the first RS.

In other words, when the first resource carries the first RS and does not carry the MAC PDU, the first terminal device can also request the first resource from the network device, to transmit the first RS.

S1202: The second terminal device determines second reference information and second indication information.

The second reference information corresponds to a second resource. For example, the second reference information may be a second reference DFN, and the second reference DEN is a number of a second reference DF of the second terminal device on PC5. In this case, the second resource corresponding to the second reference information may be understood as the second reference DF indicated by the second reference DFN. Alternatively, the second reference information may be a second RS sent by the second terminal device on the PC5 interface. In this case, the second resource corresponding to the second reference information may be understood as a resource for transmitting the second RS. It should be understood that when the first reference information is implemented as the first reference DFN, the second reference information is implemented as the second reference DFN. When the first reference information is implemented as the first RS, the second reference information is implemented as the second RS.

The second indication information indicates second time (denoted as t1') and third time (denoted as t2). For example, the second indication information includes information 2 and information 3. The information 2 indicates the second time, and the information 3 indicates the third time.

Figure 12C:
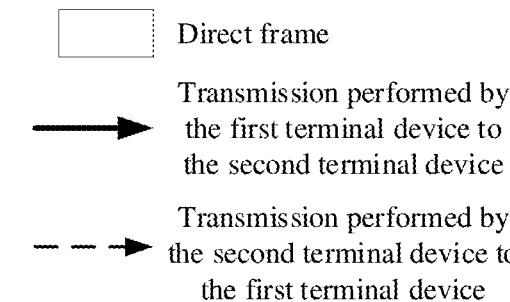
FIG. 12c is a schematic diagram of a scenario of still another clock synchronization method according to an embodiment of this application.
Figure 12C:
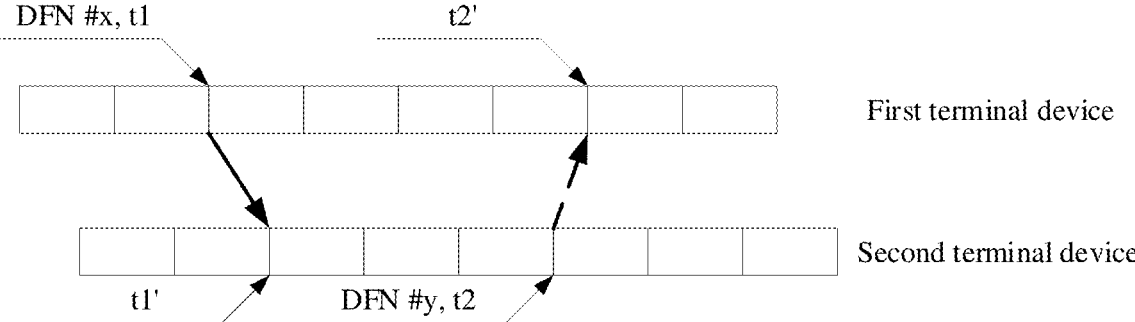

The second time is time of a boundary of the first resource on a second clock. For example, when the first reference information is implemented as the first reference DFN, the second time is time, on the second clock, of a lower boundary of the first reference DF indicated by the first reference DFN. Alternatively, when the first reference information is implemented as the first RS, the second time is time of an end boundary of the transmission resource of the first RS on the second clock. The second clock is a timing clock on a second terminal device side. FIG. 12c is used as an example. The first resource is a direct frame indicated by a DFN #x, and a lower boundary corresponding to the second time t1' is that shown in FIG. 12c.

The third time is time of a boundary of the second resource on the second clock. For example, when the second reference information is implemented as the second reference DFN, the third time is time, on the second clock, of a lower boundary of the second reference DF indicated by the second reference DFN. Alternatively, when the second reference information is implemented as the second RS, the third time is time of an end boundary of the transmission resource of the second RS on the second clock. FIG. 12c is used as an example. The second resource is a direct frame indicated by a DFN #y. A lower boundary corresponding to the third time t2 is that shown in FIG. 12c.

S1203: The second terminal device sends the second reference information and the second indication information to the first terminal device. Correspondingly, the first terminal device receives the second reference information and the second indication information from the second terminal device.

The second reference information in S1203 is consistent with the second reference information in S1202, and the second indication information in S1203 is consistent with the second indication information in S1202. For an implementation process of S1203, refer to the descriptions of S1201 and S1213. Details are not described herein again.

It should be noted that the information 2 and the information 3 in the second indication information may be carried in a same message for transmission. For example, both the information 2 and the information 3 are carried in an RRC message, or are carried in second-stage SCI. Alternatively, the information 2 and the information 3 in the second indication information may be carried in different messages for transmission. For example, the information 2 is carried in an RRC message, and the information 3 is carried in second-stage SCI. This is not limited in this embodiment of this application. When the information 2 and the information 3 are carried in different messages for transmission, a sending sequence of the information 2 and the information 3 is not limited. To be specific, the second terminal device may first send the information 2 and then send the information 3, or may first send the information 3 and then send the information 2, or may simultaneously send the information 2 and the information 3.

S1204a: The first terminal device determines first time.

The first time is time of the boundary of the first resource on a first clock, and is denoted as t1. For example, when the first reference information is implemented as the first reference DFN, the first time is time, on the first clock, of the lower boundary of the first reference DF indicated by the first reference DFN. Alternatively, when the first reference information is implemented as the first RS, the first time is time of the end boundary of the transmission resource of the first RS on the first clock. The first clock is a timing clock on a first terminal device side. FIG. 12c is used as an example. The first resource is the direct frame indicated by the DFN #x, and a lower boundary corresponding to the first time t1 is that shown in FIG. 12c.

It should be noted that the first terminal device may first perform S1203 and then perform S1204a, or may first perform S1204a and then perform S1203, or may simultaneously perform S1204a and S1203. This is not limited in this embodiment of this application.

S1204b: The first terminal device determines fourth time.

The fourth time is time of the boundary of the second resource on the first clock, and is denoted as t2'. For example, when the second reference information is implemented as the second reference DFN, the fourth time is time, on the first clock, of the lower boundary of the second reference DF indicated by the second reference DFN. Alternatively, when the second reference information is implemented as the second RS, the fourth time is time of the end boundary of the transmission resource of the second RS on the first clock. FIG. 12*c* is used as an example. The second resource is the direct frame indicated by the DFN #y, and a lower boundary corresponding to the fourth time t2' is that shown in FIG. 12*c*.

It should be noted that the first terminal device may first perform S1204*a* and then perform S1204*b*, or may first perform S1204*b* and then perform S1204*a*, or may simultaneously perform S1204*a* and S1204*b*. This is not limited in this embodiment of this application.

S1205: The first terminal device determines a transmission latency based on the first time, the second time, the third time, and the fourth time.

For example, as shown in FIG. 12*c*, the reference DFN is used as an example. The first reference DFN is denoted as the DFN #x, and the second reference DFN is denoted as the DFN #y. FIG. 12*c* shows a transmission latency of the first reference information and the second reference information by using a lower boundary of a direct frame as an example. It can be learned from FIG. 12*c* that for a DF indicated by a same DFN (for example, the DFN #x or the DFN #y), in time domain, a lower boundary of the DF determined by the first terminal device is different from a lower boundary of the DF determined by the second terminal device, and there is a transmission latency. The transmission latency satisfies the following formula:

$$D = (t1' - t1 + t2' - t2)/2$$

D represents the transmission latency, t1 represents the first time, t1' represents the second time, t2 represents the third time, and t2' represents the fourth time.

In the transmission latency determining method 1200 in this embodiment of this application, the first terminal device and the second terminal device send reference information to each other, to determine the foregoing four pieces of time (that is, the first time, the second time, the third time, and the fourth time). In other words, both the first terminal device and the second terminal device determine time on respective clocks for a same reference point (for example, the boundary of the first resource or the boundary of the second resource), and then the first terminal device may determine the transmission latency based on the foregoing four pieces of time.

In some embodiments, the transmission latency is used to calibrate a clock. The following provides detailed descriptions by using three examples (that is, Example 1, Example 2, and Example 3 below).

Example 1: A scenario of "communication between terminal devices" is used as an example. As shown in the first dashed box in FIG. 13*a*, the first terminal device in the scenario further performs S1206.

S1206: The first terminal device compensates for clock synchronization with the second terminal device based on the transmission latency.

For example, the second terminal device sends time information to the first terminal device. Correspondingly, the first terminal device receives the time information from the second terminal device. The time information indicates that the time of the lower boundary of the DF corresponding to the DFN #y on the second clock is t2. The first terminal device uses (t2+D) as the time of the lower boundary of the frame. D represents the transmission latency.

In this way, the first terminal device may implement clock synchronization with the second terminal device, to improve clock synchronization precision.

It should be understood that S1206 is a step performed after initial clock synchronization is implemented between the first terminal device and the second terminal device. For a process of implementing initial clock synchronization between the first terminal device and the second terminal device, refer to the descriptions of the clock synchronization method 1100 in embodiments of this application. Details are not described herein again. When the first terminal device implements initial clock synchronization with the second terminal device based on the clock synchronization method 1100, the first terminal device in S1201 may be the first terminal device in S1101. Correspondingly, the second terminal device in S1201 is the second terminal device in S1101. Alternatively, the first terminal device in S1201 may be the second terminal device in S1101. Correspondingly, the second terminal device in S1201 is the first terminal device in S1101. If the first terminal device in S1201 is the second terminal device in S1101, the first reference information in S1201 and the first information in S1101 may be same information, or may be different information. This is not limited in this embodiment of this application.

Example 2: A U2N scenario is used as an example. When the first terminal device is used as a remote terminal device, as shown in the first dashed box in FIG. 13*b*, the first terminal device further performs S1207.

S1207: The first terminal device compensates for clock synchronization with the network device based on the transmission latency.

For example, the network device sends first time information to the first terminal device. Correspondingly, the first terminal device receives the first time information from the network device. The first time information indicates that time of the lower boundary of the SF corresponding to the SFN #y on a network-side clock is t2. The first terminal device uses (t2+D) as the time of the lower boundary of the frame. D represents the transmission latency.

In this way, the first terminal device may implement clock synchronization with the network device, to improve clock synchronization precision.

It should be noted that, if the first terminal device is used as a remote terminal device in the U2N scenario, the second terminal device is used as a relay terminal device in the U2N scenario, and provides a relay service for the first terminal device. It should be understood that S1207 is a step performed after initial clock synchronization is implemented between the first terminal device and the network device. For a process of implementing initial clock synchronization between the first terminal device and the network device, refer to the descriptions of the clock synchronization method 500, the clock synchronization method 800, or the clock synchronization method 900 in embodiments of this application. Details are not described herein again. When the first terminal device implements clock synchronization with the network device based on the clock synchronization method 500, the first reference information in S1201 and the first reference information in S505*a* may be same information, or may be different information. If the first reference information in S1201 and the first reference information in S505*a* are different information, the second reference information in S1203 and the first reference information in S505*a* may be same information, or may be different information. This is not limited in this embodiment of this application.

Example 3: As shown in the second dashed boxes in FIG. 13*a* and FIG. 13*b*, the first terminal device further performs S1208.

S1208: The first terminal device sends the transmission latency to the second terminal device. Correspondingly, the second terminal device receives the transmission latency from the first terminal device.

Figure 13A:
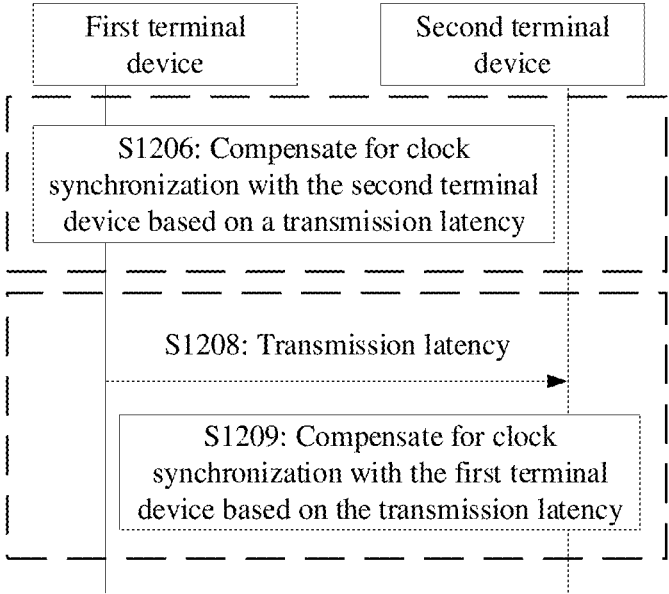
FIG. 13a is a schematic flowchart of still another clock synchronization method according to an embodiment of this application.
Figure 13B:
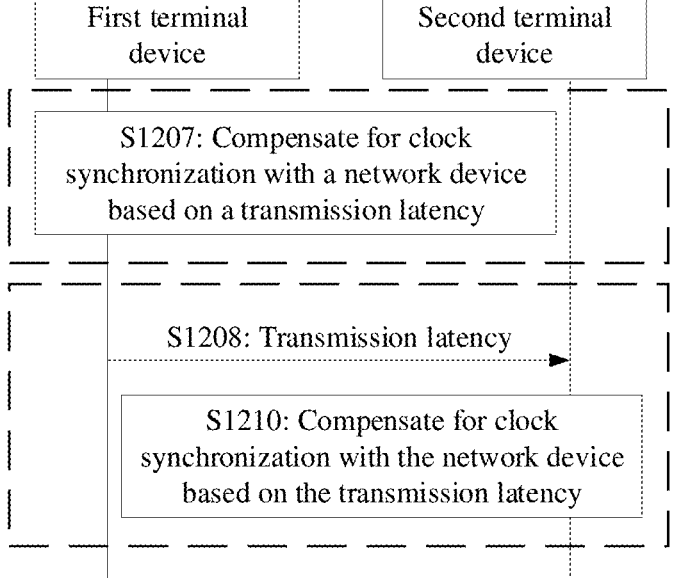
FIG. 13b is a schematic flowchart of still another clock synchronization method according to an embodiment of this application.

For the second terminal device, if the scenario in which the second terminal device is located is "communication between terminal devices", the second terminal device further performs S1209, as shown in the second dashed box in FIG. 13a. If the second terminal device is used as a remote terminal device in the U2N scenario, the second terminal device further performs S1210, as shown in the second dashed box in FIG. 13b. S1209 and S1210 are described as follows:

S1209: The second terminal device compensates for clock synchronization with the first terminal device based on the transmission latency.

For example, the first terminal device sends time information to the second terminal device. Correspondingly, the second terminal device receives the time information from the first terminal device. The time information indicates that the time of the lower boundary of the DF corresponding to the DFN #y on the first clock is t2. The second terminal device uses (t2+D) as the time of the lower boundary of the frame. D represents the transmission latency.

In this way, the second terminal device may implement clock synchronization with the first terminal device, to improve clock synchronization precision.

It should be understood that, when the scenario in which the second terminal device is located is "communication between terminal devices", the first terminal device is also located in the scenario of "communication between terminal devices", and directly communicates with the second terminal device. S1209 is a step performed after initial clock synchronization is implemented between the first terminal device and the second terminal device. For a process of implementing initial clock synchronization between the first terminal device and the second terminal device, refer to the descriptions of the clock synchronization method 1100 in embodiments of this application. Details are not described herein again.

S1210: The second terminal device compensates for clock synchronization with the network device based on the transmission latency.

For example, the network device sends the first time information to the second terminal device. Correspondingly, the second terminal device receives the first time information from the network device. The first time information indicates that the time of the lower boundary of the SF corresponding to the SFN #y on the network-side clock is t2. The second terminal device uses (t2+D) as the time of the lower boundary of the frame. D represents the transmission latency.

In this way, the second terminal device may implement clock synchronization with the network device, to improve clock synchronization precision.

It should be understood that when the second terminal device is used as a remote terminal device in the U2N scenario, the first terminal device is used as a relay terminal device in the U2N scenario, and provides a relay service for the second terminal device. Similarly, S1210 is a step performed after initial clock synchronization is implemented between the second terminal device and the network device. For a process of implementing initial clock synchronization between the second terminal device and the network device, refer to the descriptions of the clock synchronization method 500, the clock synchronization method 800, or the clock synchronization method 900 in embodiments of this application (the second terminal device in S1210 is the first terminal device in the clock synchronization method 500, the first terminal device in the clock synchronization method 800, or the first terminal device in the clock synchronization method 900). Details are not described herein again. When the second terminal device implements clock synchronization with the network device based on the clock synchronization method 500, the first reference information in S1201 and the first reference information in S505a may be same information, or may be different information. If the first reference information in S1201 and the first reference information in S505a are different information, the second reference information in S1203 and the first reference information in S505a may be same information, or may be different information. This is not limited in this embodiment of this application.

Figure 14A:
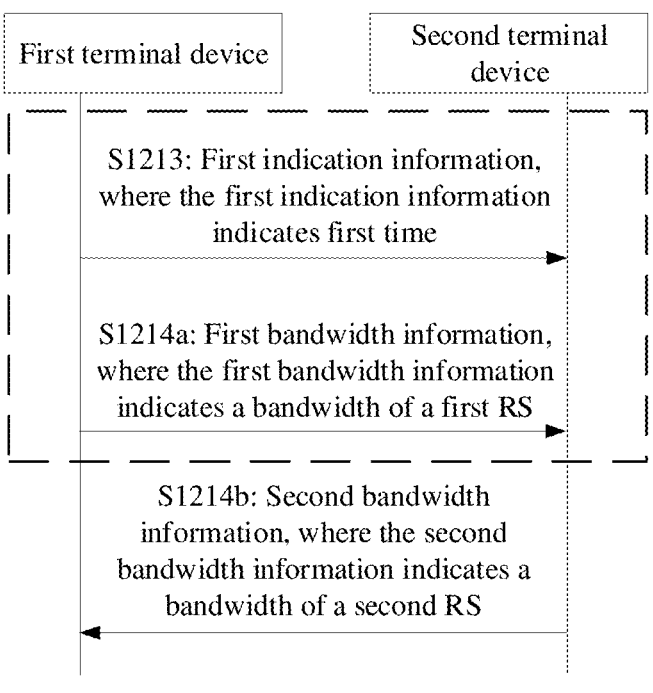
FIG. 14a is a schematic flowchart of still another clock synchronization method according to an embodiment of this application.

In some embodiments, as shown in FIG. 14a, the first terminal device further performs S1213.

S1213: The first terminal device sends first indication information to the second terminal device. Correspondingly, the second terminal device receives the first indication information from the first terminal device.

The first indication information indicates the first time. For descriptions of the first time, refer to the descriptions of S1204a. Details are not described herein again. For example, the first indication information is carried in an RRC message, or the first indication information is carried in SCI, for example, second-stage SCI.

The first indication information and the first reference information may be carried on different resources. Alternatively, the first indication information and the first reference information may be carried on a same resource. This is not limited in this embodiment of this application.

In some embodiments, as shown in FIG. 14a, the first terminal device may further perform S1214a.

S1214a: The first terminal device sends first bandwidth information to the second terminal device. Correspondingly, the second terminal device receives the first bandwidth information from the first terminal device.

The first bandwidth information indicates the bandwidth of the first RS. For example, the bandwidth of the first RS is still five RBs, and the first bandwidth information indicates that the quantity of RBs is five.

For example, the first bandwidth information is carried in SCI sent by the first terminal device to the second terminal device. For example, the first bandwidth information is carried in first-stage SCI of the SCI or second-stage SCI of the SCI.

In this way, the second terminal device may learn of the bandwidth of the first RS based on the first bandwidth information.

Similarly, as shown in FIG. 14a, the second terminal device may further perform S1214b.

S1214b: The second terminal device sends second bandwidth information to the first terminal device. Correspondingly, the first terminal device receives the second bandwidth information from the second terminal device.

The second bandwidth information indicates a bandwidth of the second RS. For example, the bandwidth of the second RS is still five RBs, and the second bandwidth information indicates that a quantity of RBs is five.

For example, the second bandwidth information is carried in SCI sent by the second terminal device to the first terminal device. For example, the second bandwidth information is carried in first-stage SCI of the SCI or second-stage SCI of the SCI.

In this way, the first terminal device may learn of the bandwidth of the second RS based on the second bandwidth information.

Figure 14B:
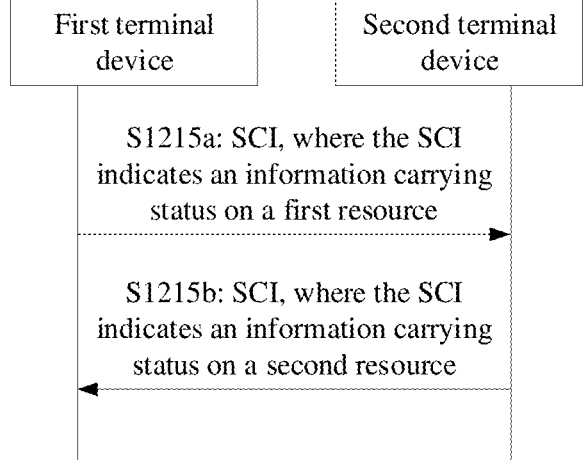
FIG. 14b is a schematic flowchart of still another clock synchronization method according to an embodiment of this application.

In some embodiments, as shown in FIG. 14*b*, the first terminal device further performs S1215*a*.

S1215*a*: The first terminal device sends SCI to the second terminal device. Correspondingly, the second terminal device receives the SCI from the first terminal device.

The SCI indicates an information carrying status on the first resource. For example, when the first resource carries only the first RS, the SCI indicates that the first resource carries only the first RS. Implicitly, it may be understood as that the SCI indicates that the first resource does not carry the MAC PDU. In this way, the second terminal device may learn, based on the SCI in S1215*a*, that the first resource carries only the first RS and does not carry the MAC PDU.

Similarly, as shown in FIG. 14*b*, the second terminal device further performs S1215*b*.

S1215*b*: The second terminal device sends SCI to the first terminal device. Correspondingly, the first terminal device receives the SCI from the second terminal device.

The SCI indicates an information carrying status on second resource. For example, when the second resource carries only the second RS, the SCI indicates that the second resource carries only the second RS. Implicitly, it may be understood as that the SCI indicates that the second resource does not carry the MAC PDU. In this way, the first terminal device may learn, based on the SCI in S1215*b*, that the second resource carries only the second RS and does not carry the MAC PDU.

It should be noted that, in the transmission latency determining method 1200 in this embodiment of this application, a reference signal may alternatively be replaced with another name, for example, a timing reference signal (TRS). This is not limited in this embodiment of this application. A lower boundary may alternatively be replaced with another reference point, for example, an upper boundary or a central point. An end boundary of a resource may alternatively be replaced with a start boundary of the resource, a central point of the resource, or the like. This is not limited in this embodiment of this application.

The foregoing mainly describes the solutions provided in embodiments of this application from the perspective of interaction between network elements. Correspondingly, embodiments of this application further provide a communication apparatus. The communication apparatus may be the network element in the foregoing method embodiments, or an apparatus including the foregoing network element, or a component that can be used in the network element. It may be understood that, to implement the foregoing functions, the communication apparatus includes a hardware structure and/or a software module for performing a corresponding function. A person skilled in the art should be easily aware that units, algorithms, and steps in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 15:
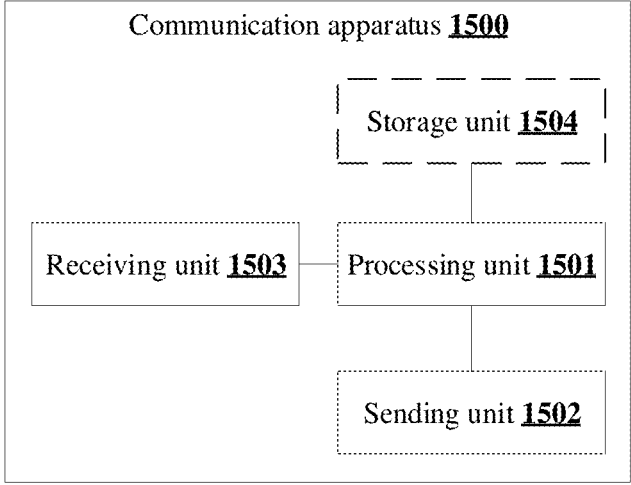
FIG. 15 is a schematic diagram of a structure of a communication apparatus according to an embodiment of this application.

For example, FIG. 15 is a schematic diagram of a structure of a communication apparatus 1500. The communication apparatus 1500 includes a processing unit 1501, a sending unit 1502, and a receiving unit 1503.

In a possible example, the communication apparatus 1500 is a first terminal device. The processing unit 1501 is configured to support the first terminal device in performing S506 in FIG. 5, S805 in FIG. 8, S905 in FIG. 9, S1102 in FIG. 11, S1204*a*, S1204*b*, and S1205 in FIG. 12*a*, and/or another processing operation that needs to be performed by the first terminal device in embodiments of this application. The receiving unit 1503 is configured to support the first terminal device in performing S501, S505*a*, and S505*c* in FIGS. 5, S801, S804, and S803*b* in FIG. 8, S904 in FIG. 9, S1101 in FIG. 11, S1203 in FIG. 12*a*, and/or another receiving operation that needs to be performed by the first terminal device in embodiments of this application. The sending unit 1502 is configured to support the first terminal device in performing S1103 in FIG. 11, S1201 in FIG. 12*a*, and/or another sending operation that needs to be performed by the first terminal device in embodiments of this application.

In another possible example, the communication apparatus 1500 is a second terminal device. The processing unit 1501 is configured to support the second terminal device in performing S502 in FIG. 5, S802 in FIG. 8, S901 in FIG. 9, S1202 in FIG. 12*a*, and/or another processing operation that needs to be performed by the second terminal device in embodiments of this application. The sending unit 1502 is configured to support the second terminal device in performing S501, S505*a*, S505*b*, and S505*c* in FIG. 5, S801, S803*a*, S803*b*, and S804 in FIGS. 8, S902 and S904 in FIG. 9, S1101 in FIG. 11, S1203 in FIG. 12*a*, and/or another sending operation that needs to be performed by the second terminal device in embodiments of this application. The receiving unit 1503 is configured to support the second terminal device in performing S501 and S505*c* in FIGS. 5, S801 and S804 in FIG. 8, S904 in FIG. 9, S1103 in FIG. 11, S1201 in FIG. 12*a*, and/or another receiving operation that needs to be performed by the second terminal device in embodiments of this application.

In still another possible example, the communication apparatus 1500 is a network device. The processing unit 1501 is configured to support the network device in performing S903 in FIG. 9 and/or another processing operation that needs to be performed by the network device in embodiments of this application. The sending unit 1502 is configured to support the network device in performing S501 and S505*c* in FIGS. 5, S801 and S804 in FIG. 8, S904 in FIG. 9, and/or another sending operation that needs to be performed by the network device in embodiments of this application. The receiving unit 1503 is configured to support the network device in performing S505*b* in FIG. 5, S803*a* in FIG. 8, S902 in FIG. 9, and/or another receiving operation that needs to be performed by the network device in embodiments of this application.

Optionally, the communication apparatus 1500 may further include a storage unit 1504, configured to store program code and data of the communication apparatus, where the data may include but is not limited to original data, intermediate data, or the like.

The processing unit 1501 may be a processor or a controller, for example, may be a CPU, a general-purpose processor, an application specific integrated circuit (ASIC), a field programmable gate array (FPGA), or another programmable logic device, a transistor logic device, a hardware component, or any combination thereof. The processing unit may implement or execute various example logical blocks, modules, and circuits described with reference to content disclosed in this application. Alternatively, the processor may be a combination of processors implementing a computing function, for example, a combination of one or more microprocessors, or a combination of a DSP and a microprocessor.

The sending unit 1502 may be a communication interface, a transmitter, a transmitter circuit, or the like. The communication interface is a general term. In a specific implementation, the communication interface may include a plurality of interfaces, for example, may include an interface between terminal devices (for example, the first terminal device and the second terminal device) and/or another interface.

The receiving unit 1503 may be a communication interface, a receiver, a receiver circuit, or the like. The communication interface is a general term. In a specific implementation, the communication interface may include a plurality of interfaces, for example, may include an interface between terminal devices (for example, the first terminal device and the second terminal device) and/or another interface.

The sending unit 1502 and the receiving unit 1503 may be physically or logically implemented as a same unit.

The storage unit 1504 may be a memory.

Figure 16:
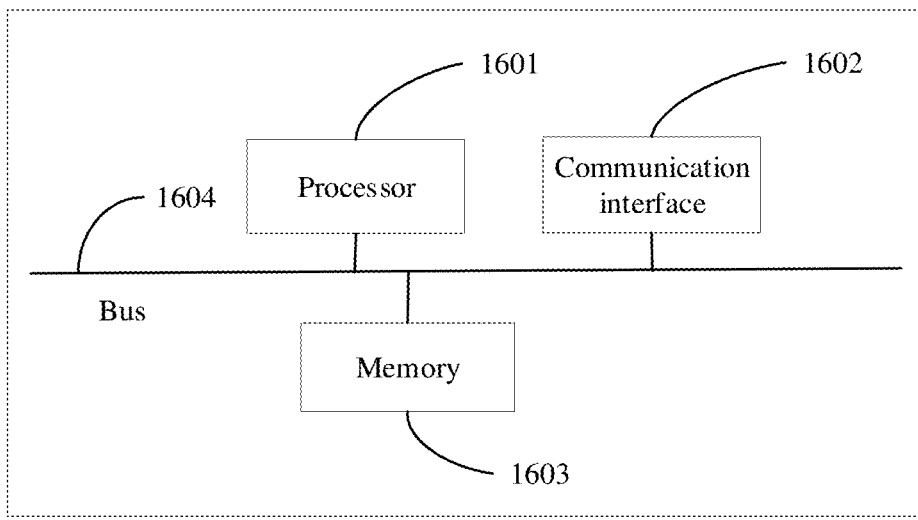
FIG. 16 is a schematic diagram of a structure of another communication apparatus according to an embodiment of this application.

When the processing unit 1501 is a processor, the sending unit 1502 and the receiving unit 1503 are communication interfaces, and the storage unit 1504 is a memory, the communication apparatus in this embodiment of this application may be that shown in FIG. 16.

Refer to FIG. 16. The communication apparatus includes a processor 1601, a communication interface 1602, and a memory 1603. Optionally, the communication apparatus may further include a bus 1604. The communication interface 1602, the processor 1601, and the memory 1603 may be connected to each other by using the bus 1604. The bus 1604 may be a peripheral component interconnect (PCI) bus, an extended industry standard architecture (EISA) bus, or the like. The bus 1604 may be classified into an address bus, a data bus, a control bus, and the like. For ease of representation, only one thick line is used to represent the bus in FIG. 16, but this does not mean that there is only one bus or only one type of bus.

Optionally, an embodiment of this application further provides a computer program product including computer instructions. When the computer instructions are run on a computer, the computer is enabled to perform the methods in the foregoing embodiments.

Optionally, an embodiment of this application further provides a computer-readable storage medium. The computer-readable storage medium stores computer instructions. When the computer instructions are run on a computer, the computer is enabled to perform the methods in the foregoing embodiments.

Optionally, an embodiment of this application further provides a chip, including a processing circuit and a transceiver circuit. The processing circuit and the transceiver circuit are configured to implement the methods in the foregoing embodiments. The processing circuit is configured to perform a processing action in a corresponding method, and the transceiver circuit is configured to perform a receiving/sending action in the corresponding method.

A person of ordinary skill in the art may understand that all or some of the foregoing embodiments may be implemented by software, hardware, firmware, or any combination thereof. When software is used to implement embodiments, all or some of embodiments may be implemented in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD)), or the like.

In the several embodiments provided in this application, it should be understood that the disclosed system, apparatus, and method may be implemented in other manners. For example, the described apparatus embodiment is merely an example. For example, division into the modules is merely logical function division and may be other division in an actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electrical or other forms.

The units referred to as separate parts may or may not be physically separate, and parts displayed as units may or may not be physical units, may be located in one position, or may be distributed on a plurality of devices. Some or all of the units may be selected based on actual requirements to achieve the objectives of the solutions of embodiments.

Based on the foregoing descriptions of the implementations, a person skilled in the art may clearly understand that this application may be implemented by software in addition to necessary universal hardware or by hardware only. In most circumstances, the former is a better implementation. Based on such an understanding, the technical solutions in this application essentially or the part contributing to the conventional technology may be implemented in a form of a software product. The computer software product is stored in a readable storage medium, such as a floppy disk, a hard disk or an optical disc of a computer, and includes several instructions for instructing a computer device (which may be a personal computer, a server, a network device, or the like) to perform the methods described in embodiments of this application.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A clock synchronization method, comprising:
   receiving, by a first terminal device, first time information, wherein the first time information indicates time of a lower boundary of a reference system frame (SF)

on a network-side clock, and the reference SF is transmitted through a Uu interface;

receiving, by the first terminal device, first reference information, wherein the first reference information indicates a first reference direct frame (DF), and the first reference DF is transmitted through a PC5 interface; and implementing, by the first terminal device, clock synchronization with a network device based on the first time information and the first reference information, wherein the first reference DF corresponds to the reference SF.

2. The method according to claim 1, wherein the first reference information further comprises information about a time domain resource unit, the time domain resource unit is in the first reference DF, before the first reference DF, or after the first reference DF, and the time domain resource unit meets one of:

a lower boundary of the time domain resource unit is aligned with the lower boundary of the reference SF; and an offset between the lower boundary of the time domain resource unit and the lower boundary of the reference SF is minimum.

3. The method according to claim 2, wherein the lower boundary of the time domain resource unit is not aligned with the lower boundary of the reference SE, the first reference information further comprises offset information, and the offset information indicates the offset between the lower boundary of the time domain resource unit and the lower boundary of the reference SF.

4. The method according to claim 2, wherein the time domain resource unit comprises at least one of a subframe or a slot.

5. The method according to claim 1, wherein the first reference information further comprises offset information, and the offset information indicates an offset between a lower boundary of the first reference DF and the lower boundary of the reference SF.

6. The method according to claim 1, wherein the first reference information further comprises compensation information, and the method further comprises:

using the compensation information, by the first terminal device, to compensate for the clock synchronization with the network device.

7. The method according to claim 6, wherein the compensation information comprises one of a timing advance (TA) and TA/2, the TA is a timing advance for implementing uplink synchronization between a second terminal device and the network device, and the second terminal device provides a relay service for the first terminal device.

8. An apparatus, comprising:

at least one processor, and a memory storing instructions executable by the at least one processor;

to cause the apparatus to perform operations comprising:

receiving first time information, wherein the first time information indicates time of a lower boundary of a reference system frame (SF) on a network-side clock, and the reference SF is transmitted through a Uu interface;

receiving first reference information, wherein the first reference information indicates a first reference direct frame (DF), and the first reference DF is transmitted through a PC5 interface; and implementing clock synchronization with a network device based on the first time information and the first reference information, wherein the first reference DF corresponds to the reference SF.

9. The apparatus according to claim 8, wherein the first reference information further comprises information about a time domain resource unit, the time domain resource unit is in the first reference DF, before the first reference DF, or after the first reference DF, and the time domain resource unit meets one of:

a lower boundary of the time domain resource unit is aligned with the lower boundary of the reference SF; and an offset between the lower boundary of the time domain resource unit and the lower boundary of the reference SF is minimum.

10. The apparatus according to claim 9, wherein the lower boundary of the time domain resource unit is not aligned with the lower boundary of the reference SF, the first reference information further comprises offset information, and the offset information indicates the offset between the lower boundary of the time domain resource unit and the lower boundary of the reference SF.

11. The apparatus according to claim 9, wherein the time domain resource unit comprises at least one of a subframe or a slot.

12. The apparatus according to claim 8, wherein the first reference information further comprises offset information, and the offset information indicates an offset between a lower boundary of the first reference DF and the lower boundary of the reference SF.

13. The apparatus according to claim 8, wherein the first reference information further comprises compensation information, and the operations further comprise:

using the compensation information, by the apparatus, to compensate for the clock synchronization with the network device.

14. The apparatus according to claim 13, wherein the compensation information comprises one of timing advance (TA) and TA/2, the TA is a timing advance for implementing uplink synchronization between a second terminal device and the network device, and the second terminal device provides a relay service for the apparatus.

15. An apparatus, comprising:

at least one processor, and a memory storing instructions executable by the at least one processor;

to cause the apparatus to perform operations comprising:

sending first time information to a first terminal device, wherein the first time information indicates time of a lower boundary of a reference system frame (SF) on a network-side clock, and the reference SF is transmitted through a Uu interface;

receiving first reference information from a second terminal device, wherein the first reference information indicates a first reference direct frame (DF), the first reference DF corresponds to the reference SF, the first reference DF is transmitted through a PC5 interface, and the second terminal device provides a relay service for the first terminal device; and sending the first reference information to the first terminal device, wherein the first terminal device is configured to use the first reference information and the first time information to perform clock synchronization with a network device.

16. The apparatus according to claim 15, wherein the first reference information further comprises information about a time domain resource unit, the time domain resource unit is in the first reference DF, before the first reference DF, or after the first reference DF, and the time domain resource unit meets one of:

a lower boundary of the time domain resource unit is aligned with the lower boundary of the reference SF; and an offset between the lower boundary of the time domain resource unit and the lower boundary of the reference SF is minimum.

17. The apparatus according to claim 16, wherein the lower boundary of the time domain resource unit is not aligned with the lower boundary of the reference SF, the first reference information further comprises offset information, and the offset information indicates the offset between the lower boundary of the time domain resource unit and the lower boundary of the reference SF.

18. The apparatus according to claim 16, wherein the time domain resource unit comprises at least one of a subframe or a slot.

19. The apparatus according to claim 15, wherein the first reference information further comprises offset information, and the offset information indicates an offset between a lower boundary of the first reference DF and the lower boundary of the reference SF.

20. The apparatus according to claim 15, wherein the first reference information further comprises compensation information, and the first terminal device is configured to use the compensation information to compensate for the clock synchronization with the network device.

* * * * *